(12) United States Patent
Pessin

(10) Patent No.: US 7,590,595 B2
(45) Date of Patent: Sep. 15, 2009

(54) APPARATUS AND METHOD OF A DISTRIBUTED CAPITAL SYSTEM

(76) Inventor: Zachary Pessin, 251 W. 87th St., Apt. 26, New York City, NY (US) 10024

(*) Notice: Subject to any disclaimer, the term of this patent is extended or adjusted under 35 U.S.C. 154(b) by 1163 days.

(21) Appl. No.: 10/366,446

(22) Filed: Feb. 14, 2003

(65) Prior Publication Data
US 2003/0182230 A1  Sep. 25, 2003

(51) Int. Cl.
*G06Q 40/00* (2006.01)
(52) U.S. Cl. .......................................... 705/40; 705/75
(58) Field of Classification Search ................... 705/35, 705/38–44, 53, 64, 68, 74–79; 725/1, 4–5; 902/1–10
See application file for complete search history.

(56) References Cited

U.S. PATENT DOCUMENTS

| | | | |
|---|---|---|---|
| 4,774,664 A | 9/1988 | Campbell et al. | |
| 4,914,587 A | 4/1990 | Clouse | |
| 5,475,585 A | 12/1995 | Bush | |
| 6,993,507 B2* | 1/2006 | Meyer et al. | 705/40 |
| 7,249,098 B2* | 7/2007 | Milberger et al. | 705/40 |
| 7,376,587 B1* | 5/2008 | Neofytides et al. | 705/26 |
| 7,395,241 B1* | 7/2008 | Cook et al. | 705/39 |
| 2002/0016769 A1* | 2/2002 | Barbara et al. | 705/40 |
| 2002/0032651 A1* | 3/2002 | Embrey | 705/40 |
| 2002/0111886 A1* | 8/2002 | Chenevich et al. | 705/30 |

FOREIGN PATENT DOCUMENTS

| | | |
|---|---|---|
| JP | 2001-357434 | 12/2001 |
| JP | 2002-007725 | 1/2002 |

OTHER PUBLICATIONS

"CLS Bank", Australian Banker, p. 1, Apr. 1, 1999.*

* cited by examiner

*Primary Examiner*—Mary Cheung
(74) *Attorney, Agent, or Firm*—Jean C. Edwards, Esq.; Akerman Senterfitt

(57) ABSTRACT

Methods, systems, and articles of manufacture consistent with the present invention provide for conducting financial transactions over a network. A user requests to execute at least one financial transaction with at least one of a number of parties, each of the parties corresponding to a data processing system on the network. Real-time financial information relating to the financial transaction is obtained, and the user can test and confirm that the financial transaction with the at least one party can take place prior to execution of the financial transaction.

89 Claims, 22 Drawing Sheets

All Seek Oppside

Unbalanced Request Volume
Accordians; Multiple.Single

| Macro Ledger | |  |
|---|---|---|
| Defined Period : 2002 08/27 09:00:00-11:59:59 | | |
| Time | + Counterparty | - Counterparty |
| | CSFB 44 | CSFB 44 |
| | JP 32 | JP 32 |
| | Bob 12 | JP 12 |
| | CSFB 76 | JP 76 |
| | | |

| Macro Ledger Empirically Reduced | | |
|---|---|---|
| Defined Period : 2002 08/27 09:00:00-11:59:59 | | |
| Time | + Counterparty | - Counterparty |
| | Bob 12 | JP 12 |
| | CSFB 76 | JP 76 |
| | | |
| | | |
| | | |

Collaborative.Simple transaction

Collaborative.Compound transaction

APPARATUS AND METHOD OF A DISTRIBUTED CAPITAL SYSTEM

The present invention relates generally to an apparatus and method of an automated distributed finance or capital system which can perform a plurality of financial transactions over a global computerized network.

BACKGROUND OF THE INVENTION

In financial services, geography is a formidable barrier, especially when the geographic distance (time-difference) is compounded by currency, legal, and political domain differences. Despite all the claims of future horizons and full systemization of the world economy, straight through processing and streamlined operations, there is still no organization delivering an architecture specifically designed to handle integrated global financial services.

SUMMARY OF THE INVENTION

The present invention relates to an apparatus and method of an automated distributed capital system which can perform a plurality of financial transactions over a global computerized network.

In particular, the distributed capital system (DCS) of the present invention can manage transactions that fall under two broad categories: Traditional (Individual), and Collaborative (Multiparty). These two categories cover the transaction spectrum, and the DCS of the present invention detailed herein covers the assembly, testing, execution, and management of transaction events (such as bill payment, foreign currency exchange etc.), which are unique.

Specifically, the DCS of the present invention handles, among other transactions: bill payment structuring, management, and execution; invoicing structuring, management and execution; funds transfer initiation and management; distributed (dispersed) funds transfer (DFT) initiation and management, including repatriation of funds without international transfer; direct exchange of fungible units, whether symmetric (i.e., parties on each side of transaction hold equivalent value, to be exchanged in full with opposite counterparty) or asymmetric (parties on each side of transaction hold different value amounts)—specifically currencies, between parties worldwide (without intermediary brokers or $3^{rd}$ party financial institutions); automated foreign exchange market; programmed credit card payment scheduling; avoidance of the payment of ATM fees worldwide; on-line purchasing transactions in different currencies without requiring traditional currency-exchange transaction; a consumer credit and direct lending system; a distributed credit-rating system; a syndication system that handles micro-to-massive amounts from unlimited participants; and programmed speculative investing individually or in collaboration with others.

Specifically, aspects of the present invention relate to an automated distributed capital system that can perform a plurality of financial transactions over a computer network, such as the Internet. The distributed capital system (DCS) of the present invention manages any type of financial transaction between any number of parties. Therefore, for example, if a party desires to execute a financial transaction for a certain monetary or exchange value and the first counter-party cannot execute the transaction for the full monetary or exchange value, the DCS of the present invention automatically obtains additional counter-parties until the transaction can be fully executed. Accordingly, as long as there is enough value distributed among the various parties on the network, the DCS of the present invention can execute financial transactions for any value.

The party initiating the financial transaction can choose the counter-parties or the DCS of the present invention can automatically obtain those counter-parties. Further, the counter-parties can be located anywhere on the network. Therefore, if the network is for example the Internet, methods and systems consistent with the present invention are not limited to geographical boundaries. The DCS of the present invention can execute transactions between parties in various countries, and automatically exchange the respective exchange currencies.

Accordingly, the distributed capital system allows any number of parties to collaboratively transact any amount of value with any number of counter-parties, arranging for independently market-driven rates and terms and handling the transfer of value. This is performed without, for example, an intermediary such as a broker.

Since there can be any number of parties and counter-parties, the DCS can execute financial transactions involving, for example, a single party and a single counter-party (traditional simple), a single party executing several traditional simple transactions at the same time (traditional compound), a single party and multiple counter-parties (collaborative simple), and multiple parties and multiple counter-parties (collaborative compound).

In accordance with methods consistent with the present invention, a method in a data processing system having a program is provided. The data processing system is connected to at least one of a plurality of remote data processing systems via a network. The method comprises the steps performed by the program of: receiving from a user a request to execute at least one financial transaction with at least one of a plurality of parties, each of the parties corresponding to one of the data processing systems; obtaining real-time financial information relating to the financial transaction; and confirming that the financial transaction can be executed with at least one party.

In accordance with methods consistent with the present invention, a method in a data processing system having a program is provided. The data processing system is connected to at least one of a plurality of remote data processing systems via a network. The method comprises the steps performed by the program of: receiving from a user a request to execute at least one financial transaction with at least one of a plurality of parties, each of the parties corresponding to one of the data processing systems; obtaining real-time financial information relating to the financial transaction; determining a monetary or exchange value of the financial transaction; determining whether the at least one party that will execute the financial transaction for the monetary or exchange value; and confirming that the financial transaction can be executed with additional parties to the at least one party until a total monetary or exchange value for which the parties will execute the financial transaction is equal to the determined monetary or exchange value of the financial transaction responsive to the identified at least one party not executing the financial transaction for the monetary or exchange value.

In accordance with articles of manufacture consistent with the present invention, a computer-readable medium containing instructions that cause a data processing system to perform a method is provided. The data processing system is connected to at least one of a plurality of remote data processing systems via a network. The method comprises the steps performed by the program of: receiving from a user a request to execute at least one financial transaction with at least one of a plurality of parties, each of the parties corresponding to one of the data processing systems; obtaining real-time financial information relating to the financial transaction; and confirming that the financial transaction can be executed with at least one party.

In accordance with articles of manufacture consistent with the present invention, a computer-readable medium containing instructions that cause a data processing system to perform a method is provided. The data processing system is connected to at least one of a plurality of remote data processing systems via a network. The method comprises the steps performed by the program of: receiving from a user a request to execute at least one financial transaction with at least one of a plurality of parties, each of the parties corresponding to one of the data processing systems; obtaining real-time financial information relating to the financial transaction; determining a monetary or exchange value of the financial transaction; determining whether the at least one party that will execute the financial transaction for the monetary or exchange value; and confirming that the financial transaction can be executed with additional parties to the at least one party until a total monetary or exchange value for which the parties will execute the financial transaction is equal to the determined monetary or exchange value of the financial transaction responsive to the identified at least one party not executing the financial transaction for the monetary or exchange value.

In accordance with systems consistent with the present invention, a data processing system connected to at least one of a plurality of remote data processing systems via a network is provided. The data processing system comprises: means for receiving from a user a request to execute at least one financial transaction with at least one of a plurality of parties, each of the parties corresponding to one of the data processing systems; means for obtaining real-time financial information relating to the financial transaction; and means for confirming that the financial transaction can be executed with at least one party.

In accordance with systems consistent with the present invention, a data processing system connected to at least one of a plurality of remote data processing systems via a network is provided. The data processing system comprises: means for receiving from a user a request to execute at least one financial transaction with at least one of a plurality of parties, each of the parties corresponding to one of the data processing systems; means for obtaining real-time financial information relating to the financial transaction; means for determining a monetary or exchange value of the financial transaction; means for determining whether the at least one party that will execute the financial transaction for the monetary or exchange value; and means for confirming that the financial transaction can be executed with additional parties to the at least one party until a total monetary or exchange value for which the parties will execute the financial transaction is equal to the determined monetary or exchange value of the financial transaction responsive to the identified at least one party not executing the financial transaction for the monetary or exchange value.

In accordance with systems consistent with the present invention, a data processing system connected to at least one of a plurality of remote data processing systems via a network is provided. The data processing system comprises: a memory comprising a program that receives from a user a request to execute at least one financial transaction with at least one of a plurality of parties, each of the parties corresponding to one of the data processing systems, obtains real-time financial information relating to the financial transaction, and confirms that the financial transaction can be executed with at least one party; and a processing unit that runs the program.

In accordance with systems consistent with the present invention, a data processing system connected to at least one of a plurality of remote data processing systems via a network is provided. The data processing system comprises: a memory comprising a program that receives from a user a request to execute at least one financial transaction with at least one of a plurality of parties, each of the parties corresponding to one of the data processing systems, obtains real-time financial information relating to the financial transaction, determines a monetary or exchange value of the financial transaction, determines whether the at least one party that will execute the financial transaction for the monetary or exchange value, and confirms that the financial transaction can be executed with additional parties to the at least one party until a total monetary or exchange value for which the parties will execute the financial transaction is equal to the determined monetary or exchange value of the financial transaction responsive to the identified at least one party not executing the financial transaction for the monetary or exchange value; and a processing unit that runs the program.

In accordance with articles of manufacture consistent with the present invention, a computer-readable memory device encoded with a program having a data structure is provided. The program is run by a processor in a data processing system connected to at least one of a plurality of remote data processing systems via a network. The data structure has a plurality of entries, each entry comprising: a first storage area that stores a monetary or exchange value of a financial transaction; and a plurality of second storage areas that each store an identity of a party to the financial transaction and an amount for which the party will execute the financial transaction, the program confirming additional parties and amounts for which the additional eligible parties will execute the financial transaction until a total amount for which the parties will execute the financial transaction is equal to the monetary or exchange value.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DETAILED DESCRIPTION OF THE PREFERRED EMBODIMENTS

Methods and systems consistent with the present invention makes possible automated distributed financial services available over a global computerized network. Among other things, the system of the present invention allows individuals to collaboratively lend (any particulate amount) to any person or company and arrange for independently market-driven rates and terms, and then also allowing the system to handle repayment distributions. A distributed capital system converts currencies without a broker, at any amount desired, and matches counterparties for equities, bond or other fungible-instrument trades faster and cheaper than traditional methods. The distributed capital system consistent with the present invention includes the concepts of scalability, network-effect, and open community.

Methods and systems consistent with the present invention include an expansive system designed to support network collaborative transaction services. Since this collaborative format is more sophisticated and requires more system architecture than conventional systems, current transaction structures (one-to-one commerce relationships) are enabled as a subset of the functionality of the collaborative embodiment of the present invention.

System Architecture

One embodiment of the present invention is now discussed with reference to the Figures which depicts a financial system suitable for practicing methods and systems consistent with the present invention.

Figure 1:
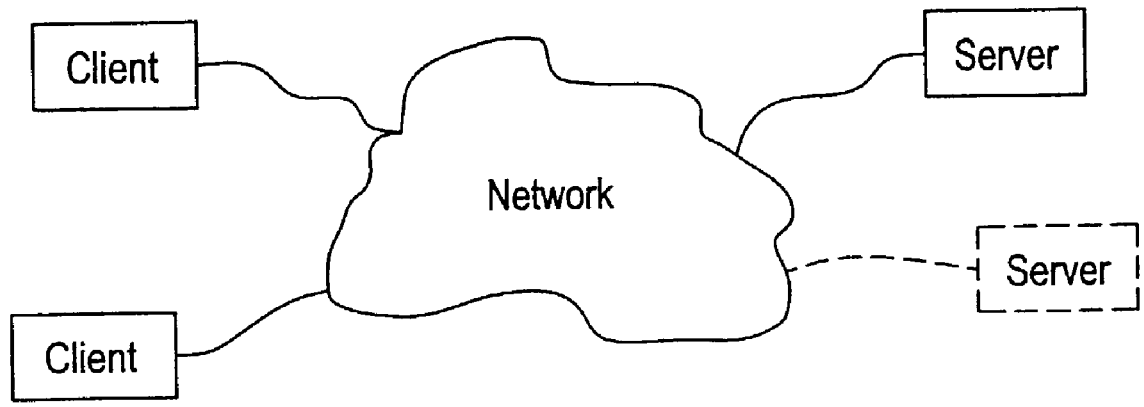
FIG. 1 is a schematic diagram showing a client-server environment, according to one embodiment consistent with the present invention.
Figure 2:
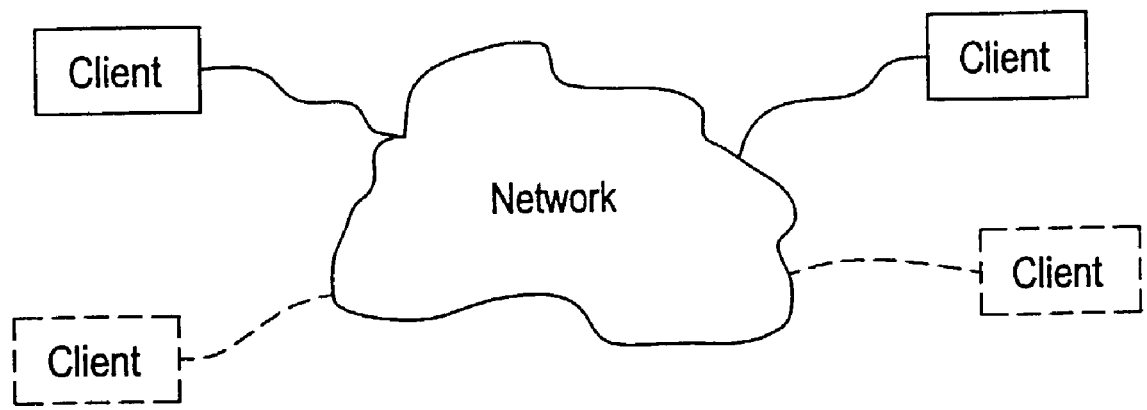
FIG. 2 is a schematic diagram showing a distributed network environment, according to one embodiment consistent with the present invention.

The present invention may be carried out in a client-server environment (see FIG. 1), or may be carried out in a distributed environment, where only client computers are utilized (see FIG. 2). Thus, in the present invention, a particular operation or service may be performed either at the client or the server, at the edge of a network or at center, or both. Therefore, at either the client or the server, or both, corresponding programs for a desired operation/service are available. In the present invention, even though a pair of corresponding programs at the client and the server, respectively, perform the same operations from the viewpoint of the user, they may execute different operations internal to the systems, including having operations performed completely at client computers in a distributed financial network, as shown in FIG. 2.

More particularly, in the distributed financial network of the present invention, every node on the network has a set of closest neighbors, and each node shares its awareness-universe with its neighbors. Thus, a query can be autonomously related back to the requesting party. The present invention terms this an "awareness propagation". Thus, the operations of the present invention can be provided solely by client computers as shown in FIG. 2.

However, at least one client computer, and perhaps, at least one server computer, may preferably be used to practice the methods and systems consistent with the present invention.

In the client-server environment, at least one client and at least one server are each connected to a network (see FIG. 1), such as a Local Area Network (LAN), Wide Area Network (WAN), and/or the Internet, over a communication link. The steps in the methods consistent with the present invention, are carried out at the client or at the server, or at both, the server, if used, being accessible by the client over, for example, the Internet, using a browser application or the like.

Figure 3:
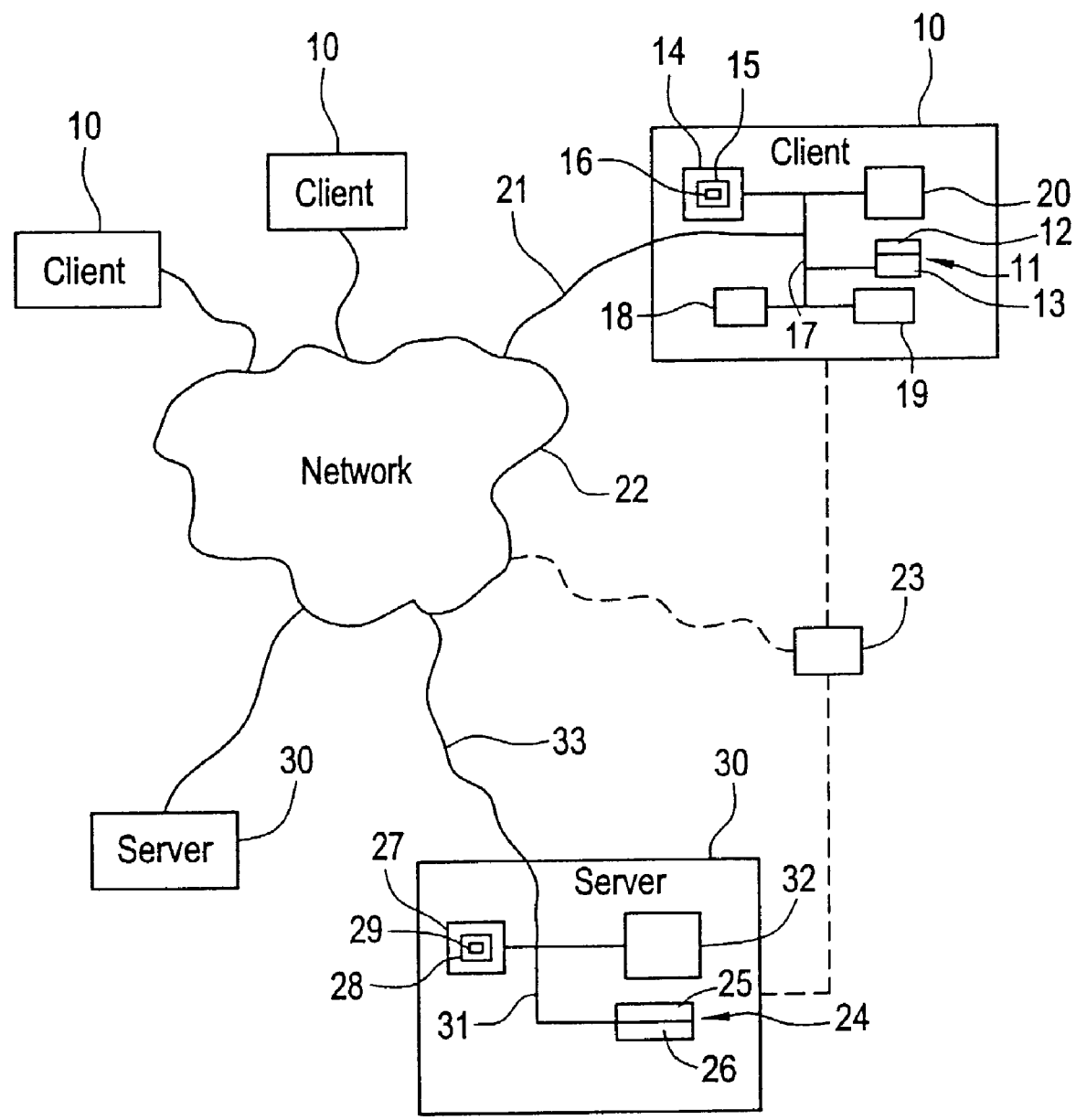
FIG. 3 is a schematic diagram showing more detail of the client and the server in a client-server environment, according to one embodiment consistent with the present invention.

Specifically, the client shown in FIGS. 1-3, may be a personal computer, a mobile terminal, such as a mobile computing device, a mobile phone, or a mobile data organizer, operated by the user in accessing the financial services remote from the client (i.e., at the server). Even though only two clients are shown in FIG. 1, one of ordinary skill in the art would be aware that there may be a plurality of similar clients connected to other clients or servers.

The client computer 10, as shown in FIG. 3, typically includes a processor 11 as a client data processing means or mechanism, the processor 11 including a central processing unit (CPU) 12 and an input/output (I/O) interface 13, a memory 14 with program 15 having a data structure 16, all connected by a bus 17, as well as an input device or means 18, a display 19, and may also include a secondary storage device 20. The bus 17 may be internal to the client 10 and may include an adapter to a keyboard or input device 18, or may include external connections.

The data structure 16 may include a plurality of entries, each entry including at least a first storage area that stores a monetary or exchange value of a financial transaction, and a plurality of second storage areas that each store an identity of a party to the financial transaction and an amount for which the party will execute the financial transaction, the program confirming additional parties and amounts for which the additional eligible parties will execute the financial transaction until a total amount for which the parties will execute the financial transaction is equal to the monetary or exchange value. The data structure can also have alternative embodiments including that associated with the match codes or other stored information as one of ordinary skill in the art would appreciate from the following descriptions.

In methods and systems consistent with the present invention, the client 10 is connected to other clients 10 or servers 30 via a communication link 21 as a client communication means or mechanism, using a communication end port specified by an address or a port, and the communication link may include a mobile communication link, a switched circuit communication link, or may involve a network of data processing devices such as a LAN, WAN, the Internet, or combinations thereof. The communication link 21 may be an adapter unit capable to execute various communications protocols in order to establish and maintain communication with the server 30. The communication link 21 may be constituted by a specialized piece of hardware or may be realized by a general CPU executing corresponding program instructions. The communication link 21 may be at least partially included in the processor 11 executing corresponding program instructions.

The processor 11 at the client 10 may be internal or external thereto, and executes a program 15 adapted to predetermined operations. The processor 11 has access to the memory 14 in which may be stored at least one sequence of code instructions comprising the program 15 and the data structure 16 for performing predetermined operations. The memory 14 and program 15 may be located within the client 10 or external thereto.

The program 15 can include a separate program code for performing a desired operation or service, or be part of a module of a larger program providing the service. The program 15 may also include a plurality of modules performing sub-operations of a service, as described further below.

It is understood that the processor 11 may be adapted to access and/or execute a plurality of programs 15 corresponding to a plurality of services/operations.

An operation or service rendered by the program 15 may be, for example, supporting the user interface, performing e-mail applications, setting up financial transactions, etc.

The input means 18 of the client 10 may include standard input devices such as a keyboard, mouse, or a speech processing means.

The storage device 20 stores at least one data file, such as text files, data files, image, audio, video files etc., in providing a particular service for a user. The data storage device as storage means 20, may be for example, a database, including a distributed database connected via a network 22, for example. The storage device 20 may be connected to the server 30 and/or the client 10, either directly or through a communication network, such as a LAN or WAN. An internal storage device, such as 20, or an external storage device 23 is optional, and data may also be received via, for example, a network 22, and directly processed.

If a server 30 is used in a non-distributed environment, the server 30 would include a processor 24, having a CPU 25 which is a server data processing means or mechanism and an I/O interface 26, but may also be constituted by a distributed CPU 25 including a plurality of individual processors 24 on one or a plurality of machines. The processor 24 of the server 30 may be a general data processing unit, but preferably a data processing unit with large resources, i.e., high processing capabilities and a large memory for storing large amounts of data.

The server 30 also includes a memory 27 with program 28 having a data structure 29, all connected by a bus 31. The bus 31 or similar connection line can also consist of external connections, if the server 30 is constituted by a distributed system. The server processor 24 may have access to a storage device (i.e., storage device 32) for storing preferably large numbers of programs for providing various services to the users, i.e., for performing various financial operations as desired by users operating clients 10.

The data structure 29 may include a plurality of entries, each entry including at least a first storage area that stores a monetary or exchange value of a financial transaction, and a plurality of second storage areas that each store an identity of a party to the financial transaction and an amount for which the party will execute the financial transaction, the program confirming additional parties and amounts for which the additional eligible parties will execute the financial transaction until a total amount for which the parties will execute the financial transaction is equal to the monetary or exchange value. The data structure can also have alternative embodiments including that associated with the match codes or other stored information as one of ordinary skill in the art would appreciate from the following descriptions.

The server 30 may be a single unit or may be a distributed system of a plurality of servers 30 or data processing units, and may be shared by multiple users in direct or indirect connection to each other. The server 30 performs at least one server program 28 for a desired operation, which is required in serving a request from the client 10.

The communication link 33 from the server 30 is preferably adapted to communicate with a plurality of clients 10.

The server program 28 may relate to providing a number of operations related to providing financial services to a user, such as allowing a user to assemble a financial transaction, to test a proposed financial transaction, to ensure that each transaction request is codestamped with a unique transaction number and tracked securely through the financial system, etc.

Note that at times the system of the present invention is described as performing a certain function. However, one of ordinary skill in the art would know that the program is what is performing the function rather than the entity of the system itself.

Although aspects of one implementation of the present invention are depicted as being stored in memory, one skilled in the art will appreciate that all or part of systems and methods consistent with the present invention may be stored on or read from other computer-readable media, such as secondary storage devices, like hard disks, floppy disks, and CD-ROM, a carrier wave received from a network such as the Internet, or other forms of ROM or RAM either currently known or later developed. Further although specific components of the system have been described, one skilled in the art will appreciate that a system suitable for use with the methods and systems consistent with the present invention may contain additional or different components.

It is noted that the above-described features and processing operations may be realized by dedicated hardware or may be realized as programs including code instructions executed on data processing units. It is further possible that parts of the above sequence of operations are carried out in hardware, whereas other of the above processing operations are carried out using software.

Further, methods and systems consistent with the present invention are carried out by providing a user selection means, including selection buttons, in a menu, dialog box, or a roll-down window of an interface provided at the client, and the user may input commands through a keyboard or the like. The selection means may be constituted by a dedicated piece of hardware or its functions may be executed by code instructions executed on the client processor, involving a display unit for displaying a selection window and a keyboard for entering a selection, for example.

Program Modules

One embodiment of the program (at least either 15 or 28 or both) of the present invention includes four major program modules: Vector-flow Topography (VfT), Code-Division Multiple Transaction (CDMX), Spread Vector Resolution (SVR), and Matrix Quartermaster (MaQs). Each program module is independently capable of supporting various new financial services, and can be used individually in other applications; but connected together, working in tandem and with other program modules further described below, they create the distributed capital system platform consistent with the present invention.

However, one of ordinary skill in the art would know that there may be additional modules or programs that could be used to achieve the features of the present invention, or that the program modules could be combined into a single program for the same purpose. Further, the features and processing operations of the five major program modules may be realized by dedicated hardware, or may be realized as programs including code instructions executed on data processing units. It is further possible that parts of the above sequence of operations are carried out in hardware, whereas other of the above processing operations are carried out in software.

As stated above, the following program modules consistent with the present invention, may be run by the parent program of the distributed capital system architecture, and can be part of a client-server environment, or part of a distributed platform of client computers.

1) Vector-Flow Topography Program Module

The Vector-flow Topography (VfT) program module runs the user interface and enables the streamlined construction, testing, and management of transactions of all types. The VfT module allows a user to rapidly construct financial transactions with visual objects arranged and connected on an on-screen Transaction Workpad, and then test the proposed flow of instruments and funds, payments, debits, account balances, etc. prior to execution. The VfT program module also receives and displays various data, confirmation, and other indications to the user following a transaction or at any other time after initial entering of transaction specifics into the system.

Thus, users can construct and save transaction events, and reuse them as often as desired. The VfT program module will allow the user to easily access the history of all executions and testings of the constructed transactions, which information is to be tracked by the CDMX program module, see below). In this way, the user may review any and all details of any of his/her transaction events at any time.

While capable of assembling and executing simple transactions like bill-payment, etc., the VfT program module also handles sophisticated, complex, or so-called "compound" transactions, where "compound" is defined as constituting multiple, or compounded, interim steps or transactions to achieve the desired commercial result of position. The VfT program module's "drag and drop" capability allows compound transactions to be easily assembled, tested and executed.

2) Code-Division Multiple Transaction (CDMX) Program Module

The CDMX program module runs the tracking and accounting which makes the distributed capital system of the present invention possible. The CDMX program module handles two types of data simultaneously (financial and communications) securely and privately, preserving and using the relationship between the two dimensions, but nonetheless retaining complete separation, confidentiality, and anonymity of the transmissions. The CDMX program module thus employs both a communications protocol and a transaction protocol, and monitors and matches precise data requirements, allowing random-party connections to be achieved (which is handled by the algorithms in the SVR program module, see below) completely random parties according to a macro sense of counterparty matching. The CDMX program interfaces with the multiple-mean matching engine (the SVR module—see below) to complete the random-party matching, attaching appropriately devised tracking codes to the amounts in the DCS of the present invention. Even when the financial vectors are broken up into different, smaller components, or whether they are recombined later, the CDMX program module keeps track of all the components as they go through the system within a zero-sum accounting environment.

The CDMX program module will track four types or categories of user-programmed transactions: Real Time, Passive, Fixed, and Installment. Real-time means instantaneous processing, whether at execution of the transaction request or when set times have expired; Passive means that the user does not determine the timing or amount of the processing, and the system executes the request at random and/or optimal times before the user indicated time limit expires; Fixed means the user has indicated a set of requirements for execution, and that the transaction will not occur unless triggered by the requirements being met; and Installment consists of combinations of the other three types (can be the same transaction taking place at predetermined times, for example), and when entered into the system are disaggregated into the smaller component transactions, each tagged with a special parent code linking all installments to the overall parent transaction.

The protocols for CDMX module were designed so that the program can unwind and trace backward to the originating account, any transaction, regardless of whether it is a Traditional Simple event, or a Collaborative Compound event (described in more detail below), with every transaction detail preserved and recorded by the CDMX module ledgers in the appropriate databases. Even in a distributed environment, where Distributed Funds Transfer (DFT) transactions are abundant and intended target accounts are not immediately visible, the CDMX program module allows the CDMX ledgers of the program, or even a very small subset of distributed clients/servers/servents, to reconstruct the dispersion post facto, achieving a rewinding review of the funds transfer networks, to determine the details (i.e., what, how, how much, who, etc.) of any Distributed Capital System transaction.

The information that the CDMX program module records, will be preserved in encrypted form even at distributed clients/servers/servents, unavailable to anyone except by a deliberate act by the system monitors, such as due to official legal action like a subpoena, etc. The CDMX program module may also contain a built-in function that resides on the distributed devices, that automatically sends archived CDMX data for reconciliation, to a centralized collection/monitoring server, etc.

The CDMX program module of the present invention executes the following functions: a) Codestamping, b) Codecycling, and c) Codematch Aggregation.

Note that the Codestamping and Codematch Aggregation sub-programs have procedural relationships with the Matrix Quartermaster module (further described below), and the Codecycling sub-program executes an iterative process that involves repetitive exchanges with the Spread Vector Resolution program module (further described below).

With respect to Codestamping, Codestamping occurs whenever any NEW activity is initiated. All transaction event requests that enter the system are codestamped using the Codestamping sub-program, and the program assigns a unique transaction number that will be the parent code that relates the requested transaction to the user who entered it. This unique transaction number is inclusive of some unique identifier of the person or account initiating the transaction, as well as a coding unique to the transaction.

Note that in Collaborative transaction events (described below), the program may duplicate the transaction number (since there is more than one participant in a transaction (i.e., counterparties)), but the parent codestamps will each be unique since any transaction number will have a unique user-account identifier attached to it.

The program also executes a Codecycling function, that tags matched pairs in a Collaborative transaction, each time the SVR program module (see below) completes (resolves) a counterparty match. If Codecycling is required for the type of transaction requested, the Codecycling program module will create several additional child-codes to track each of the component amounts that are allocated and directed according to the Spread-Vector Resolution (SVR) program module, which are traceable to the parent transaction. The recording may be preserved in encrypted form by the program.

The program also executes a Codematch Aggregation function whereby the CDMX program module aggregates all available transaction amounts for a single user or account, in order to net the amounts or optimize activity before passing the data to the Matrix Quartermaster (MaQs) program module for execution.

Note that Codecycling is not necessary to handle either of the Traditional Simple or Traditional Compound (further described below) transaction types.

3) Spread-Vector Resolution (SVR) Module

The SVR program module takes an input of multidimensional (i.e., vector) objects, and automatically isolates each dimensional quantity, processing them independently before execution occurs. The advantage of isolating dimensional quantities before processing, is that efficiency in each dimension may be captured more fully, rather than just capture the efficiency available or accessible at the intersection of multiple dimensions treated together. In other words, the SVR module can get at efficiency that is otherwise locked up in the complexity of constrained (i.e., multidimensional) objects.

Thus, conventionally two payments from two unconnected users, cannot be treated together, because the single dimension of the payment amount is complicated by the other dimensional variables of those payments, such as identity of Payor and Payee, which make the two payments as multidimensional objects quite unrelated to each other. The SVR program module however, can isolate each dimensional value, and process them separately. In practice, this means that it executes the inclusion of completely unrelated parties together in the same netting summations. It is a matching utility, including various algorithms, that achieve efficiency in assigning counterparty matches. The SVR program module handles digital representations of financial vectors (i.e., which can be combined and manipulated mathematically yielding for example condensed or combined vectors that resolve all commitments of the component vectors), intaking them, outputting this information to a system (described below) which can account for everything accurately, and then execute the resolved vectors.

The SVR program module is designed specifically to operate where counterparties in a Collaborative Compound transaction (see below), are not equally balanced, i.e., when there is an unequal balance of value between the two sides of a transaction environment. In these asymmetric situations, the SVR program module processes transactions without delay, resolving the asymmetry via vector-flow particulation. As is described in greater detail below, SVR matching allows the zero-sum "market-mechanism" of large liquid markets with theoretically large numbers of participants to be brought to limited-participant transaction environments. Although on a per-transaction level non-zero-sum accounting may instantaneously be evident, the macro vector flow treatment of the system transaction universe will adhere to zero-sum principles and as successive flow is processed, all prior transactions will come into zero-sum compliance, thus there should be an exact matching by the program, leaving no amounts resident on either side.

The CDMX program module keeps a macro ledger which is complete when there are no remaining values in the system to be matched in a given period.

In this way, the SVR program module executes a netting function, funds transfer algorithms, currency exchange algorithms, consolidated accounting algorithms, loan syndication, and ATM-sharing, etc. (further described below).

Algorithms Used in SVR Program Module

Figure 4:
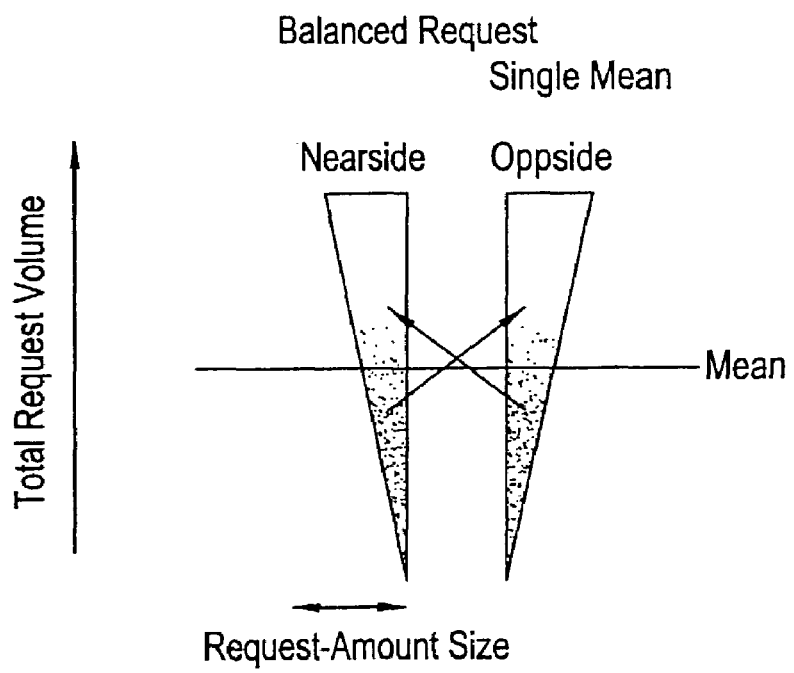
FIG. 4 is a diagram showing a balanced request with single mean by the Spread-Vector Resolution program module in fulfilling a financial transaction, according to one embodiment consistent with the present invention.

In detail, one potential algorithm used by the SVR program module for filling a Collaborative Compound transaction (see below for detailed description) is shown in FIG. 4, where there are counterparties requesting exchanges of yen to dollars, and dollars to yen.

In FIG. 4, the Nearside denotes a reference used to explain the exchange process of this potential algorithm. Nearside is a pre-process state. Since every exchange is composed of a currency pair, the Oppside is the reference to the requests in the target (counterparty) currency which will be used to execute exchange transactions. Thus, optimal efficiency occurs when the total number of Oppside requests required to fill a nearside request is minimized. The program prioritizes exchanges on this basis. Note that active-seeking class amounts are preferably filled with a single Oppside amount.

Thus, upon entry into the system, the SVR program module will automatically classify the amounts to be exchanged as active-seeking, when the amount is below an arithmetic mean, for example, or passive-fill, if the amount is above the arithmetic mean. Note that this arithmetic mean constantly changes as the program recalculates the arithmetic mean depending on the amounts of vectors/funds flowing through the system.

Note that all requests are characterized by the SVR program as real-time requests at or near the time they are actually processed. Since there will be a population of passive requests, which come from user-programmed transactions that don't have single-point fixed time (i.e., on some date) or event-triggered execution specifics (i.e., when the Dow Jones index reaches 10,000, for example), but rather time-period limit specifics (i.e. by some date), an active reclassification requested by the program may call upon this storehouse of passive transactions, to convert some or all to real time, processing them to bring liquidity to the system, and attempt to create a seamless progression of moderated volatiltiy (i.e., consistent liquidity).

Figure 5:
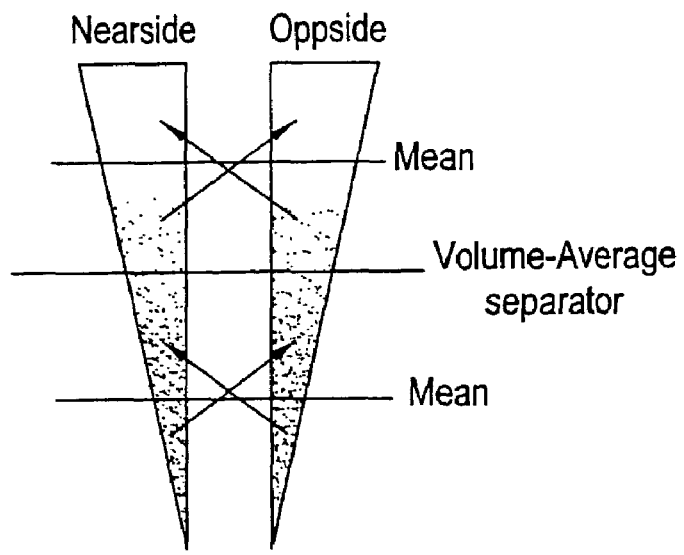
FIG. 5 is a diagram showing a balanced request with multiple means by the Spread-Vector Resolution program module for fulfilling a financial transaction, according to one embodiment consistent with the present invention.

Further, in some cases, the program may have multiple means and provide a volume-average separator to distinguish between the two means (see FIG. 5). For example, when the volume of the transactions increases enough to activate a preset trigger, the program will accommodate this increased vector flow by creating a new parallel channel to process the volume. The trigger bifurcates the volume into sections, each one acting like the previous single-divider program function (see FIG. 4). When the larger vectors in the upper half as shown are resolved and the matches occur, remainders will drop into the lower half, and as the volume decreases, a preset trigger is tripped and the program will remove the separator, returning the program function to its original single-divider state.

Active-seeking amounts will target passive-fill amounts in the respective target currency. No two potentially matchable requests can actively seek each other. If an amount is originally classified by the program as active-seeking, the program will seek to fulfill the request with a single counterparty match amount (see FIG. 4). If an amount is originally classified by the program as passive-seeking, then it will be reduced by active-seeking amounts until it falls below the mean and is reclassified to become an active-seeking amount itself, after which it is filled and the transaction is completed.

Figure 7A:
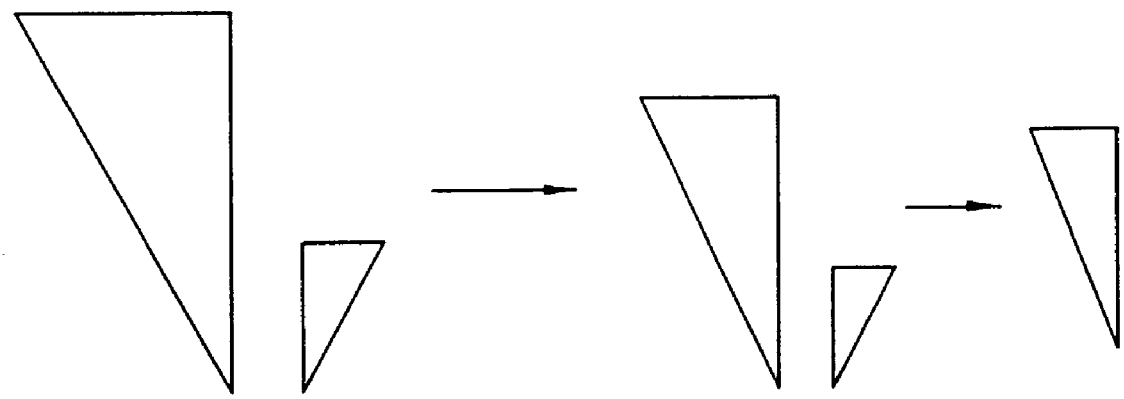
FIG. 7A is a diagram showing an all-seek opposite-side match being processed by the Spread-Vector Resolution program module for fulfilling a financial transaction, according to one embodiment consistent with the present invention.
Figure 7B:
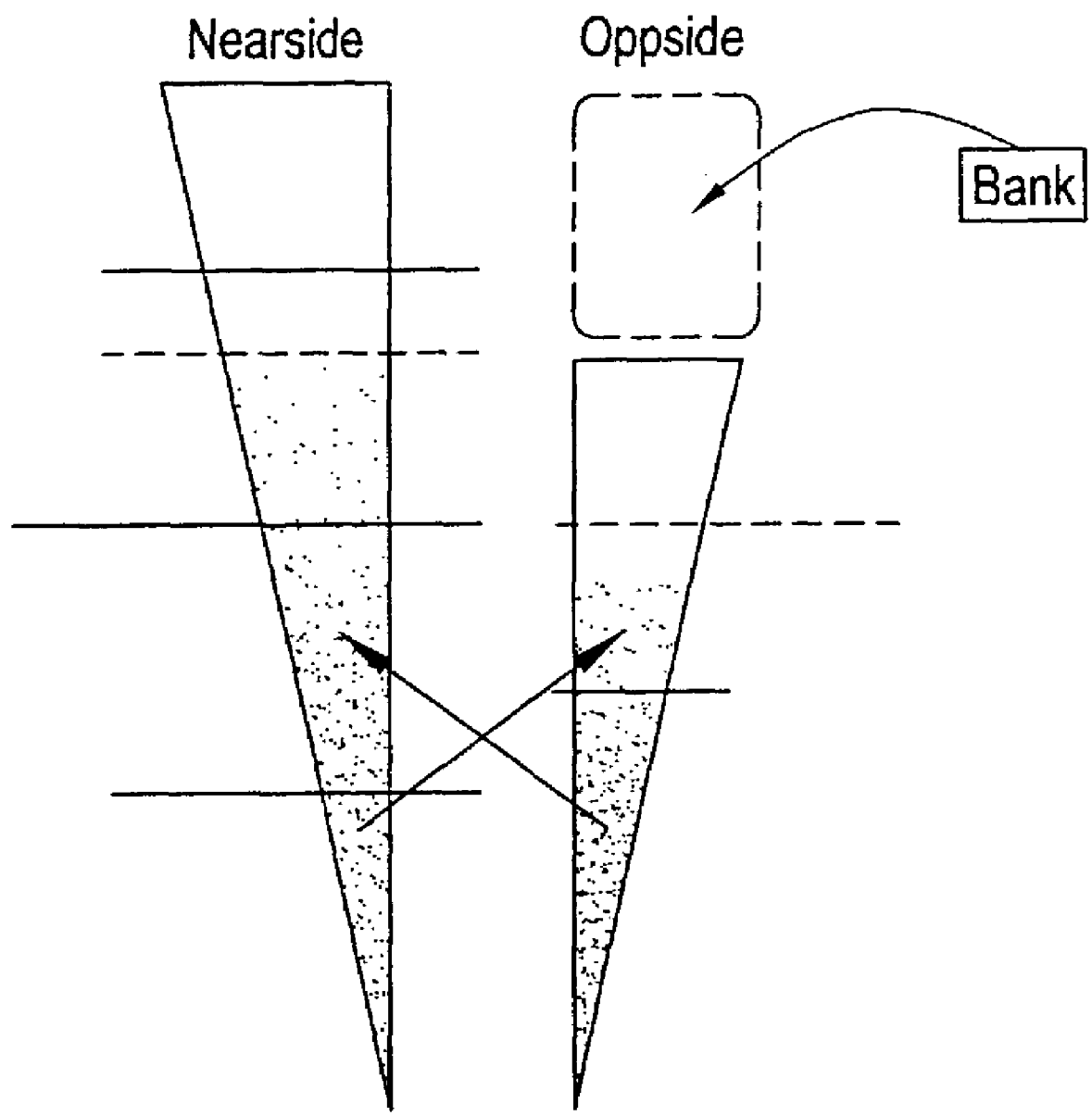
FIG. 7B is a diagram showing a capital infusion into the system to be made available to the Spread-Vector Resolution program module, according to one embodiment consistent with the present invention.

Thus, the matching of a request to exchange currency can be matched using several algorithms—with the active-seeking transaction on the Oppside being matched from a passive-fill transaction on the Nearside, or vice-versa, or by a staggered linear match, or an angled Nearside all seek opposite-side match (see FIG. 7A).

In normal activity of markets and trade, sometimes there occurs a disparity in the vector flow. Just as there are instances everyday where sellers are offering something at some price E but the abundance of buyers are only willing to pay a much lower price D, the lack of liquidity visible to the system from direct participants may be represented as a pair of triangles, with one side much larger than the other, indicating a large volume of vectors available (i.e., "sellers") with too few counterparties (i.e., "buyers") on the other side.

This imbalance may be in reference to trans-currency events, or domestic events that are structured as directional coutnerparty matching, or any number of other situations where one side of a transaction type is more abundant than the other. The SVR program module will take an inflow of self-selected vectors, the self-selection guaranteeing that all vectors have at least one variable which is the same. For example, in domestic Distributed Funds Transfers, the currency is the same for all vectors, and it is the direction variable that is match-paired. In currency exchanges, direction is not important and so the match-pair basis is the currency-pair.

Figure 6:
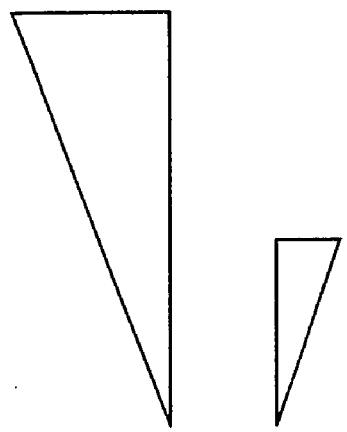
FIG. 6 is a diagram showing an asymmetric matching being processed by the Spread-Vector Resolution program module for fulfilling a financial transaction, according to one embodiment consistent with the present invention.

In the event of this kind of disparity, the system will process as much as it can, which means until all available vectors on one side have been processed, leaving the imbalance in an empirical state with zero available vectors on the opposite side (see FIGS. 6 and 7A).

When this happens, it could be due to a macro-world liquidity crunch, or more likely, it could be due to a small user-population (at least when the system is still being introduced and there simply aren't enough people signed up to ensure that liquidity won't be an issue). In this event, the program of the system could be preset to direct the remaining one-sided vector-flow toward more traditional channels where liquidity can be provided by an interbroker for example, and the owners of those vectors can get their transactions fulfilled (i.e., a capital infusion from traditional channels—see FIG. 7A). In this way, the user may not recognize the switch of liquidity pools, from system participants to third-party big-bank interbroker/trader.

Accounting Netting

In the context of corporaet enterprises, for example, which entities have transactions and financial relationships with many counterparties, when an enterprise has a multitude of transactions during a set period of time, there will likely be liabilities (negative) and receivables (positive), and often there will be positive and negative transactions with a same counterparty. Rather than net the same-party transactions to get a single result for that one relationship, the SVR program will defer the specific netting process, and instead, sums all parties' period-negative and period-positive values (across all parties that the enterprise has to deal with). Thus, direct same-party netting is preferably bypassed in favor of setting the stage for macro spread-netting amongst all parties in the transaction universe.

Transaction Spread-Vector Netting (SVN)

Spread-Vector Netting or Distributed Direct Exchange, is a multi-party compaction, and is possible when any party, anywhere, is transacting. The SVR program module when executing the SVN function, can handle any and all transaction sizes, individual or institutional. A much larger number of participants is possible than with conventional netting.

In SVN, multiple parties are always populating the spread net, and cross-liabilities and linked settlement are not necessary. Conventional netting demands both a fixed number of participating parties, as well as a fixed time period over which to net. Spread-netting requires neither of these. Complexity is not likely correlated to the number of parties, and risk is likely to be inversely correlated to the number of parties.

Figure 8A:
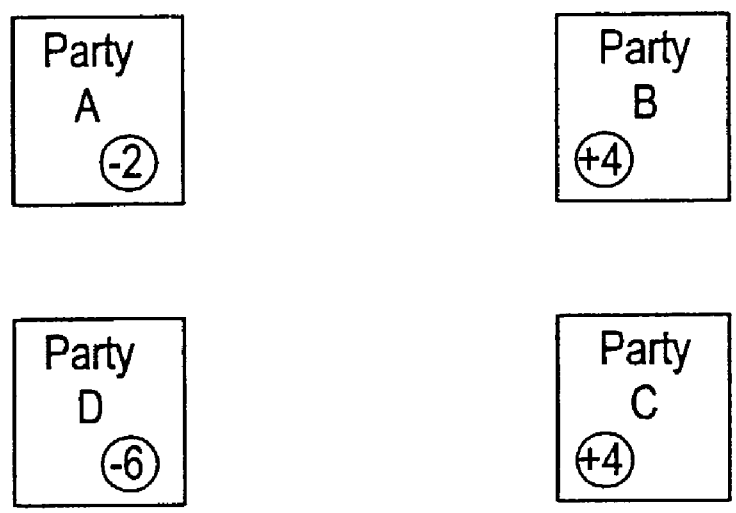
FIGS. 8A and 8B show Spread-Vector Netting according to one embodiment consistent with the present invention.
Figure 8B:
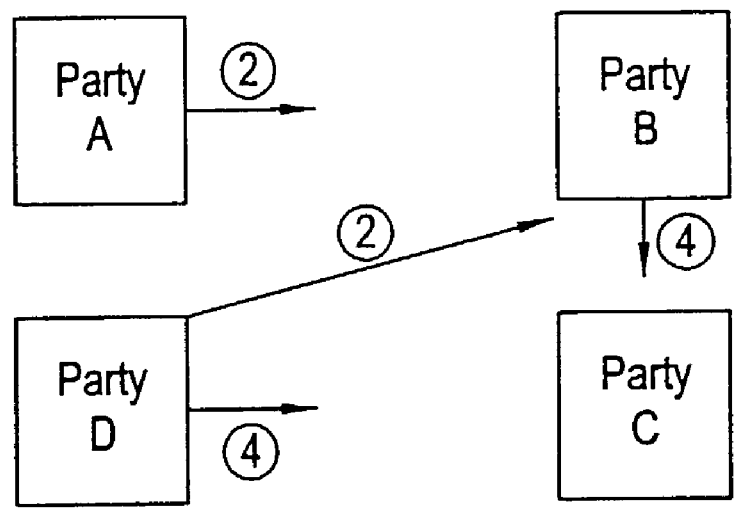

To spread-net out a liability circle (which is defined as a number of debtors in a circular arrangement such that remittance of payment to fulfill the debt obligation may halt as each debtor in the circle waits to be paid) in SVN, the program nets as is described under CPN, but instead of maintaining the vector relationships as is, the program redirects any vectors necessary such that the net result in/out for each Party is the same absolute value that it was prior to netting (see FIGS. 8A and 8B). In tracing the transactional directions of Party D owes Party A, and Party C owes Party D, after spread-netting, the program allows Party D to compensate Party C and Party B—a complete opposite of the transactional direction for the former, and a completely new relation for the latter. Spread-netting appears to deliver more than a 50% improvement in risk-reduction over conventional netting. Thus, the total transacted is 34, with the netted physical settlement being 8, and the reduction in amount at risk being 26/34=76%.

4) Matrix Quartermaster (MaQs) (aka the Distributed Banking Lending Credit (DBLC)) Program Module The Matrix Quartermaster (MaQs) program module is the negotiating manager that takes conclusive aggregate transaction information as an input, converts that information to execution instructions, and then initiates the execution of the transactions over whatever infrastructure is required, and uses whatever protocols that already exist, and deals with multiple accounts and systems to ensure that all parties' transactions are achieved. The MaQs program module works with the CDMX program module or similar tracking-modules, to activate the execution of capital movement.

The MaQs program module carries out the instructions over existing infrastructure. The MaQs program module holds or incorporates various API's that allow it to interact with the rest of the financial and banking world. This includes a vast range of entities, including, for example, the Automated Clearing House (ACH), the Federal Reserve Fedwire system, ECN's such as Archipelago, Instinet, and Island, Credit Card companies, banks, utilities companies' accounts, Web Merchants, etc.

The MaQs program module packages the execute commands assembled by the Vft program module and the user-account information provided by the CMDX program module, into proper and formal execution instructions according to the infrastructure being used to carry out the transaction. Since multiple infrastructure networks may be used, the MaQs program module is able to package transaction commands into a variety of formatted execution instructions.

Thus, the MaQs program module executes the transactions that are created, programmed, resolved, or otherwise in the distributed financial system of the present invention. The MaQs program module is the link to the greater network of markets, product and service providers, and of course, customer accounts at banks and all other relevant entities (such as utility companies, insurance companies, etc.). In the event that the system has its own accounts involved in operations (as may be necessary to implement certain functions or services, such as ATM Sharing or the Investment Engine, see below), the MaQs program module will take capital vectors out of the system and supply capital vectors into the system.

The program includes bridges between the present system and other systems in the market (i.e., stock market funds, New York Stock Exchange etc.), such that the program will be able to pass data retrieved from accounts and markets through to the system for display and manipulation. No new secure-system infrastructure required.

Bank Multiplexer API

The following describes an example of one kind of API that may be component to the MaQs program module. Instructions or market data-feed which enter the system and instructions which are executed and handled for distribution to the user bank accounts, are handled by the Bank Multiplexer program. "Multiplexer" is used here to indicate that the same API may in practice be used duplicatively to simultaneously connect to more than one account or institution. Note that the program of the present system does not handle transactions exclusively in serial order, but rather, will execute multiple transactions at the same time.

The Bank Multiplexer program for example, reads the identifier codes on each processed transaction amount, and translates these into various financial network instructions, for example direct-deposit and direct-debit instructions to be sent to the bank accounts registered with the system. It is possible that when passive requests enter the system, an additional code will direct the program to draw down these programmed transaction amounts at different times, and deposit them into a system-owned account, for use in the investment engine until needed to execute the programmed transaction (see further below). The program, which runs the investment engine, will employ the aggregated funds as needed, at the end of which it will remit the original exchange-matched amounts to the appropriate end-user counterparty accounts, retaining the profits in the system account for further use.

5) Code Division Multiple Transaction (CDMT) Program Module

Code-Division Multiple Access is a telecommunications technology specifically designed to maintain the interlinked connection (i.e., a voice/data transmission) between single source-sink pairs interlaced with lots of others, for the specific purpose of increasing bandwidth over the same communications infrastructure. Code-Division Multiple Transaction (CDMT), working in conjunction with Spread Vector Resolution, does not concern telecommunications bandwidth provision, but rather the matching of fungible-trade counterparties, and furthermore, is distinguished by the fact that it does not fix the counterparties on each end of transactions for the entire duration of a transaction (unlike CDMA which can only take a set input, delivered to a set output for the entire duration of a connected session, eg., a phone call, cannot and does not randomly switch between unknown parties during the middle of a call). In fact the two technologies CDMX and SVR working together can link, switch links, and add new links on either counterpary side to a multiplicity of random counterparties, who are otherwise unrelated and may remain anonymous if desired.

Figure 10:
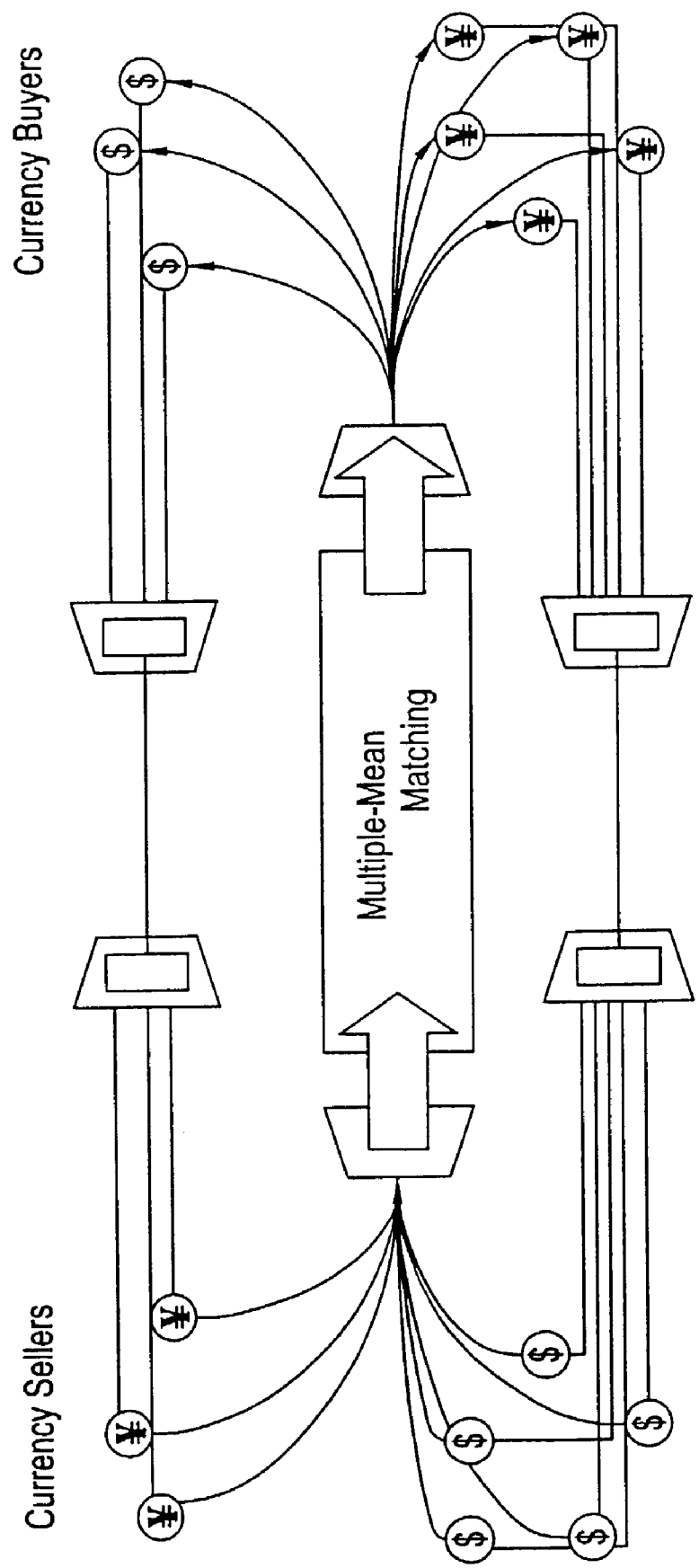
FIG. 10 shows the function of the Code Division Multiple Transaction program module according to one embodiment consistent with the present invention.

However, the Code-Division Multiple Transaction (CDMT) program module of the present invention, working in conjunction with SVR program module, does not concern telecommunications bandwidth provision, but rather executes the matching of fungible-trade counterparties, and furthermore, is distinguished by the fact that it does not fix the counterparties on each end of transactions for the entire duration of a transaction (see FIG. 10).

In fact, the program utilizing the CDMX and SVR program modules, working together, can link, switch links, and add new links on either counterpary side, to a multiplicity of random counterparties, who are otherwise unrelated and may remain anonymous if desired.

Figure 9:
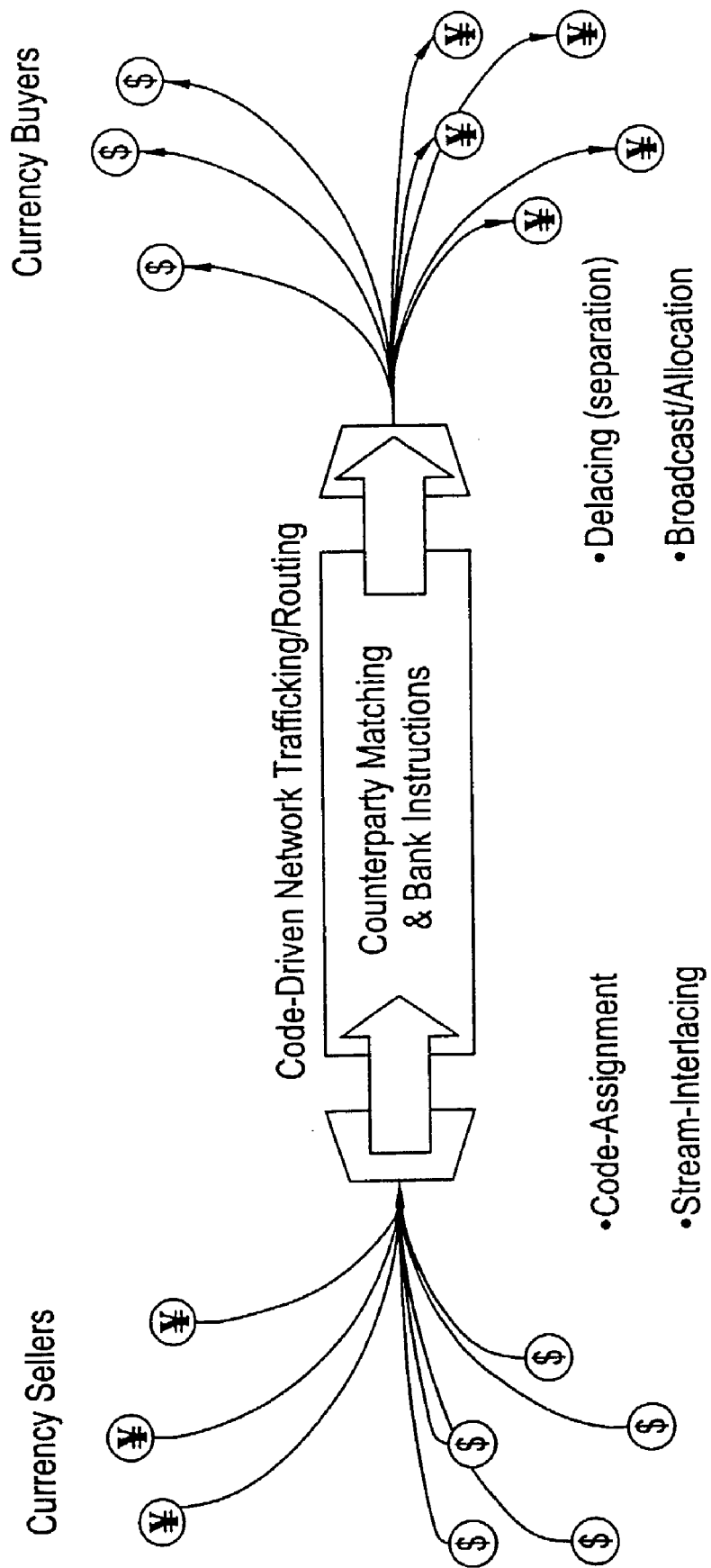
FIG. 9 shows the function of the Code Division Multiple Transaction program module according to one embodiment consistent with the present invention.

Because financial transactions are conducted in a zero-sum framework, every counterparty pair must consist of a balance of value or the transaction cannot be considered valid, and in practice, won't occur. The program via the CDMX program module, makes it possible for example, for anonymous buyers and sellers to be automatically matched simply based upon price (i.e., when there are a multitude of buyers and sellers at the same price, the system will automatically code-divide the incoming trade-requests such that the zero-sum can be spread to a non-symmetric number of counterparties) (see FIG. 10). Hence, five sellers of US dollars (who are also buyers of Japanese yen), are served by just three counterparties (see FIGS. 9-10). There is no need for any of the counterparties to know or be aware of one another.

Sign-Up

First, a participant must sign up as a system member. In general, to sign up an create an account with the system of the present invention, the participant would simply have to have an e-mail account in order to go through a standard opt-in procedure, initiating the username and password at the website, for example, and having that website take basic user information in order to create an account file, then sending the opt-in verification request to the supplied e-mail address.

Upon verification the user account would become active and the user could either download a distributed client application, and then go about inputting various account and financial data to give the new distributed capital account access clearance to any $3^{rd}$ party accounts the user wanted to be able to manipulate from within the distributed capital account, or, the user could feed the same kind of information to a centralized server for the same purpose.

However, the user may not be provided with complete access to the system at sign-up, but rather, may have to proceed through staging, with minimal functionality available to the user upon initial signup (such as the ability to execute traditional simple transactions, and limited traditional compound transactions), but additional more powerful tools (i.e., collaborative transactions) becoming available through demonstration of awareness of, familiarity with, and or adherence to, financial regulations, risk profiles, investment structures, tax rules, etc., perhaps via online seminars and tests, according to the number and value of transactions executed, and proof of sophisticated investor status, etc.

For Enterprise applications, the present system would support multiple access passwords and user-clearance levels, such that for example a CFO would have Master privileges and full functionality over the Corporate system account, and therefore the greatest freedom to manipulate and manage assets of the corporation, while the lower-level finance personnel may have access to the same accounts for visibility reasons, but without the Master privileges to manipulate or manage.

This approach means bringing the very advanced art of challenge-ramp design so visible in video-games, to financial services provision. By integrating a challenge-ramp that incorporates educational or problem-solving interaction, as well as typical user statistic hurdles, it is possible to create an interactive environment built around financial services.

The credit rating system explained further below, may drive a classification system, in much the same way that in role-playing games, greater powers or strength (such as a more powerful sword, or greater wizardry spells) accrue to users who accumulate certain artifacts or techniques along their journey. Thus, the present system may classify users according to Financial Skill, Capital (or Asset) Power, etc., as well as credit or Integrity. As the population of users increases, there could be categorical rankings available to the population for reference; so that as the broad community matures, the reputation of users would take on the significance of credit scores or Moody's™ ratings, etc.; however, with the power of the credit rating management being squarely in the hands of the users and the community, not a secretive $3^{rd}$ party organization such as Equifax™, et al.

Another alternative for initial signup, is that an official agency could verify the user, which would require an official identify and other personal information such as a social security number.

System Registry

Once the user becomes a member of financial system of the present invention, the user will be able to register his accounts, such as bank accounts, utilities accounts, credit card accounts etc., which he wants to have available for inclusion in transactions he may want to build, test, and/or execute.

Various different methods of loading financial account data and access into the present system are possible. For example, a personal account aggregating service uses an assistant that travels with the user to each financial account website, which can capture the login and password information, to make it available to the user at the personal aggregating service account.

All existing systems to date involve accounts that are managed by the user, and accessed by the user. In no known instance do users of these systems grant access and send such access privilege to other users. The present invention does intentionally however enable this multiparty access and granting of access to transaction events.

For example, in collaborative transactions, account access or even single transaction access, is received by users who have been granted such participation privilege, and it becomes available to the user with no specific action required of that user. Of course the user has the right to refuse the granted privilege, but gaining access privilege was something that occurred at the instigation of other system users. While it is expected that various financial service providers increase functionality and grant access to that functionality within the users' existing accounts, nowhere is there a financial services platform that is designed to facilitate system users interacting with each other as collaborating participants, granting permissions to each others accounts and transactions.

Financial Transactions Types—Four Major Embodiments

The methods and systems consistent with the present invention encompass four major types of financial transactions: Traditional Simple, Traditional Compound, Collaborative Simple, and Collaborative Compound, which will be described generally below, before being further described in more detail.

Traditional Transactions

Traditional Simple

Presently, financial services are predominantly pursued in the context of one-to-one relationships between the financial service provider and the customer or client. One-to-one commercial relationships, and the transaction events that occur in their context, are fairly straightforward: There is usually one seller/provider, one buyer/user, and one form of purchase currency or credit, all arranged in a simple, linear equation such as: buyer purchases goods from seller, or, user pays credit-card company.

Figure 22A:
FIGS. 22A-22D are diagrams showing four major types of transactions.

These financial interactions and the services that support them are what the system of the present invention designates as Traditional Simple transaction events. Examples of Traditional Simple transactions (see FIG. 22A) would be the purchase of stocks from a broker, or logging onto a website and making a purchase, or paying a credit card bill, etc. The essential relationship between a Customer and Provider has not changed even though the on-line aspect of the transaction has made it theoretically easier and faster. In fact, single users connecting to financial services, one company at a time, fail to use the real network-advantage of a global computerized network such as the Internet.

Although the present invention is designed to support network collaborative transaction services that leverage the real network-advantage of multiple connected systems, users, providers, customers, buyers, sellers, etc., Traditional Simple transactions can be easily performed using this distributed financial system, since the user using the present invention is provided the omniscient perspective of being able to see and manipulate the involvement of all accounts in his/her transaction universe, whereas current methods and systems place the user at the node perspective of just one of the participants of the transactions, such as at a credit-card website, or a bank website, etc.

Traditional Compound

Figure 22B:
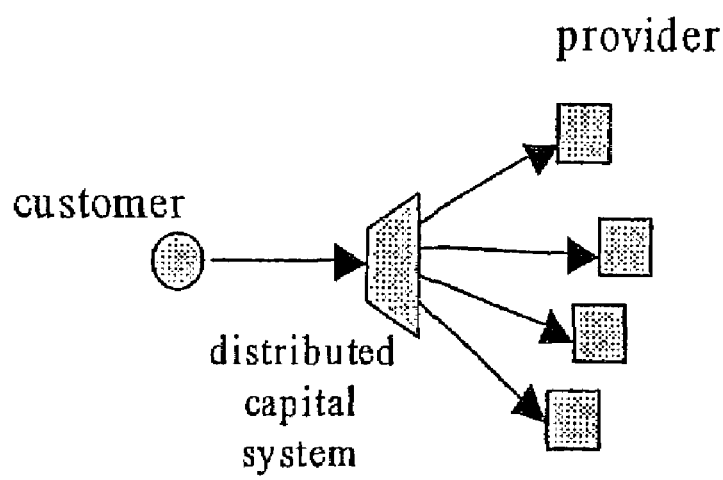

In a Traditional Compound transaction (see FIG. 22B), a user can manage, integrate, and program several Traditional Simple transactions at the same time. For example, the user can manage and integrate the user's Credit Card bills along with the user's Home Loan, Utility bills, Stocks, Bonds, online purchases, and anything else that involves a transaction the user wishes to make. A Traditional Compound transaction could include obtaining a new home-equity loan, and using the loan to pay credit card bills and an auto-loan, or a child's college tuition. Currently, there is only one way to take care of these kinds of decisions: they must be executed one at a time, and the user must gather data from various sources, then have the background and skill to understand how to compute and then achieve the various optimal financial situations via an ordered combination of a multitude of one-to-one individual transactions, which complexity is discouraging to most consumers. To clarify, in this situation where the user of various financial services wishes to avail him- or herself of a multitude of available services (or check to see if s/he should) in a combined or integrated fashion, such as consolidating a bunch of debts held by various 3rd parties, there is no existing automated support service that can facilitate a user in assembling a clear and straightforward financial execution strategy for his or her own specific situation. Because users of financial services have no way of getting support for the Traditional Compound transactions that they need to execute in order to manage their many commitments and responsibilities, users are left to try and artificially assemble compound transactions by arranging and timing a series of coordinated Traditional Simple transactions. Some existing services can aggregate multiple accounts' information in one place and interface, but no existing system lets the user manage, integrate, and program the interaction of multiple accounts. The present invention however, enables this.

For business users, the user can assess the interplay between the various financial activities and responsibilities of the company, and can for example, make salary payments, vendor payments, refinance, obtain loans, etc., automating where prudent, and capturing unprecedented data (which amounts to visibility of the corporation's financial status) that enables better decision-making. Thus, vendor billing can be performed next to treasury management (i.e., currency management, credit hedging), or revenue streams etc., all within the same interface. Traditional Compound transactions allow users to build the interplay between their various financial arrangements, receivables and liabilities (cash-flow management, etc.) and obligations, and schedule as well as test transactions to assess the results as they impact the whole, not just a single account or relationship.

For example, larger enterprises tend to have separate groups, each that authorize, receive, and pay for corporate purchases. This separation makes for delays in processing the approval both in purchasing as well as payment as the disparate groups must rely on repeated communication in order to assemble the aggregate information necessary to reach approval. Traditional Compound transactions can be assembled to streamline this invoicing process with each division or group logging in or using e-mail to advance or trigger the progression through the process toward a final approval and remittance order issued and managed by the corporate financial department. In the same way that simple systems now allow alerts to be set for some variables, resulting with an e-mail or other notice sent to the user, the senior party responsible for, in this case, an invoice, can orchestrate various triggers along the process of invoice handling, and allow disparate users in various divisions (for example, the corporate mailroom), to approve of receipt of goods and quality of goods (i.e., correct invoiced part numbers and fitness of goods according to shipping roster), while another group or division (the specific team using the goods) approves of the accuracy (i.e., the correct part as required for the project), etc., before the accounting department is released to remit payment. This control can be implemented throughout the corporate structure, allowing the enterprise to have much greater and faster data on the financial state of the company.

In addition, the user can set the parameters of the integrated transactions (i.e., stocks to be sold when they reach a certain value, or stocks to be sold at a certain time or day etc.). Thus, the transactions can be automatically and remotely set, and the user notified when the transaction takes place, as well as have access to summary information detailing the component transaction results, as well as the overall compound transaction results.

Collaborative Transactions

One embodiment of the present invention may be loosely defined as the existence of networked or collaborative options in the realm of financial activity. This is uniquely different from existing financial, banking, and commerce activities. The existing paradigm for these activities (generally inclusive of Commerce) is almost exclusively a structure that orients relationships in a singular, linear Customer-Provider arrangement. However, collaborative activities are mutually oriented and inclusive of more than a single relationship; where all parties can be simultaneously Customers AND Providers.

Collaborative transactions, which are designed to be supported by methods and systems consistent with the present invention, include a multitude of parties and a diversity of forms of currency and/or credit. Collaborative transactions include transitive (or spread-vector) actions, which means that the transaction equations can be complex as the net-zeroing of credits and debits, receivables and liabilities, etc., are treated on a global level amongst all participants in the network universe, rather than only between directly related parties as in Traditional transactions.

This means that because the distributed capital system of the present invention has a greater awareness of the transaction universe than any single participant, it can actively and intelligently optimize the logistics of transaction, for example, theoretically computing the transitive shuffle of liability across thousands of participants such that the total volume of actual funds movement in the universe may decrease for the same volume of paid liabilities in the universe, as receiver and obligor parties can be matched according to the accounts and institutions being used to remit or accept payments—thus, for example, allowing funds movement to be handled as an internal banking execution (where obligor and receiver can be identified and at least partially matched at the same institution, even though these individual participants may have no connection at all to each other), with no net funds, or reduced net funds exiting that bank and going out into interbank transfer networks such as ACH or CHIPS, etc.

An approachable way to try and visualize Collaborative Transactions, would be to examine a specific reality of stock markets. Buyers and Sellers rarely know each other, but because the instruments being traded are fungible, one party's sold instruments can become any party's bought instruments regardless of proximity or awareness. The participants whose instruments change hands from Party A to Party B do not care and do not need to care who the counterparties are; they only need be concerned that their transaction net-zeros locally—the market mechanism itself takes care of the net-zeroing on the global level across all transactions and between all participants. The present invention brings this guaranteed global-zeroing mechanism to a variety of transaction situations which would never have the critical mass or structure (i.e., securitization, etc.) to function (i.e., achieve liquidity, etc.) as markets.

Currently, global-level zeroing is evident only in liquid markets active with a theoretically large number of participants, that trade securitized or commoditized items. The present invention brings this global level zeroing mechanism to limited-participant transaction environments. Using transitive actions achieved with the program called SVR program module, as described above, any number of transactions involving as few as two participating entities can now have access to a system that will net-zero responsibilities across all participating entities. Realize of course that a two entity transaction, or multiple transactions between two entities, can very easily be netted, so a sophisticated network technology may not be needed to resolve the zeroing amongst the parties; but the present invention could nonetheless manage this two-entity transaction environment. When there are three or more parties, however, it is not intuitively easy to resolve the global net-zero, and this is where the present invention becomes most useful and most valuable, bringing efficiencies in terms of total capital at risk, total economic capital deployed, alacrity of transaction, etc.

In participating in this open market, all participants are simultaneously both Customers AND Providers. In this case, where all participants demonstrate Customer AND Provider characteristics, the transaction type would qualify as Collaborative Compound, the most sophisticated and expansive transaction type (i.e., a stock market is only one example of a Collaborative Compound transaction).

Fungibility facilitates transitive resolution. What this means is that, for example, if party A owes party B some amount X, and party B owes party C some amount X, all three parties' transactions roles and responsibilities can be satisfied with a single payment X that party A remits to party C. A distributed capital system will find and execute this transitive scenario regardless of whether Party A, B, and C know each other, or even are aware of each other—to the same effect that buyers and sellers of public equities do not know and do not care who the counterparties are to their transactions. It is not important who is the current Purchaser or Seller in collaborative transactions, but rather, the issue is making sure that the liabilities and receivables are all fulfilled, and the correct parties get credited for having fulfilled the liabilities they were specifically responsible for, while the correct receiving parties actually get what they are owed.

Since it is unlikely in the universe of transactions that random participants will arrive at liabilities of the exact same amount X as presupposed in the example above, the distributed capital system has a method and system for dealing with amounts that do not match (i.e., that are asymmetric). As stated above, the Spread-Vector Resolution program module, in treating the transaction universe as a flow-based model, achieves "resolution" of non-matching amounts, by stringing together follow-on counterparty matches of those parties' partial or full liability or receivable amounts, in never-ending fashion.

Collaborative Simple

Figure 22C:
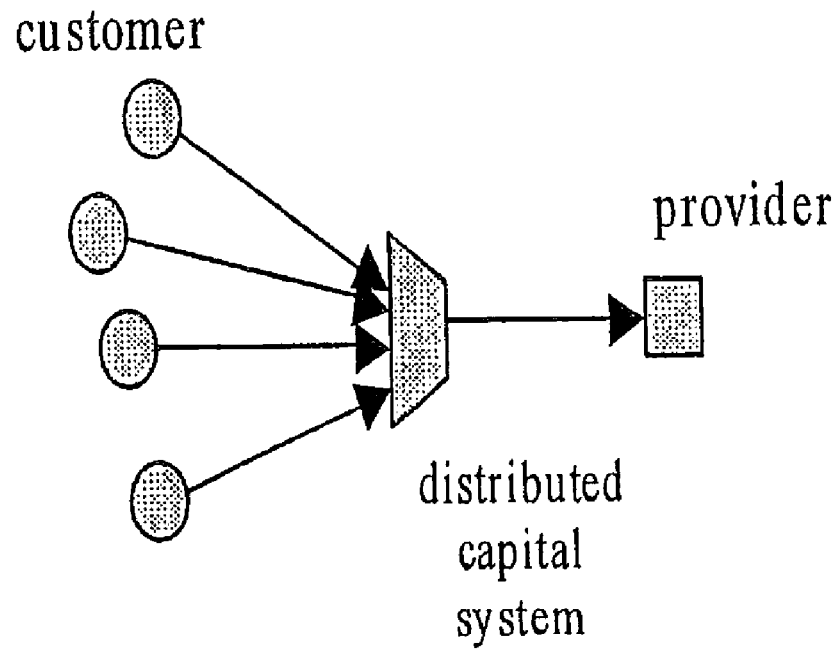

In a Collaborative Simple transaction (see FIG. 22C), two or more parties independently elect to participate in the same opportunity. In a simple example, this would include a small entrepreneur making a private-investment opportunity available to a select group of investors. Currently a scenario such as this one would be pursued as a collection of one-to-one relationships, with the entrepreneur being party to each one independent of others (despite the pooled-asset aggregation of invested funds in the corporation).

Mutual Funds are a good example of how a distributed capital system may improve customer-service provision to investors; however, currently mutual funds follow both the traditional one-to-one relationship paradigm, and the static treatment of transactions. A distributed capital system however, would allow a great deal more service and value to be returned to the customer, by providing, for example, constant visibility on the state of the fund, and perhaps even other investors real-time actions relevant thereto.

For example, two friends lending a third money—where all lending parties are "customers" of the "investment opportunity" provided the third friend who offers to pay them back with interest. Another example, is a Church which raises money from its congregation in donations, money from a bank(s) in the form of loans, whereby the loans, the donations, the payments with interest, etc. could be managed by the distributed finance system of the present invention, and at a cheaper cost than if the Church did all the transactions between each member of the congregation, as well as a number of banks.

Employee-owned corporations and public corporations that want to allow a greater number of investors to participate, for example, in senior instruments (debt) such as syndication of credit lines, etc., would be users of Collaborative Simple transactions.

Collaborative Compound

Figure 22D:
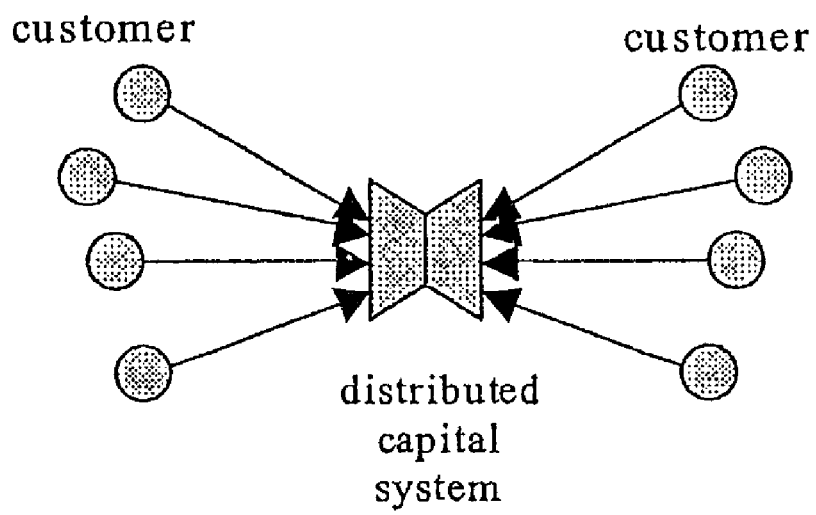

Another embodiment consistent with the methods and system of the present invention, is the Collaborative Compound transaction (see FIG. 22D). In the Collaborative Compound transaction, both sides of the transaction are considering themselves to be customers (and in a context where doing so makes them both providers as well). The customers may not have any direct awareness of each other, and the distributed capital system of the present invention is simply using the Collaborative Compound embodiment to make the transaction more efficient or less costly or both, etc.

In an example of a Collaborative Compound Transaction, a user's company may require British Pounds for certain activities. In a traditional manner, the user would go to a bank either physically or online, etc., to arrange for a certain amount of capital to be converted from US$ to GB£.

When a second user, unrelated to the first, somewhere in the world, requires U.S. dollars for certain company activities, traditionally, the user would in similar fashion, go to a bank or other financial institution etc. physically, or online, etc., and arrange for a certain amount of capital to be converted from GB£ to US$.

Both users are customers, and the financial institutions can provide them both with services in the traditional manner. However, both users could arrange to transact with each other, or automatically and anonymously be matched with each other, to mutually serve each other's needs in the distributed capital system of the present invention, so becoming providers at the same time as being customers.

In particular, the users could utilize the distributed capital system of the present invention to request an exchange of currency. The program of the distributed capital system of the present invention uses a vector-flow algorithm to resolve the problem of exact matching of the funds requested by both users/parties, allowing the parties to transact to the full amount possible, and then taking any remainder amount (if for example, one user required more US$ than the other party could provide), and having a different "customer" fulfill that partial amount, leaving that customer's remainder filled by another, successive customer on the opposite side of that transaction.

This is a flow-based treatment of transaction, rather than the predominant static treatment which forces an assumption that all transactions must be met in full by a single counter-party (such as, in the example where the Bank fulfills the exact amount of desired currency conversion). This type of Collaborative Compound transaction can take place regardless of the amounts involved—whether small or massive—thus, perhaps contributing to a moderation of volatility across regional and national economies around the globe since liquidity would theoretically increase as fees drop due to the removal of 3rd party intermediaries, resulting in less friction (and hence less latency, that causes economic straint, and hardship) between economic (currency, policy, sovereignty etc.) domains.

Timing of Transactions

Note that in discussing these four embodiments of types of transactions, the user can indicate whether they wish instantaneous processing (typically desired for a bill payment, or investment-grade request), or they wish to set a time for the transaction to take place (i.e., a later date, for installment bill payment etc.), or an event-triggered transaction to take place (such as a certain stock-price, or even random variables for which data users may wish to use, for example the ambient air temperature in Las Vegas, or the score of the Green Bay Packers game, etc.). The first transaction is designated by the system as a real-time or immediate type of request, the next as a passive request, and the final as a fixed request. In the latter system, the funds in the transaction may be available to the investment engine of the present system (see Investment Engine below).

Traditional Simple Transaction

One embodiment consistent with the methods and systems of the present invention is the Traditional Simple financial transaction, which will now be described in more detail. Although only the Traditional Simple transaction will be described herebelow, it should be noted that all the following different types of transactions may utilize the user interface of the present system. Thus, the user interface as described with respect to the Traditional Simple transaction, will not be described again in detail with respect to the other transactions.

As stated above, a Traditional Simple transaction is familiar to most online users, and involves only the customer and a provider, and a simple financial transaction such as the payment of a bill.

Figure 11A:
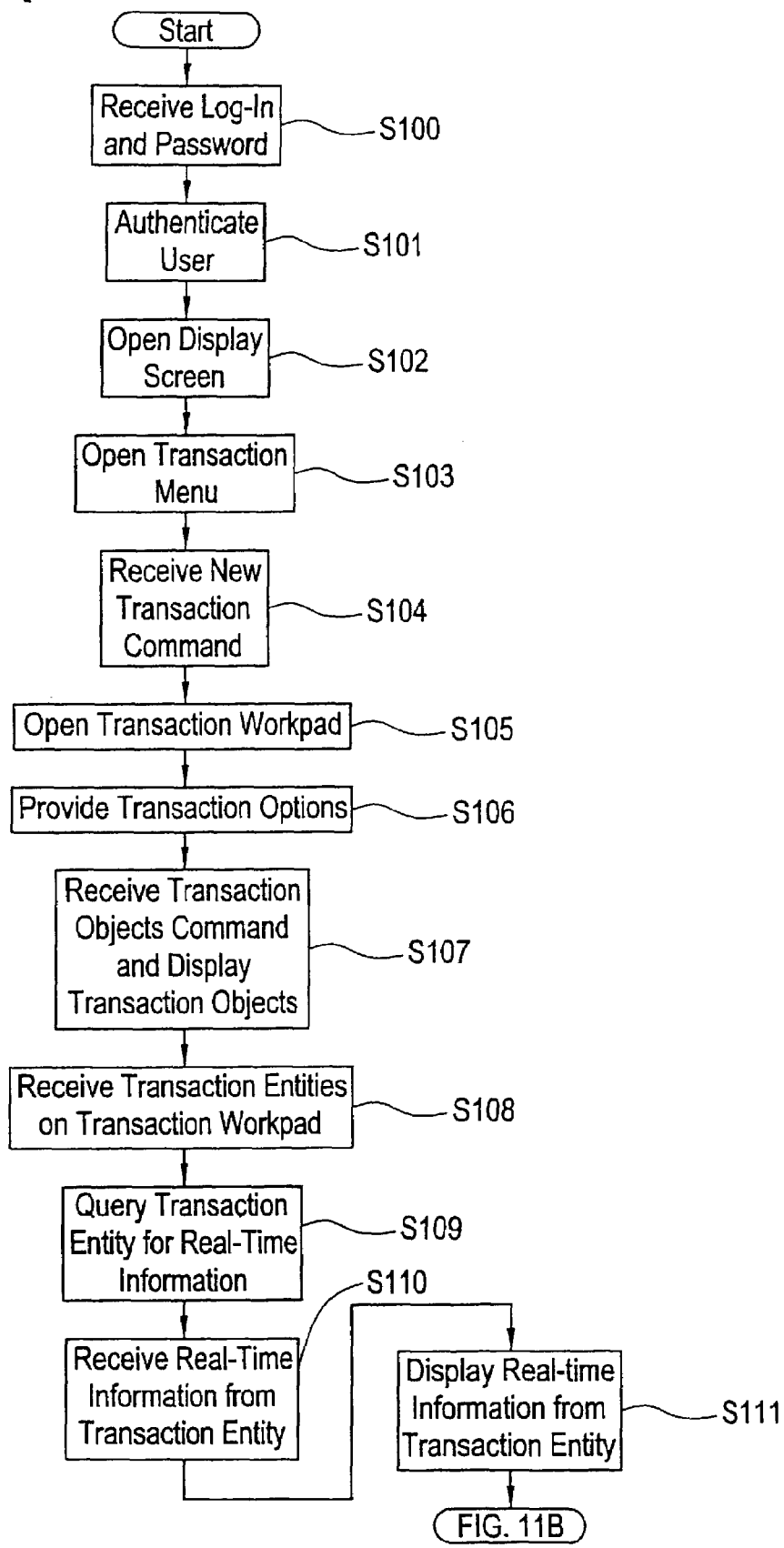
FIGS. 11A and 11B depict a flowchart which shows the operation of the Traditional Simple transaction according to one embodiment consistent with the present invention.

Accordingly, once the user has logged into the system, and has been through the log-in process in step S100 (see FIG. 11A) and the authentication process in step S101, the program opens a blank display screen in step S102, similar to the screen which opens when a word processing program is opened, with Transaction Options shown on the display screen.

The user then uses his mouse to place the cursor on "File" and left clicks the mouse, at which point, in step S103, the program provides a pull-down menu listing the possible transactions available to the user, or perhaps a dialog window, options palette, or toolbar or any similar presentation of custom designed Transactions the user has set up in his/her account, (i.e., Existing Transaction 1, Existing Transaction 2, Build New Transaction, etc.).

Note that although activities will be described as being performed with the action of a mouse using a cursor on the appropriate selections, and right-clicking or left-clicking to initiate an activity, one of ordinary skill in the art will realize that these actions can be performed by command functions on the keyboard or by voice actuation or other similar methods, and that the consistent advancement of "ordinary skill" in the realm of interface design will continually realize better ways to present the same and increasing amounts of information.

Further, although various operations and transactions will be described using discrete steps and with a specific terminology, one of ordinary skill in the art would know that the transactions could be achieved in varying ways and using different terminology or steps, and using variations of the methods described below.

Figure 12:
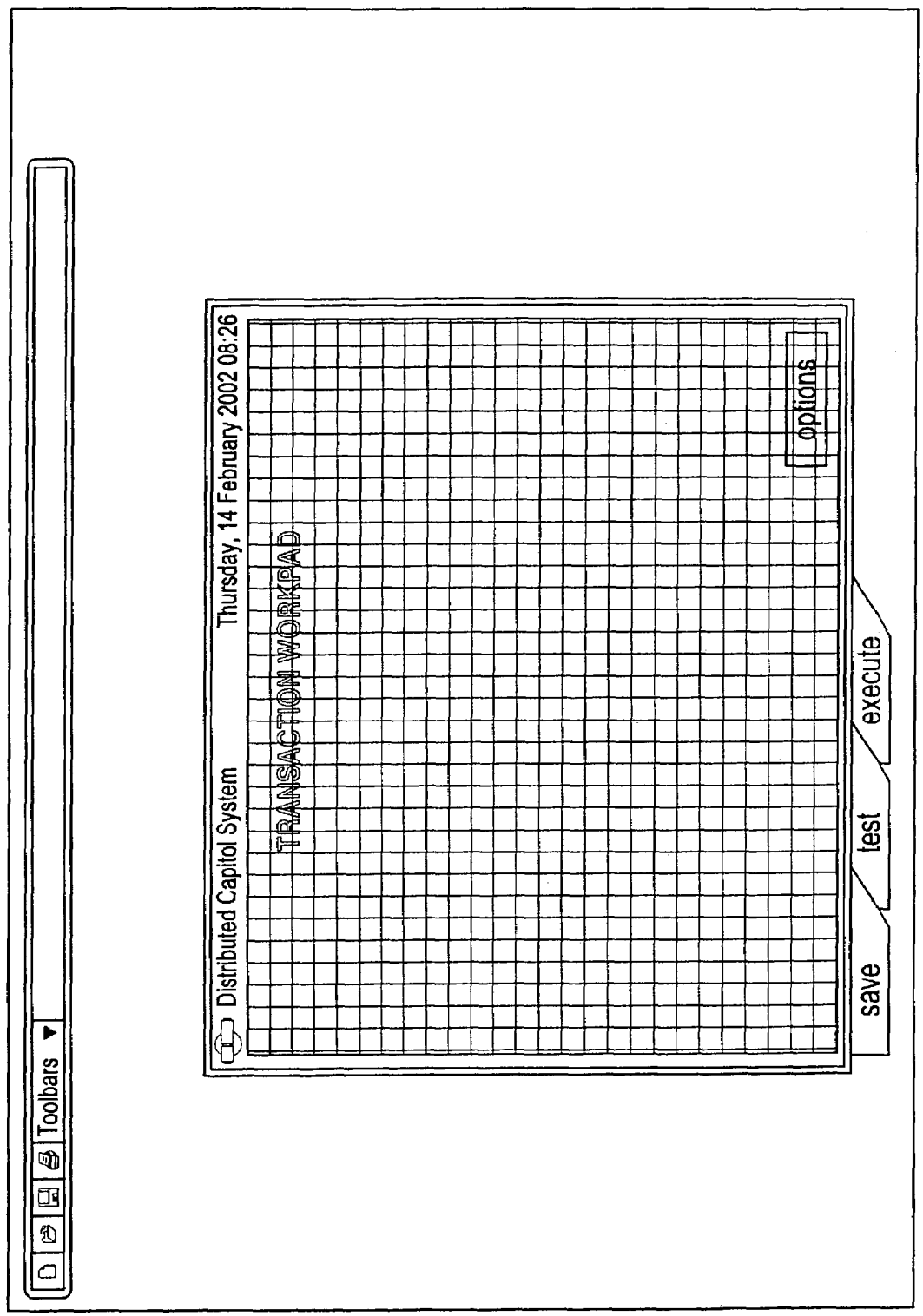
FIG. 12 is a screen shot of the Transaction Workpad of the user interface according to one embodiment consistent with the present invention.

Assuming this is a new or first transaction, once at the "File" menu, the user can choose "New Transaction" if the transaction is determined as a new one in step S104, by left-clicking on that option, whereby in step S105, the program will open a blank Transaction Workpad on the display screen (see FIG. 12).

Once the user is at the basic blank Transaction Workpad display, the user can move his cursor to the heading "View", left-click on that option, wherein the program will provide a pull-down menu in step S106 which includes "Toolbars".

The user then can left-click on "Toolbars" or follow to the right of "Toolbars" causing a sub-menu to drop-down, whereby in step S107, the program will provide a list of transaction options from which the user can choose.

Figure 13:
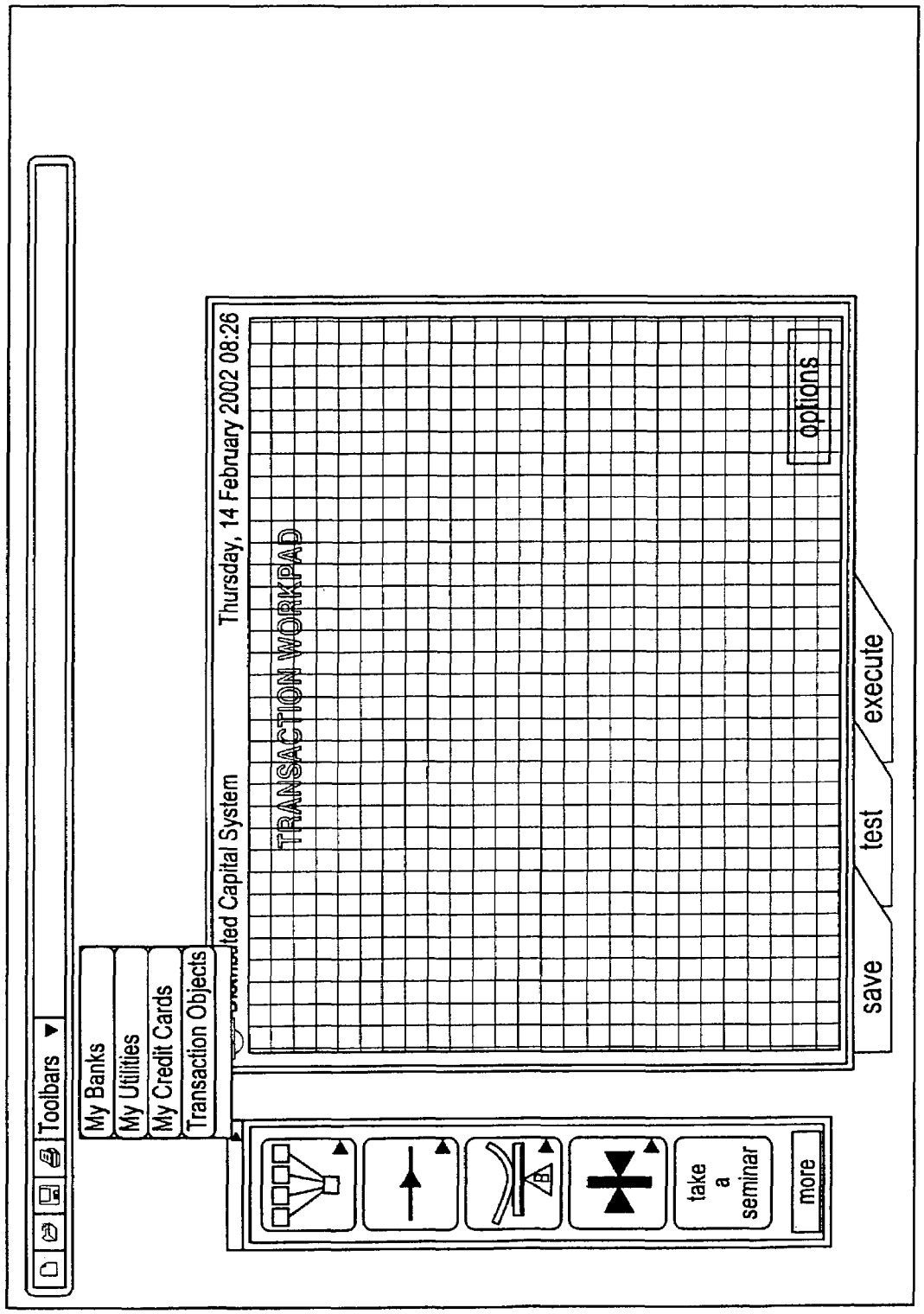
FIG. 13 is a screen shot of the Transaction Workpad of the user interface according to one embodiment consistent with the present invention.

Under "Toolbars", for example, can be a list of options including "My Banks", "My Credit Cards", "My Communications", "My Utilities", "My Insurance", "My Loans" etc., as well as a selection entitled "Transaction Objects" (see FIG. 13).

One of ordinary skill in the art will recognize that design factors may dictate that "Toolbars" be replaced with a more appropriate name, such as "Transaction Entities", or some other such designation which communicates most effectively with users.

In this example of a Traditional Simple transaction, the user may wish to pay a gas bill, which is a simple transaction involving two parties (three entities)—the user and the gas company being the parties (the user, the gas company, and the transaction action between them being the three entities).

Figure 14:
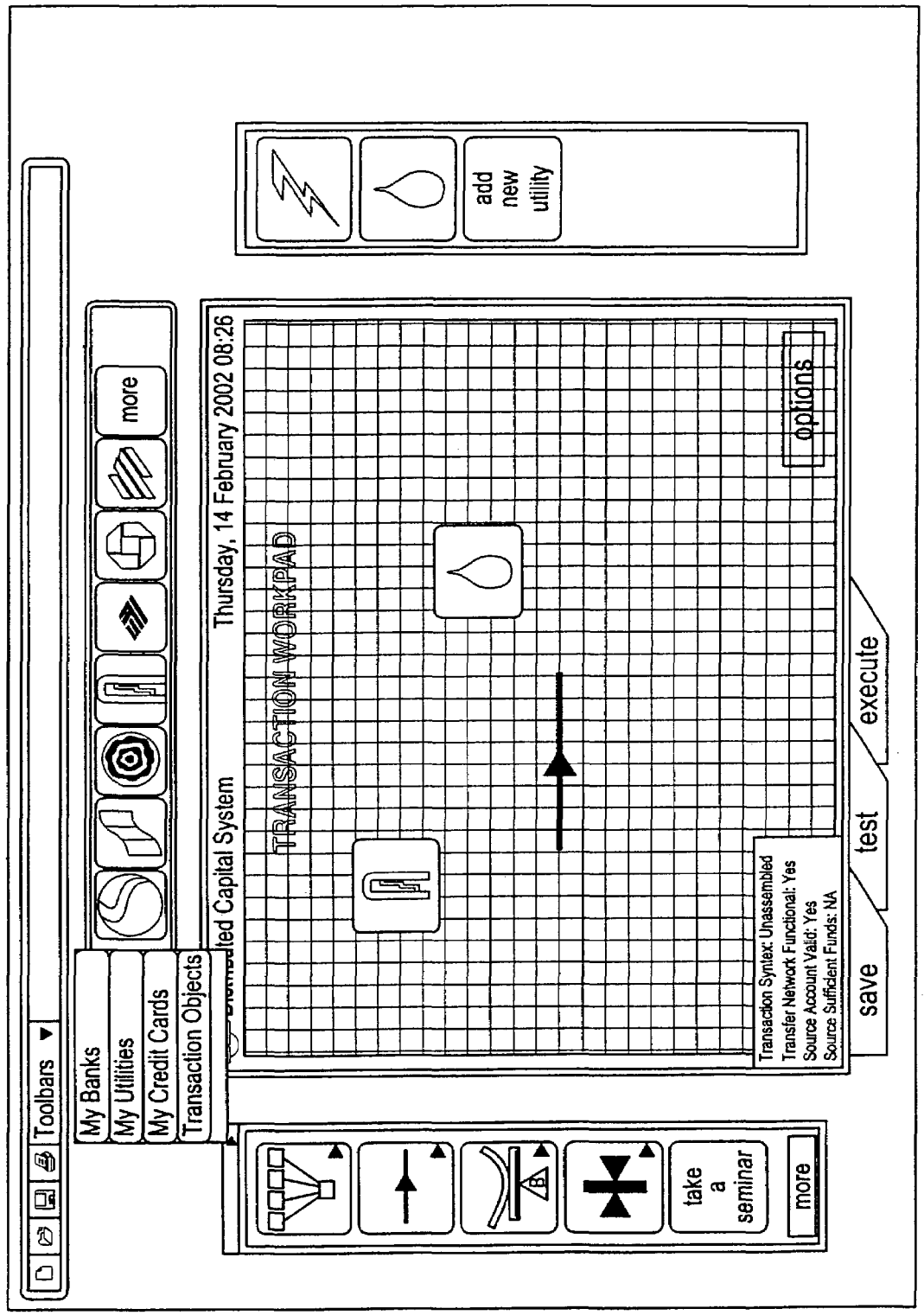
FIG. 14 is a screen shot of an unassembled Traditional Simple transaction on the Transaction Workpad of the user interface according to one embodiment consistent with the present invention.

Thus, the user may choose "Transaction Objects", and left-click on that option, whereby the program, in step S107 will receive the command and display a working area adjacent to the Transaction Workpad (see FIG. 14), labeled "Transaction Objects", and in which are disposed a number of icons representing various financial transaction actions.

For example, the icons may represent financial transaction-actions such as, Capital Asset Vector (payment, or more accurately, a general movement of capital="Move Funds"), Convert Currency, Buy, Sell, Lend, Borrow, and Currency Hedge, etc. While resident in this Transaction Object toolbar or palette, the objects will be inert. When any of them are dragged onto the Transaction Workpad, they become active objects, the building block entities of a transaction that the user will assemble.

Once active (i.e., once on the Transaction Pad), either via mouseover, mouse button click (right or left), or some other interface-design dictated user-friendly access, the user may see "Properties" information relevant to that entity. Note "objects" is a subset of "entities". Thus "transaction object" is a term specific to transaction actions, whereas "entity" is used to identify both the parties to a transaction as well as the actions between them.

In the case of a "New Transaction", "object entities" will not display "properties" information other than general functional-feasibility, system status type information, because the transaction is new and the action within this specific transaction has not been used yet, and does not have a history of use that would create a record to display. The active "party entities" placed on the "Transaction Workpad" for the sake of assembling a "New Transaction", however, will reveal an abundance of "properties" information precisely because these "entities" are involved in a variety of transactions beyond the current New Transaction that is being assembled. The user may configure the presentation of this properties information according to what is most important to each user.

Within the "Transaction Objects" toolbar, there will be a "Search for New Objects" button, which will allow the user to periodically query the system for recent additions to the "Transaction Objects" toolbar, and so add further functionality to user-created and user-managed transactions. However, the program will provide new "Transaction Objects" which will automatically appear in the "Transaction Objects" toolbar in conjunction with periodic updates provided by the system, or, in conjunction with pre-requisite factors having been achieved (such as attending an online investor education seminar or training program, or a set period or quantified or qualified usage of the product and service). Some of these new "Transaction Objects" may require approval or special access (such as sophisticated-investor status, etc.) in order to receive from the system.

Next, the user may choose "My Banks" from the "Toolbars" menu, whereby the program will receive the command and display another labeled section adjacent the Transaction Workpad, which shows icons which refer to different banks accounts pre-registered by the user.

Note that although in the present invention, the accounts and transaction actions are preferably shown as icons on the display, the accounts and transaction actions may be available in a pull-down menu, table, grid, or the like. The transactions may be assembled by the movement of the Transaction Objects icons or placeholder representations (such as text names, or the like, etc.) using a mouse, or by command functions on the keyboard or the display, or by voice actuation etc., which are specific to handling those entities. Although the following description will relate to the use of icons manipulated using a mouse, one of ordinary skill in the art will be aware that use of command functions on the keyboard, or display, or by voice actuation, etc., can also be instituted to perform the commands or initiate the transactions.

Finally, the user may choose "My Utilities" from the "Toolbars" menu, whereby the program will display a labeled section adjacent the "My Banks" and "Transaction Objects" areas, whereby a number of icons depicting the "Gas Company", "Water Company", "Electric Company" etc., will appear in the "My Utilities" section.

In order to perform a financial transaction, the parties to the transaction, and the transaction action chosen to act between them, must by placed in the Transaction Workpad area, arranged in the relationship desired to be executed as a transaction.

Accordingly, the user may place the cursor over the "My Bank Account" icon (may be specific to a particular bank account at a particular bank, as registered by the user), and using the mouse, may left-click the cursor, holding, moving or dragging the icon "My Bank Account" over onto the blank Transaction Workpad section, depositing the icon there. Dragging from the original location does not remove it from the original location, but rather creates a copy as the cursor moves the clicked-on object away from the original. Thus, the program in step S108, receives the transaction entity in the Transaction Workpad section, as the user proceeds to assemble a transaction.

When the user mouseovers or otherwise executes an action that calls for "properties" information in relation to the "My Bank Account" icon within the Transaction Workpad section, the program, using the VfT program module, in step S109, receives this action as a command to obtain real-time information on the status of the user's bank account (i.e., account number, balance in checking, savings, etc.). The VfT program module executes this command, telling the CDMX program module which user is sending this request, and for which entity, and the CDMX program module accesses the secure "Account Registry" which maintains records of all user-registered accounts, and collects the proper and formal identifying, as well as access-authorizing data, for these accounts.

Alternatively, the system can be configured to request the required user passwords as they are needed, and not store any user passwords. Proceeding, in addition to being stored, this access is timestamped and assigned a transaction code by the CDMX program module, before handling this retrieved information to the MaQs program module which executes the request to retrieve information from the real world entity external to the system.

Accordingly, in step S109, the program queries the user's bank over the Internet and over any secure financial networks necessary to obtain the information. Note that this request is sent from the client to another client or the server, and the client or server to whom the request is sent, performs the query to the bank. (However, note that the bank queried may also be part of the present system, such that the request is easily handled.

In one more sophisticated transaction option, the user may choose an option—"Scan All Accounts for Updates"—whereby the program scans all the user's pre-registered accounts and provides real-time data related to each account to the user, advising the user of any new bills, changes in balances to mutual funds or bank accounts etc.).

In step S110, the MaQs program module receives the information from the bank at the server, at which point the program passes the retrieved information back to the CDMX program module, including as well, any general system-status or network information that may be provided as a result of issuing a request over that network. The program via the CDMX program module, then timestampes, codes and stores all the received information. The CDMX program module then filters the information it receives in order to pass back to the VfT program module, only the requested information, and thus the real-time status of the user's bank account is provided to the client computer which displays it for the user in step S111, on the screen next to the icon or available under a pull-down menu, table, other window, or the like.

Note that since the user has pre-registered his bank account with the system, this query can be performed securely and results are retrieved almost instantaneously, as would a user receive, for example, when attempting to retrieve cash from an ATM machine. Further, since existing secure networks are used, no new physical infrastructure is necessary to perform this query and receive the information.

The user now can perform the same steps with respect to the "Gas Company" icon, holding and dragging the "Gas Company" icon over to the Transaction Workpad, and by performing a mouseover or the like at the "Gas Company" icon, the program can obtain real-time and other information regarding the "Gas Company" (i.e., account name and number, customer service telephone, amount due, past amounts paid, etc.).

Figure 11B:
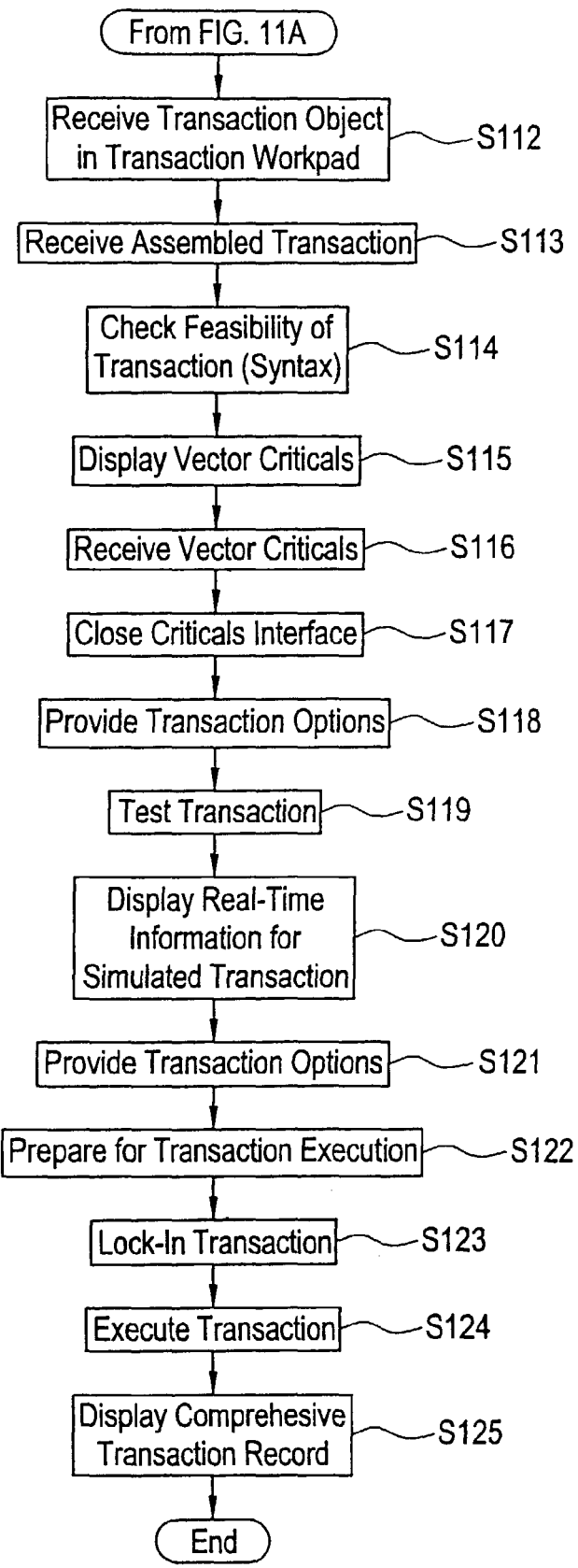

The user can also perform the same steps to choose a Transaction Object from the "Transaction Objects" section. In this case, "Capital Asset Vector" would be an appropriate financial transaction action to place between and connect "My Bank Account" and "Gas Company". Thus, after the "Capital Asset Vector" has been retrieved from the "Transaction Objects" section and received by the program in the Transaction Workpad section, in step S112 (see FIGS. 11B and 14), the user must now initiate and may confirm initiation of the financial transaction if s/he wishes it to actually execute.

Figure 15:
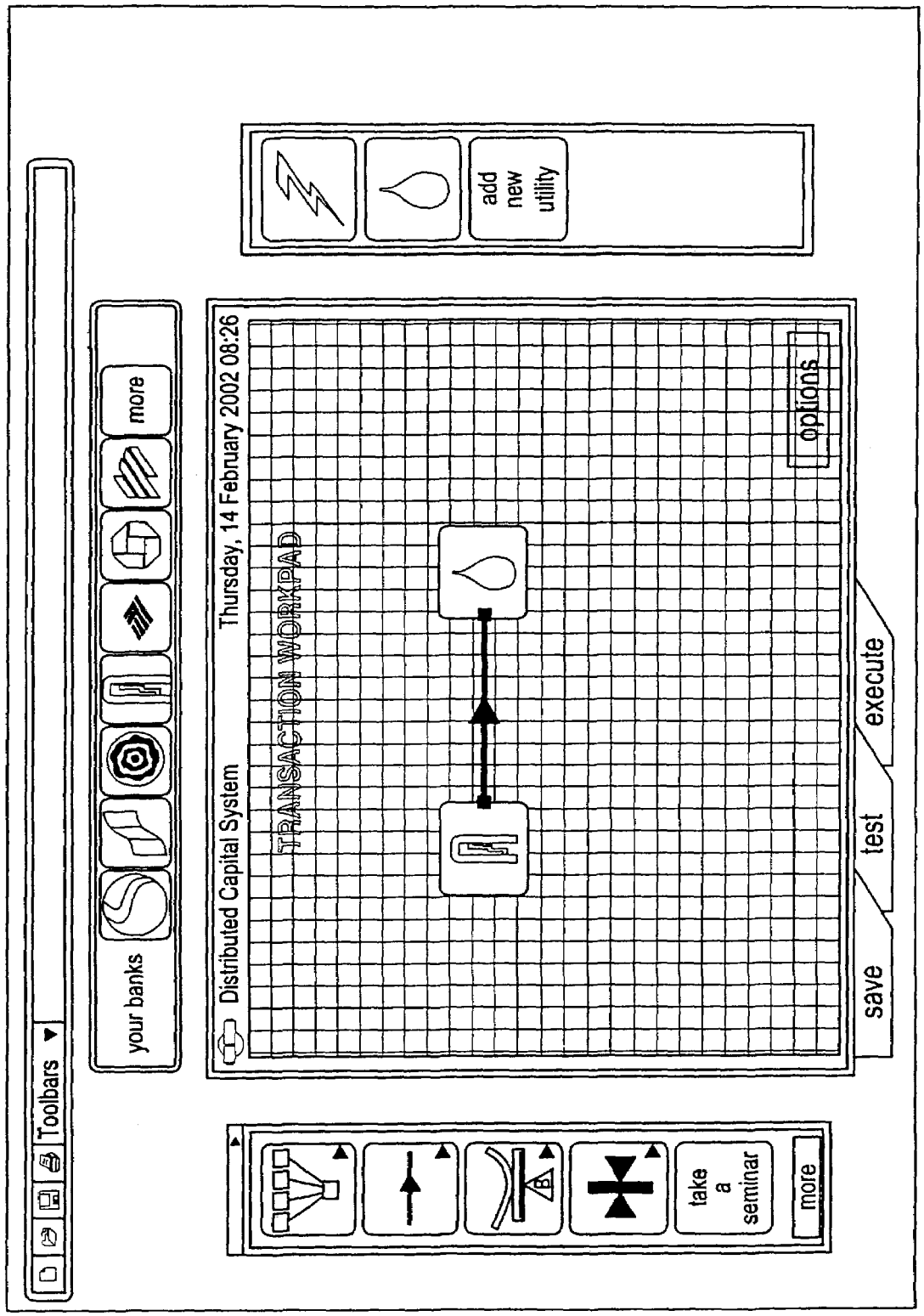
FIG. 15 is a screen shot of an assembled Traditional Simple transaction on the Transaction Workpad of the user interface according to one embodiment consistent with the present invention.

Accordingly, the user may attach the "Capital Asset Vector" between the two entities (i.e., "My Bank Account" and "Gas Company") in order to make the transaction a completely assembled transaction (i.e., payment of the gas bill from the user's bank account) which the program can receive in step S113 (see FIG. 15).

Figure 16:
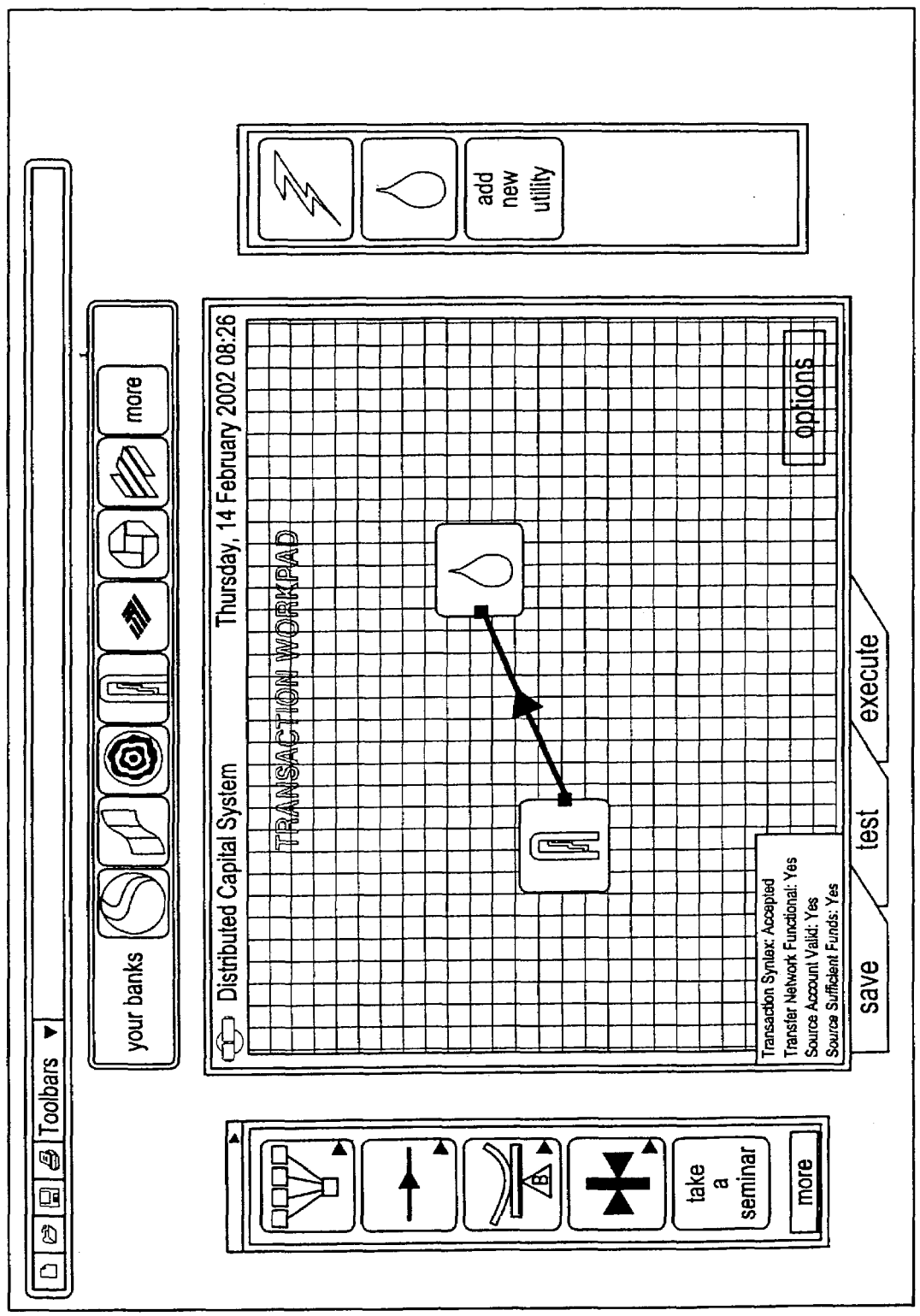
FIG. 16 is a screen shot of a transaction syntax approved Traditional Simple transaction according to one embodiment consistent with the present invention.

Note that until the "Capital Asset Vector" Transaction Object is attached to both the "My Bank Account" entity and the "Gas Company" entity icons, no transactions take place, execution cannot occur, and a mouseover or other "Properties" check on any of the entities on the Transaction Workpad will produce no display or evidence of results or confirmation for this transaction. The program, in step S114, will check the assembly of every transaction to make sure at least the syntax of the assembled transaction is feasible (although it cannot check and avert all user-errors in amounts and selected entities, etc.), before allowing the user to initiate execution (see FIG. 16). Likewise, the program will require the user to set and confirm both the direction of the "Capital Asset Vector" (so that a payment is sent to the Gas Company, rather than a remittance request (ie a refund request or bill presentment from the user to the Gas Co.)), as well as the amount of the capital vector, prior to the assembled transaction becoming available for execution via user-initiation.

In order to assemble a transaction, the user can then left-click on the tail of the "Capital Asset Vector" icon and hold and drag it onto the "My Bank Account" icon, where it will attach with a "snap". In addition, the program may change the border of the "My Bank Account" icon to make it thicken or change color, etc., to show the attachment was successful. The "snap" feature would be familiar to a user who can use a "Draw" application and attach arrows to various objects.

The user can then left-click on the head of the "Capital Asset Vector" and hold and drag it onto the "Gas Company" icon, where it will also attach with a "snap", and result in the program making a thickened border or the like, in whatever user-centered design is chosen to communicates a successful connection.

Note that although the above steps are described in order of placement of the movement of funds from one entity in payment of another entity, one of ordinary skill in the art will be aware that these steps can be performed in any order, and the entities can be placed in any order on the Transaction Workpad, connected either immediately after each placement, or after all the entities are placed on the Transaction Workpad, etc.

Once the connection is made between the three entities (i.e., "My Bank Account", "Capital Asset Vector" and "Gas Company"), the transaction is fully assembled and becomes an active transaction, having passed the system's transaction-syntax feasibility check and awaiting user-setting and confirmation of transaction object Criticals.

Once fully assembled, a mouseover or other similar "properties" request action, available as user-centered design may dictate, of the Capital Asset Vector by the user, will initiate the program to display information detailing the characteristics of that Capital Asset Vector. This includes, for example, the Vector Source Entity (i.e., the user's Bank, including the institution name, account number from which funds will be withdrawn, etc.); Vector Destination Entity (i.e., the user's Gas Company, including institution name, target account number, etc.); Transaction System or Network (ACH, PayPal™, e-Checking, etc.) most likely to be used at time of execution, Network or System status, if execution were to proceed at current time, etc. Also, in the case of existing assembled transactions which have been used in the past, (i.e., paying last month's Gas bill would be the same transaction entities and assembly orientation as this month's bill transaction and vector, with only the timing and amount to change), the program will provide an indication of previous transaction activity using that specific Capital Asset Vector (i.e., payment from specific user-Bank Account, to Gas Co.), and further details may be accessible as user-centered design dictates may be the optimal method of display, referenced by the program as the Transaction History.

Note that if several different remitting entities at different times are used to pay the Gas Co., there will be a multitude of assembled Transactions, each with its own uniquely defined Capital Asset Vector, each saved as a separate file which the user may open at any time to use again (i.e., if the user has multiple bank accounts and credit card accounts, etc., and prefers at one instance to remit from Account 1 and at another instance from a credit card account, etc., the user will choose to open the saved transaction file according to method of remittance desired). Whereupon if the user wishes to see in one place the details of all activity involving the particular Gas Co. account, s/he may simply access the Gas Co. account history in the "Properties" of any one of the "payment to Gas Co." transaction files, as the program updates the Gas Co. record in all of them according to activity on the Gas Co. account, regardless of which remitting account sends payment.

If the user wishes to view the "Transaction History" for a specific Capital Asset Vector within one of these "payment to Gas Co." transaction files, the user may select this option and the program will access a database to provide a display showing previous transactions made between these two specific entities (remitting entity, and receiving entity), including, transaction amounts, dates, etc.

The assembled transaction cannot proceed to transition to "available for execution" status until the transaction object Criticals (i.e., Vector Criticals in this Gas Co. example) are set and confirmed by the user. Upon setting and confirming the transaction object Criticals, (in the case of a Capital Asset Vector these would be called Vector Criticals) the assembled transaction will transition to a state of availability for initiation at the user's discretion. The program may show this transition by changes in the display or presentation, including audio, visual, animation, or changes in state such as brightness, color, shape, dimensionality, placement, or the like.

The user may double-click, or right-click, etc., on the Capital Asset Vector, whereby the program, in step S115, will open a menu on the display screen, which includes various options, one option being "Vector Criticals".

For Capital Asset Vector transaction objects, a minimum of two Criticals must be set and confirmed by the user. Other Criticals may be left as defaults or unset. The two mandatory Criticals for Capital Asset Vectors are: 1) Direction, which entails Vector Source assignment (=determination of remitting entity), and Vector Destination assignment (=determination of receiving entity), and 2) Amount, which is the user-desired amount to be remitted. When the Capital Asset Vector is snap-attached to entities in the transaction assembly stage, the program allows these entities to become available in the Criticals interface, for selection as either Vector Source or Vector Destination selection. If the user does not choose to set the Vector Timing for the transaction, the program will allow this setting to default to immediate execution of the transaction upon pressing the "Execute this transaction" button, as technical feasibility permits.

Other Criticals may include such things as currency type (i.e., among possible currencies accepted by the target entity), date of payment, and the option to automatically remit multiple vectors or payments, at different dates, triggered by different external events (i.e., such as confirmation of direct-deposit of paycheck, currency-exchange target, or the like), etc. The user may set a vector-specific password or, alternatively, set the vector to use the user's system login password, to protect access to this vector's Criticals; this setting may also be controlled globally by the program, such that all transaction objects require a password in order to view or change object Criticals.

For more sophisticated options in performing this transaction, the user may elect for a more secure option of setting this vector or all transaction entities such that each transaction entity to be accessed will require the user to enter passwords at the time of execution, rather than having the program of the system maintain this private information on file.

Note that the user is provided by the program with the option of setting the timing of the transaction under Criticals. The transaction can take place immediately, in real-time, or if the timing of the transaction is not specified or a later date specified, the transaction will be set to passive-fill upon execution, which means that the funds may be drawn down from the user's bank account but may be diverted to an investment engine of the system prior to the date where it is to be filled (see Investment Engine below).

After setting the Criticals, the program closes the Criticals interface in step S117, whereupon the transaction's assembly is complete enough to be executed. The user may wish to save the transaction at this point. The user may save the transaction at any stage, whether the transaction is completely assembled and feasible, or otherwise, just as one might save and close a text document at any interim stage, and come back to it at a later date for editing or completion, etc.

To save the transaction, the user should click on "File" in the drop-down menus, and choose "Save", or may perform this function on the keyboard or the like, whereby the program will provide a dialog box requesting that the user name the Transaction to be saved. The user then enters a Filename (i.e., Regular Gas Co. Payment), and presses "Save", whereby the program, will save the Transaction in step S118, and if requested by the user in the future, will make the Transaction available in a drop-down menu or other window of "Transactions", under "Recent", as may be dictated as optimal for making these files easily available to the user. The user may create and save any number of transactions, available for re-use or review, editing, adjusting, etc., at any time.

Note that when the transaction is syntactically feasible, the "Test this Transaction" button and the "Prepare for Execution" button mentioned below may change from being dimmed, greyed, dimensionally flat, or the like, to being bright, colored, having dimensional relief and shadow, or the like, to communicate to the user that the button function has transitioned from an inactive or unavailable state to an active or available state.

At the point the user has finished assembling and confirming the transaction such that it is feasible, the program will make available a "Test this transaction" button, placed such that the user correctly associates this button with the transaction concerned and not with any other transaction or activity in the system, that allows the user to simulate execution of the transaction prior to actually executing the real thing.

When the user clicks on the "Test this transaction", the VfT program module, in step S119, receives this action as a command to initiate a check on all entities in the assembled transaction via the MaQs program module, to determine viability (technical, financial, etc.) as well as to process a simulated accounting of all transaction amounts and resulting changes in all entities, for presentation to user. Note that no capital actually moves during a test.

In this way the system can provide a predictive awareness of the user's finances, for the user to make and manage decisions across the range of all user financial activities the user chooses to handle via the system. In one embodiment, the program of the system may provide customized decision-analysis and support to the user, based on historical and statistical resources.

Thus, the VfT program module executes the test command, telling the CDMX program module which user is sending this request, and for which entities, and the CDMX program module accesses the secure "Account Registry" database which maintains records of all user-registered accounts, and collects the proper and formal identifying as well as access-authorizing data for these accounts. In addition to being stored, the CDMX program module timestamps and assigns this access a transaction code, marked with an indication that it is for Testing (simulation) purposes, before handling this retrieved information to the MaQs program module which executes the request to retrieve information from the real-world entities (which are identified in the transaction via the assembled entity icons) external to the system.

Accordingly, as part of the testing step, the program queries the user's accounts at the relevant real-world entities over the Internet and or over any secure financial networks necessary and available, to obtain the requested information. Note that in a client-server environment, for example, the request is sent from the client to the server, and the server performs the queries to the external entities.

As part of the testing step, the program directs a query to instigate a background check to verify that the Gas Company system is up and running (capable of receiving remitted transaction amounts), determine the required transaction currency, current transaction processing time (i.e., real-time, 18 minutes, 2 hours, 4 days, or other timer period, etc.), or the like. Further, in the same step, a similar check is performed of the Bank to verify balance (ensure that the funds are available), that the Bank transaction system is up and running (capable of sending transaction amounts), etc.

Figure 17:
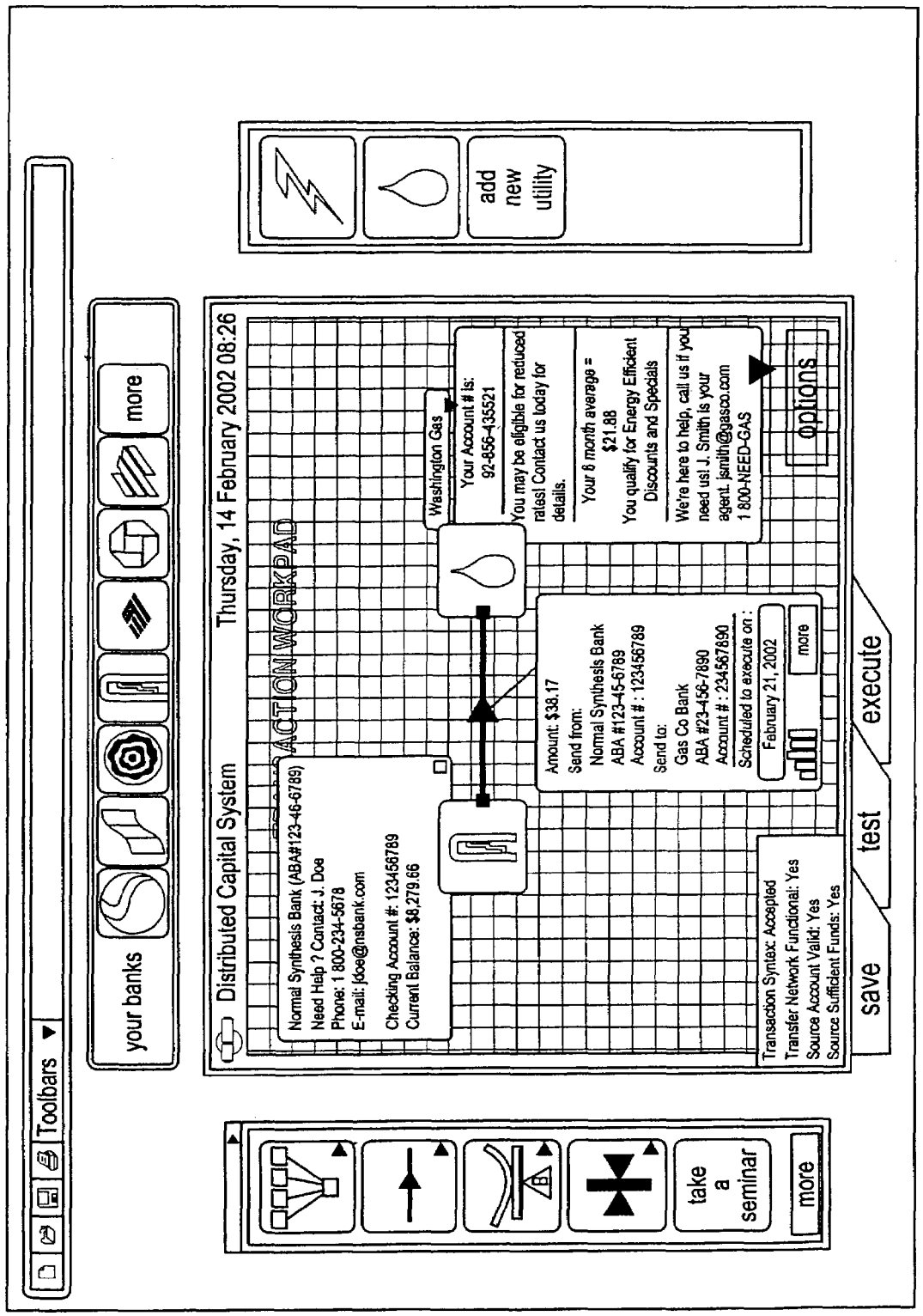
FIG. 17 is a screen shot of a real-time simulated execution data attendant to a Traditional Simple transaction, according to one embodiment consistent with the present invention.

The program receives the information from the various entity accounts, at which point the MaQs program module passes the retrieved information as well as any general system-status or network information updates that may have come as a result of issuing a request over those networks, back to the CDMX program module. The CDMX program module then timestamps, codes, and stores all the received information, again marking the code in such a way that it can be distinguished as a Test. Then the CDMX program module filters the information it receives in order to pass back to the VfT program module only the requested information. Thus, the real-time simulated execution data attendant to the user's transaction is provided to the client by the program which displays it for the user in step S120, on the screen next to the entity icons or makes it available under a pull-down menu or the like (see FIG. 17).

In addition to common messaging and warning dialogs, windows, alerts and the like, the graphic properties of the entire screen interface and display of a transaction under Test proceedings, and under actual Execution proceedings, may change such that they will be distinguishable, using such differences as brightness, color, dimensionality, size, placement, and the like to readily communicate to the user which proceeding is actually underway and being managed.

An example of how the user can test the payment function is as follows: For example, by using the "Test" function, the program will automatically check that the funds are available at the user's Bank and also that the Gas Company's account is available to accept the transaction. For example, if the user's Bank Account has uncollected funds, or the Gas Company's account is off-line, then the transaction will not be able to take place, and the program will notify the user in a message in a dialog box, which will pop up or otherwise appear on the display stating that the transaction cannot take place. The user has the option of retrying the transaction immediately or can program the transaction to take place at a later time, or cancel the transaction etc.

Specifically, when using the "Test" option, the user will see a visual representation by the program using the VfT program module, of the simulated transaction. For example, the program may display a money-bag icon on top of the "My Bank Account" icon, which will grow in size; with text characters denoted amounts, which are attached to the money bag icon, increasing in amount until the exact amount set by the user is obtained.

At the same time, the program may, for example, cause to be displayed, a small accounting box attached to the "My Bank Account" icon, which will show the current balance at the user's Bank, and in second row a rolling amount, increasingly negative (red), equivalent to the debt equivalent of the positive money-bag increase.

Once the vector amount as set by user is reached, the program will cause the vector amount to blink twice within the bag and remain, or some similar indication to communicate completion.

Next, the program will display a cylinder icon, for example, over the Gas Company icon, with an attached text indicator of the current account balance. If an amount is owed, this text will be negative and red, and the cylinder icon will be empty and its border will be red. If there is no amount currently indicated as owed, a dollar amount in black will be displayed (i.e., $0.00) and the cylinder icon will be empty, and the border will be black. If the Gas Company account is currently holding a credit amount greater than the invoiced amount, that credit amount will show in green text, and the cylinder icon border will be green, and the cylinder icon will show a small amount of green volume.

During the test, the program will move funds from one entity to another, such that the money-bag icon begins to shrink while at same time the Capital Asset Vector, will, for example, show an increase in size moving through it (i.e., as if something large were moving through a pipe, temporarily stretching its diameter as it moved along the length of the pipe).

Then, the program will display, for example, the cylinder icon over the Gas Company icon slowly filling up as the transaction progresses (i.e., as if water were filling up inside it), with the text attached to the cylinder icon, numerically indicating the capital influx shown on the cylinder icon.

When the transacted amount has completed movement from one entity to another, the program will display, for example, a second row of text attached to the cylinder icon which remains at the final amount, and a third row of text which will appear showing the accounting of the transaction (i.e., the net result, either a dollar amount in black (i.e., $0.00) showing the balance paid and the transaction complete with no funds owed, any remaining outstanding balance in (negative red), or credit (overpay) in green text.

The program will also display, for example, text attached to the "My Bank Account" icon, showing an accounting of the transaction, with the funds removed from the balance of the bank account.

Note that although the "Test" feature was described using a particular type of icons, any type of icon can be used, and any type of indicator showing a removal of funds from the user's Bank account to the Gas Company can be used. Accordingly, the description of the user interface which displays the movement of the funds in the transaction, is for the user's benefit while the program tests the availability of the funds in the Bank Account, and the ability of the Bank to transfer the funds, and the ability of the Gas Company to accept the transaction, etc.

After the test is completed, the program, in step S121, the user will be prompted with transaction options via a dialog box, to either "Run Test Again", "Edit Transaction", or "Save Transaction".

In this example, the user may select "Save Transaction", and the program will save the Transaction for subsequent execution or future retrieval, review, editing, and or execution, etc.

In the case of later-date or multiple auto-timed payments, alert notices of transaction activation may be sent by the program to the user's designated e-mail account, which notice may include a URL to a secure system webpage, with an interface first requiring the system login and password, then assuming successful user-login, the program will provide a display of transaction specifics, form windows to take input of required passwords, and provide confirmation check boxes or the like, as well as "Prepare for Execution" and "Execute Transaction" buttons. The program will record transaction specifics and results to the saved transaction files as described elsewhere, available to the user at the next login to the system, updateable automatically to the local-client (i.e., user's PC) the next time the user logs into the system from that (PC) client.

When the user would like to review the details of the Transaction just tested, the user may click on the button at the bottom of the Transaction Workpad, called "Text Summary of Transaction", whereby the program will display a Test Transaction Summary including all the relevant details of the user's Bank Account, the unique code which the CDMX program module assigned to the Test Transaction, which code may be modified in part at the time of execution to show that the code was tested, and then actually executed (for example, the code may consist of numbers and letters, with one letter "T" indicating "test", and upon execution an "E" may be added to the code. In this way, the CDMX program module may easily distinguish, and the user may easily understand, whether a transaction being reviewed was executed, tested, or both, the Transaction amount, the timing chosen by the Vector Criticals, etc, as well as the details about the Gas Company's bill, payment, etc.

The user may print this if desired. The user may also print text summaries for either or both the tested transaction, and or the executed transaction. The summary of the executed transaction will contain all necessary information and tracking codes to stand as a receipt of transaction, which information shall be sufficient to prove payment was initiated.

Since the CDMX program module tracks all transactions and the entities which are involved in them, the user-printed text summary provided by the program, which includes transaction codes, shall be able to identify the exact transaction details to the customer service professionals at the real world receiving entities. Since transactions will be executed over traditional and existing secure payment networks (such as ACH, PayPal™, etc.), these receiving entities are already capable of receiving the system-initiated transactions. So it is possible that the receiving entity may not care what $3^{rd}$ Party (i.e., the system of the present invention) initiated a payment and will simply record the payment along with all others received through the same infrastructure, thus making it easily retrievable for review should the consumer wish to address the customer service departments of receiving entities which were Vector Destination Entities in the system-initiated transaction, and discuss specific transaction details such as amounts and timing of payments, etc.

Now, if the test was successful and the simulated results satisfactory such that the user would like to execute the Transaction, the user may click on the "Prepare for Execution" button on the bottom of the Transaction Workpad. The program, in step S122, will cause the Transaction Workpad to shrink, for example, withdrawing to the upper left side of the display screen, and showing only the Transaction entities and the vector connecting them, but in much smaller form.

Below this window, the program will display the Transaction Name as saved by the user, and below the Transaction Name, an accounting ledger or Transaction History, for example in downward-to-current chronological order, showing all historical Transactions (if there are any) made using this particular assembled transaction and vector.

Below this window, the program will show a final accounting entry showing the date and amount of the present Transaction, as "About to be Transacted".

The program will display a "Lock in this Transaction" button at the bottom of the display screen, and the user may then click on this button. Upon pressing the "Lock in this Transaction" button, the program will display a vertical rectangular window, for example, which will show dimmed components of the Transaction, including a list of items that need to be checked and verified in all necessary aspects (i.e., sufficient funds in the user's Bank Account, the availability of the Gas Company system online, etc.).

The program will then proceed through the checklist of items to be checked and verified, with each item lighting up upon review by the program (i.e., the item will turn red if there is a problem, or green if the transaction can proceed).

Once the program has checked and verified all aspects of the Transaction as positive, the program will display a "Transaction Locked In and Ready to Go" message or the like, as well as a confirmation icon, in step S123, and the program will then activate a displayed "Execute this transaction" button that is associated with the Transaction Workpad on which the transaction lies, or the like. Placement of the button on the display should be such that the user correctly associates this button with the transaction concerned, and does not confuse it with any other transaction or activity in the system. (This button would have transitioned to a state of active availability for use at the user's discretion. This transition may be recognizable in changes that include such things as audio, visual, animation, or state changes in brightness, color, shape, dimensionality, placement, and the like).

The user may then click on the "Execute this Transaction" button, and the program, in step S124, will clear the contents of the vertical rectangular window and will display a new list of execution items for the Transaction as well as a vertical progress-downward highlighted bar. As each item (such as "Send Pre-Notification of Transaction to Gas Company System", "Partition Set Amount from User Bank Account", "Release Partitioned Amount", "Confirm Receipt by Gas Company", etc.) is performed and verified by the program, the completed item will turn green, for example, and get a checkmark to its left, for example, and the progress bar will continue downward on the list. Note that for each Transaction Entity chosen, the program will access a pre-determined set of instructions of items to be verified, depending on the transaction type, object-entity (i.e. remit, request, buy, sell, etc.), and party-entity (i.e., Bank, Insurance Company, Utility, etc.) involved.

During Execution, the shrunk transaction and vector assembly will repeat the graphic display described in the test, in conjunction with each actual proceeding step in the execution process. Thus, for example, when the Execution process runs "Release Partitioned Amount", the moneybag as described during the Test procedure, will begin to drain and move through the vector, etc.

The program also provides a unique Transaction Number to the Transaction which Number can be tracked by all the parties to the Transaction (i.e., Bank, User, Gas Company).

Upon completion of the Transaction and the assignment of the Transaction Number, the program, in step S125, will display a Comprehensive Transaction Record which will include a diagram of the vector Transaction, all account details, institutional contact information, and the specific official transaction-system time-stamp data, as well as the Transaction Number.

The user may then print out the Comprehensive Transaction Record for the user's records, or simply save digital copies locally or on the server (network records would automatically be kept according to banking regulations.). The user may also export transaction specifics to any major financial accounting software (such as Quicken™). Conversely, it is envisioned that major financial accounting software will have the capability to execute the Transactions enabled by the present invention from within such applications, with all summary data being returned directly to the financial software's logs, etc.

The saved Transaction becomes a template for future transactions, whereby the user can reopen the saved Transaction and perform another vectored transaction at a future date, needing only to confirm the Criticals, and execute. Likewise, copies of existing saved transactions may be made, in order to rapidly edit these into new transactions which are similar to the original.

An example of this may be if the user wishes to create a second "Payment to Gas Co." transaction assembly, but with a different remittance entity in place of the original Bank account. The user would first click once on the existing saved transaction file icon, then, going to the "File" pull-down menu, select "Duplicate Transaction File", where the program will produce a carbon copy of the existing saved transaction, its name automatically adjusting to reflect that it is not the original, but a carbon copy. The user may then double-click this carbon copy, and the program will allow the user to edit, replace, and adjust any or all of the entities. The benefit to the user in doing this is that all settings for entities in the carbon copy will remain the same as they were in the original (although they could be changed at the user's discretion), so that, for example, the Vector direction would already be properly set as required to make the remittance to the Gas Co.

Note that although the Transaction is described as being tested prior to execution, the user can set up a Transaction and then proceed straight to execution, thereby skipping the Test function.

Although the Traditional Simple Transaction uses only a small portion of the full capability of the distributed finance system consistent with the present invention, it is likely that this function is one of the most readily available to users at the current time. Because the distributed finance system consistent with the present invention is a third-party platform, a user can maintain a single account, and via the same account and login system, monitor any number of diverse accounts, whether bank accounts, credit card accounts, utility bills, various loans, investment portfolios, etc., and build, test, and execute transactions from any or all of them as desired using empirical transaction party-entities and transaction object-entities as described in part herein.

Traditional Compound Transaction

In one embodiment consistent with the present invention, a Traditional Compound financial transaction can be assembled, tested, and executed, similar ot the Traditional Simple transaction. Essentially, as stated above, the Traditional Compound Transaction involves two entities which are not normally connected in traditional financial systems. Since the Traditional Compound Transaction can take many various forms, three examples will be described. Further, since the user interface has been described in detail with respect to the Traditional Simple transaction, the user interface will not be described in detail hereafter.

EXAMPLE 1

Once the user has logged in, been authenticated, and has brought up a "New Transaction", and is at the blank Transaction Workpad as described above in the Traditional Simple Transaction, the user may then continue with the same process as described in the Traditional Simple Transaction. For example, the user may wish to choose "My Stocks", and by mouseovering the "My Stocks" icon, the program may access the user's account and obtain and display any real time data related to the account.

In one example consistent with the methods and systems of the present invention, the user may chose "My Stocks", and "My Auto Loan"—the current auto-loan in question having, for example, 18 months of payments left to make. The user may now build a transaction using these two icons and a Transaction Object icon—"Sell"—to sell whatever stocks the user wishes, and then user a Capital Asset Vector to direct the liquid capital to pay out the Auto Loan in full—as a single programmed transaction, with everything recorded and managed by the distributed finance program of the present invention.

As with the Traditional Simple Transaction, the user may assemble the transaction, test it, modify it, and then execute it as one transaction. Thus, there is no need to have interbroker or intersticial parties involved in the financial transaction.

Note that the MaQs program module will take care of communicating with the marketplace and executing the commands that are structured using the VfT program module and coded using the CDMX program module. The VfT program module will keep a viewable record of all transactions, updated by information fed from the MaQs program module and the CDMX program module. Also, the VfT program module will save the transactions and make them available for review and tracking purposes, to analyze amounts, counterparty account numbers, times, etc.

EXAMPLE 2

In another example consistent with the methods and systems of the present invention, under the "New Transaction" menu, the user may choose an option such as "Query", and may choose from a number of options such as "Loan", "Insurance", etc. In this case, the user may choose "Loan", at which point the program will prompt the user to enter various loan parameters (i.e., "Set Loan Parameters" option). Once the user enters the parameters, the program will query the marketplace (i.e., banks, credit card companies, etc.), or the distributed capital system community (to invite a multitude of lenders to participate in syndicating a loan), for loans of the user's specifications, and return real-time information on interest rates, credit data, etc. If the user decides to apply for a loan, the user may do so, and may do so on-line, either with a single counterparty such as a bank (which would constitute a Traditional Simple transaction), in the traditional manner, or with a multitude of lenders, in syndicate fashion, automatically orchestrated by the present program of the invention (which would constituted a Collaborative Simple transaction). Regardless of which approach is used to secure the loan, this initial activity is in this example hereafter linked to successive transaction activity, and becomes a component of a Traditional Compound transaction. In this way, the transaction types are not restricted to being used only as independent transaction types, but may be combined to achieve whatever streamlined result the users can come up with.

Figure 18:
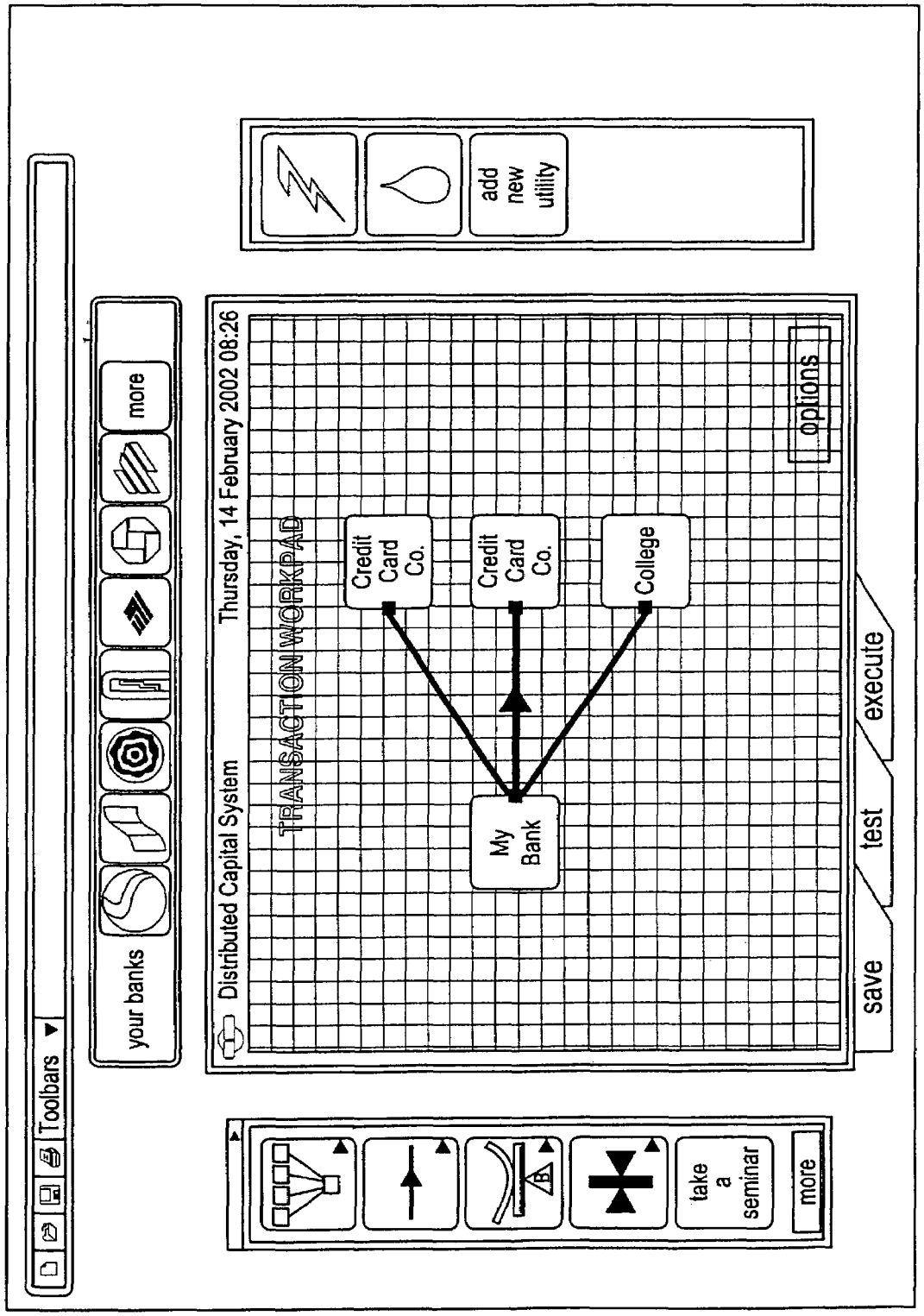
FIG. 18 is a screen shot of an assembled Traditional Compound transaction according to one embodiment consistent with the present invention.

Assuming that the user is granted a loan on-line, for example, and has funds available at the bank or credit union etc., the user may then deploy the loan funds to pay off the user's credit cards or child's college loan, etc., for example. The Transaction is similar to the Traditional Simple transactions in that the user brings up the "My Loan" icon, the "My Credit Cards" icon, and "My College Loan" icon, connects them with a "Transaction Object" such as "Capital Asset Vector", and uses the loan funds to pay off the credit card and college loan bills (see FIG. 18).

Note that funds can be split from the Loan using more than one "Capital Asset Vector". The program can be directed to execute the emanating Capital Asset Vectors simultaneously, or in series. Testing and execution requests could be instituted for all the pending Transactions at one time.

Further, one of ordinary skill in the art would recognize that this type of Transaction can be accomplished between any entity which is interacting with a number of different targets (i.e., an employer paying his employees their salaries, etc.).

EXAMPLE 3

In yet another example consistent with the methods and systems of the present invention, the user may program speculative activity, where as in Example 1, the user wishes to "Sell" stocks, but only at a particular price. The program will provide the user with an option to set the parameters of the sale (as in Example 2, where Loan Parameters are set). Since the stock price can be obtained in real-time by the program and displayed for the user, the user will know if the stock price is lower than the price at which the user wishes to sell.

Accordingly, the program can provide the user with options to sell the stocks when the price the user wants is achieved, with the program testing the transaction in the marketplace at any interval, in real-time, as programmed by the user, or to sell the stocks at a particular time or date, whatever the price of the stocks is at that time, etc. (i.e., "Set Sale Parameters" function is provided as part of the menu, similar to that of "Set Loan Parameters").

The program also incorporates functions like trailing-stop-loss monitors such that users could preset the system to invest in certain financial instruments at a certain triggered event, and have the system automatically exit the investment, delivering profits back to the user's bank account accordingly, should the exit-trigger be tripped.

Accordingly, the user may program any type of speculative (or non-speculative) activity which can take place at a future time, according to the parameters set by the user.

In addition, the program, upon automatic execution of the Transaction when the parameters are met upon the "Test", the program can automatically (or upon request by the user) notify the user that the programmed Transaction has occurred, by providing a message to the user when the user logs in, or an e-mail to the user on the user's computer, or to his mobile telephone, pager, or mobile organizer, etc.

Thus, the Transaction can be performed remotely, securely, and automatically through the distributed finance system of the present invention.

Collaborative Simple Transaction

The difference between the Traditional Compound Transaction and the collaborative Simple transaction is that the former makes it possible for a single customer to manipulate multiple single-user accounts and transactions together in one place, whereas the latter creates the possibility of multiple customers participating in the same account and/or transaction. Methods and systems consistent with one embodiment of the Collaborative Simple Transaction is described below. Note as described above in Example 2 of Traditional Compound transaction, that the transaction types can be combined as users see fit to create extended transactions that achieve their needs.

EXAMPLE 1

In an example of a Collaborative Simple transaction, the user may set up an investment opportunity or other fund-raising activity, which is extended to other system users. The "investment opportunity" is set up by the user on the Transaction Workpad, similar to what is described in the Traditional Simple Transaction example, except that this type of transaction is offered to a predetermined number of users, or otherwise defined or constrained such as with a ceiling amount of desired investment funds (for example, for raising money to donate to a charity, or inviting others to invest in corporate securities).

Figure 19:
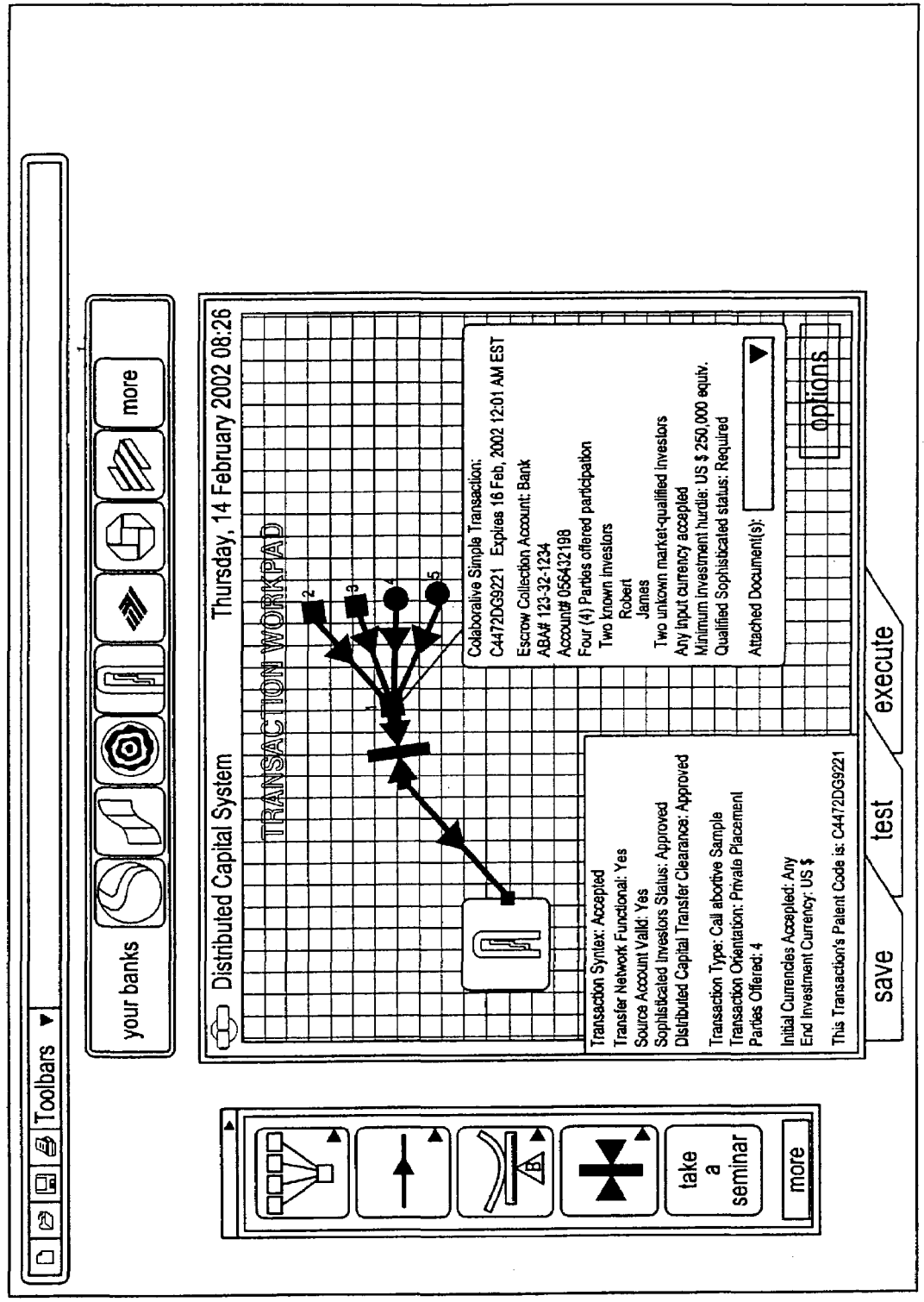
FIG. 19 is a screen shot of an assembled Collaborative Simple transaction according to one embodiment consistent with the present invention.

The user can then use the menu options, for example, to create the list of users ("invitees") to whom the user would like to send the "opportunity", or in another example, to choose variable constraints and offer access to the opportunity, to any user who meets the preset constraints. The distinction of the type of user participating in this kind of transaction may be visibly displayed on the user interface, perhaps with the named, specifically invited parties represented with a square object (FIG. 19), and parties unnamed but qualified per preset constraints represented with circles (FIG. 19). The CDMX module of the program will provide a unique parent transaction number for the offering, and then for each invitee user name a child code; also, CDMX will generate unique offering transaction invitee passwords for distribution to each invitee listed.

In addition, the user can access the menu and pull down Options, where the user can adjust various constraints on the transaction, for example a time limit on the acceptance and/or participation in the transaction (i.e., 30 days).

Once the invitees are confirmed by the user, the program will automatically notify those users' system accounts, such that the next time those users log into their accounts, they will see notice of the offering opportunity, perhaps in the form of a blinking icon, etc. Upon acknowledging, with a mouse-click for example, the notice of invitation to participate in the opportunity, the system will request input of the specific offering transaction password. If the user does not have this password, the offering will not be accessible. The invitees will receive their individual offering-specific passwords either via e-mail, (or by phone, post, etc.) In this way, the user owner of the transaction would have to mistakenly identify an invitee TWICE in order for the wrong person to accidentally gain access to a transaction that was not intended for him or her (once in identifying the said invitee to the system, and once again in communicating with the invitee, presumably by sending e-mail with the specific offering transaction password to the same wrong person.

In the case where the right invitee is notified of the offering successfully by the system, but the wrong person receives the offering specific transaction password, even if that person has a system account and logs in, there will be no notice of the offering invitation, and so the password will be useless. Conversely, if the system-identified invitee is mistaken and the wrong person receives invitation notice of the offering transaction, that user will not have the necessary password to access the opportunity. In this way the system is designed to be secure, and to limit by design inadvertent, unintended, and even undesired financial interaction.

If access is achieved via the correct system account being notified with the subsequent correct specific invitee offering password being inputted, the user will be given access to the "investment opportunity" by the system, via for example, during mouseover, or by right clicking on the mouse to pull up a menu, or dialog box, or the like. The transaction details will be provided in real-time by the program, and the program will provide all information to the user (i.e., amount requested, date requested, other investors, amounts other investors have provided, etc.).

After review of the "investment" transaction details, the invitee may then "accept" or "decline" the "offer" of the "investment opportunity". If the invitee declines the offer, then the program will delete the icon from the Transaction Workpad screen and in one example, provide the invitee with a means to send a comment to the offering party. The user may also exit the transaction without accepting or declining in the even the user wishes to review the transaction again at a later date.

If the user wishes to accept the transaction, the user can click "accept", for example, and can then proceed to set up a transaction similar to that of the Traditional Simple transaction, where, for example, the user accesses a bank account to remove money to pay an entity—in this case, the "investment opportunity".

As with the Traditional Simple transaction, the user can Test the transaction and Save it. Further, the user can set up a payment scheme to pay into the "investment opportunity", similar to the way that the user would set up a payment of a bill from a store using funds from his bank account or mutual funds account etc., which may include set or variable amounts remitted at regular or random intervals. Once the full amount is paid into the "investment opportunity", the program will close or make unavailable the icon, and the user will have a transaction record of the amount paid into the "investment opportunity" similar to that obtained when a bill is paid. This investment opportunity transaction event may not be re-usable in terms of investing again at a later date, however that transaction file may remain on the invitees client and be updated with real time information about the investment asset. In this way, even a one-time transaction event may be updated with real time information.

EXAMPLE 2

In another example consistent with the present invention, two system users may wish to collaborate in a purchase on-line. The purchase will require a number of different amounts of funds from each one or multiple of the two users banks accounts, credit cards, etc., to remit to the third person selling the item.

However, unlike e-currency systems, the seller does not need a special account to receive collaborative transactions, since the program can direct, via the MaQs program module, payments to existing accounts via existing infrastructure.

The transaction is built much like in Example 1, where a "purchase opportunity" can be built where a first user can invite the second user to pay into the "purchase opportunity" until collaboratively the purchase amount is reached. At that point, the first user can "invite" the seller to sell. To achieve this the first user will have the "purchase opportunity" automatically be sent to the seller via the program of the system, and then separately notify the seller either via e-mail, verbally, etc. of the specific opportunity password. Note that to participate in this kind of transaction users must have a system account (otherwise the double-secure approach to authenticating participants is difficult to achieve). The CDMX module of the program will follow each transaction to ensure that they are conducted securely.

EXAMPLE 3

In another embodiment consistent with the present invention, Example 1 can be used one step further, with a foreign currency exchange component. For example, as shown in FIG. 19, the "investment opportunity", identified as icon 1 on the Transaction Workpad, can be sent out to four potential participants, identified as icons 2-5. The user can set up a foreign exchange component (identified as the vertical bar between icon 1 and the user (large bank account icon at left), where any one of the entities to the transaction can supply funds in one currency to have it automatically converted into another currency. Here is another example of different transaction types combined to perform a single larger transaction. For currency exchange capability, see below in the Collaborative Compound example.

Collaborative Compound

This transaction is the most sophisticated of the four embodiments, and the one for which the system was primarily designed. In Collaborative Compound transactions, millions of users, for example, can be united in their pursuit of their financial goals. As stated previously, in Collaborative transactions, both sides of a transaction are considering themselves to be customers, and in doing so, fulfill each others' provider roles. Often the customers have no direct awareness of each other, and the present invention is simply using the Collaborative Compound embodiment to make the transaction more efficient or less costly or both.

There are no currently transactions today which follow this model, thus the following example is illustrative of a Collaborative Compound transaction.

The Collaborative Compound transaction consistent with the present invention is described in more detail hereinbelow. In Collaborative Compound transactions, the program utilizes all the major program modules, such as the VfT, SVR, CDMX, and MaQs program modules.

Further, although the first example provided below involves an exchange of currency, note that this can be accomplished in any of the different transaction types—from Traditional Simple to the present Collaborative Compound. For example, a Traditional Simple transaction involving payment of a bill can be conducted by paying an entity in France in French Francs (or Euros) for an item, and exchanging U.S. Dollars for the Francs (or Euroes). Thus, currency exchange is not the sole province of the Collaborative Compound example.

EXAMPLE 1

Figure 20:
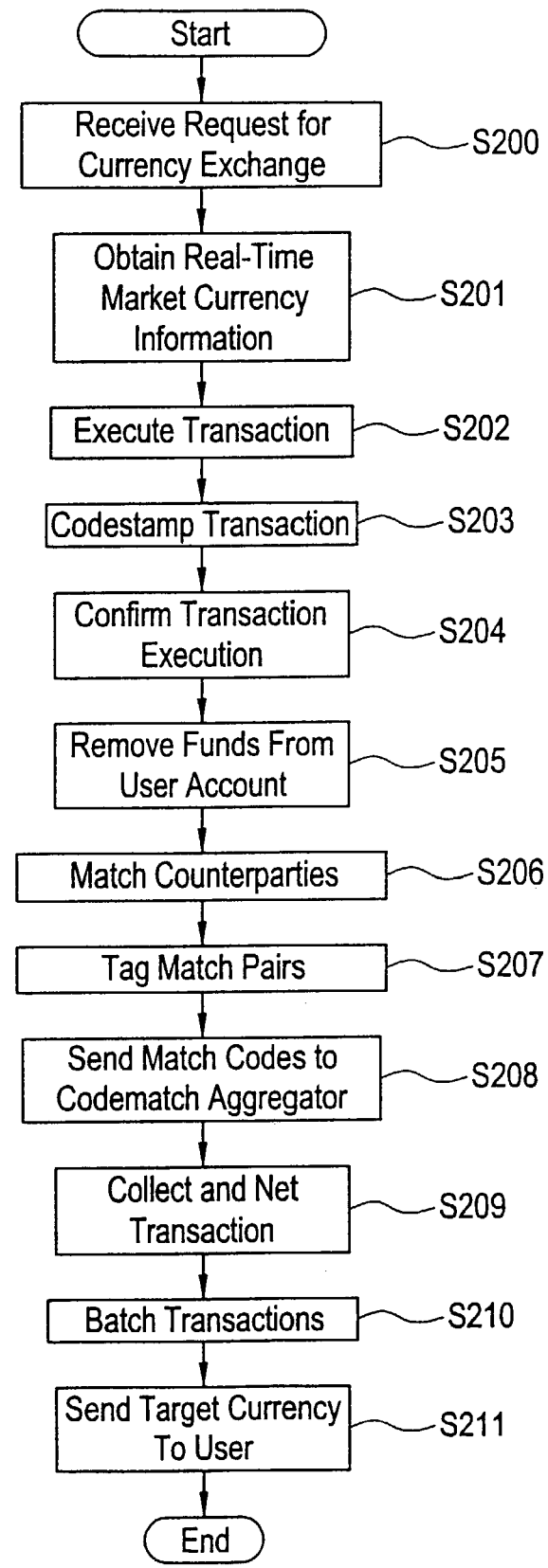
FIG. 20 is a flowchart of a method of conducting a Collaborative Compound transaction according to one embodiment consistent with the present invention.

Thus, in one example consistent with the present invention, and as previously described briefly with respect to Collaborative Compound transactions, a user's company may require British Pounds for certain activities. The user will access the system website and build a "Change Currency" transaction in step S200 of FIG. 20, on the Transaction Workpad, using the steps to assemble the transaction using the VfT program module, as described, for example under the Traditional Simple transaction. Once the user has built the transaction, the user can test, and execute the transaction if desired, as has been previously described.

When tested, the program will query, using the CDMX program module and the MaQs program module, to obtain real-time market currency rates in step S201, country, or counterparty data, if the user has indicated that he cares to know such info, and it is available, to present the user with the information such that the user can make the determination of whether the user would like to execute the transaction.

If the currency exchange rate is not what is desired by the user (i.e., the cost of British pounds is too high), the user will be able to program the transaction such that the program can keep querying the marketplace at scheduled intervals until the currency reaches a certain exchange value, or the user can program the transaction to occur on a certain day, etc., as has been described previously with respect to other simpler transactions. The scheduled transaction is designated a passive-fill or passive type transaction by the program by default, unless indicated by the user to be performed immediately (i.e., real-time), or by event trigger, which is the fixed type.

If the user decides to execute the transaction in real-time in step S202, the program will invoke the CDMX program module to codestamp or assign a unique transaction number (i.e., parent code) in step S203 to track the transaction through the system. The program will preserve the recorded information regarding the transaction in encrypted form using the CDMX program module, and confirmation data is passed back to the VfT program module by the program in step S204, which provides this information to the user via the user interface. Note that in a real-time designated transaction, funds would not be removed from the user's accounts in step S205 upon execution of the request, but after fulfilling the request (i.e., matching of counterparties or assignment of match codes as described below), such that execution instructions to the relevant account(s) could be sent immediately (i.e., instructions are not possible until match-pairing is resolved).

Once the program has codestamped the request, the program invokes the MaQs program module, and the SVR program module to execute the transaction. Once the MaQs and the SVR modules of the program are invoked, using one of the major algorithms, such as an arithmetic mean or an algorithmically calculated separator, the SVR program module will match counterparties to achieve the desired transaction in step S206.

In particular, the transaction vectors are separated according to direction and amount type (e.g., currency pair) and ranked by value. The SVR program module then proceeds to cross-match according to the varying algorithms described previously.

As stated previously, if an amount is originally classified by the program as active-seeking, the program will seek to fulfill the request with a single counterparty match amount. Further, if an amount is originally classified by the program as passive-seeking, then it will be reduced by active-seeking amounts until it falls below the mean and is reclassified to become an active-seeking amount itself, after which it is filled and the transaction is completed.

Thus, the matching of a request to exchange dollars for British pounds, and a request by another user to exchange British pounds for dollars, can be matched using at least one of several algorithms. Regardless of what algorithm the program uses for the exchange (and this algorithm is programmable), the SVR program module will always produce counterparty match-pairs.

The program will match a request for British pounds by the user with a matching request for U.S. dollars by another user holding British pounds. If there is a larger amount on one side than the other, and there is a non-zero remainder left on either side after a match is made, then the program matches the remainders on another pass through the system. For example, as a large transaction passes through the system, the SVR program module will break up the transaction amount into a number of pieces, and match each one to a different counterparty in successive transaction passes through the system.

The CDMX program module will be invoked to codecycle and track the individual parties (tag the match pairs) through the counterparty matching resolution (vector-spreading) process in step S207, and to create several additional child-codes to track the different or successive pieces of the transaction through the matching process, and make the transaction pieces traceable to the parent transaction, until all remainder amounts are matched or resolved. Each of these codes are logged in an accounting tracking ledger by the CDMX program module, and sent to accumulate in the Codematch Aggregator (further described below) in step S208. After the matches are made, the CDMX program module will reassemble the transaction pieces, prior to payment execution, such that the end result is the accomplishment of the desired transaction.

Note that the system does not handle each transaction to completion, in strict serial fashion, but will push successive transaction requests into the mix, or interlace the transactions, even while a current transaction is still in the midst of being fulfilled.

Since the SVR program module handles multiple transactions simultaneously, the matched pairs will have a multitude of counterparties.

Thus, the program invokes the Codematch Aggregator function of the CDMX program module for collection (aggregation of same-user transacted amounts), and netting (amounts are netted) in step S209, before the program invokes the MaQs program module to execute the funds transfer instructions from the user's account to the appropriate user-destination account, which sum equals the full, originally intended transaction, performed over the existing financial systems infrastructure. Thus, the Codematch Aggregator program, may, according to programmed setting, wait to activate the Bank Multiplexer program so that the transfer of funds to the user account can be batched in step S210. The CDMX program module will log the confirmation and tracking information of the executed transaction.

In SDEX (real-time, immediate transfer) transactions, instructions will be executed to user accounts after counterparty matches are already executed. In CDEX (fixed and passive-fill) transactions, user accounts may be initially remitted to a system-owned account (see Investment Engine below), for holding, during and after the time counterparty matches are resolved by the SVR program module, until the precise user-indicated transaction takes place. In the event that the transactions involve currency conversion, and are not designated as speculative by the owners of such transactions, the system may at its own programmed discretion, draw down funds immediately for holding in the base currency, or convert and hold in the target currency, until the user's prescheduled transaction comes due and calls for the funds.

As stated with the Traditional Simple transaction, the program notifies the user of the completion of the transaction, and the deposit of the target currency to their account, and the debit of the corresponding amount in their currency, plus any fees from their own account, via messages within their login account, e-mail, or by phone, cell phone, fax, or any other medium desired. Fees debited for the transaction are channeled to the system-owned account by the program, as profits.

EXAMPLE 2

Figures 21A, 21B, 21C:
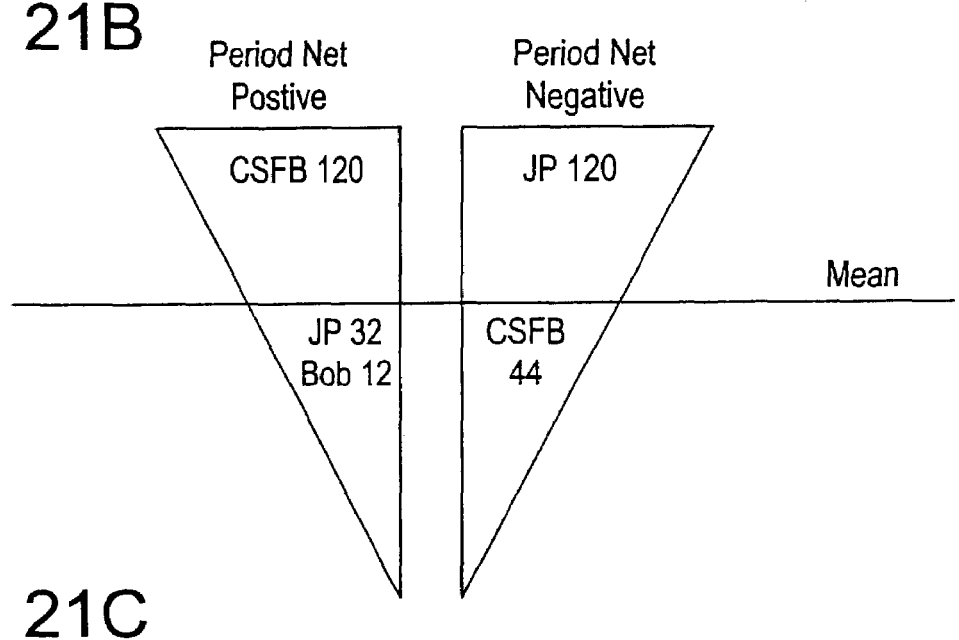
FIG. 21A is a table showing a macro ledger kept by the Code Division Multiple Transaction program module in a Collaborative Compound transaction according to one embodiment consistent with the present invention.
FIG. 21B is a diagram showing the parties to a Collaborative Compound transaction being processed by the Spread-Vector Resolution program module, according to one embodiment consistent with the present invention.
FIG. 21C is a table showing a macro ledger empirically reduced, which is kept by the Code Division Multiple Transaction program module in a Collaborative Compound transaction according to one embodiment consistent with the present invention.

As shown in a second example consistent with the present invention, in FIG. 21A, Enterprise A's−44 amount is an active-seeker, which the program cross-matches to Enterprise A's+120 in FIG. 21B, creating a 44 zero-sum pair, and leaving a system remainder of Enterprise A of +76 (see FIGS. 21A and 21C).

The program active-seeks Institution B's+32 to create a 32 zero-sum pair (see FIG. 21A), leaving Institution B's−88 in the system, which the program immediately matches with the active-seeker Bob+12, creating a 12 zero-sum pair and leaving Institution B's−76 in the system (see FIG. 21C). The program creates for the Enterpise A+76 and Institution B−76, the final zero-sum pair for the period, leaving the system empty (confirming the zero-sum for the universe) (see FIG. 21C).

Thus, the Macro Ledger zero-sum pairs are listed in FIGS. 21A and 21C, and when a zero-sum pair has the same counterparty on both sides, it can be eliminated by the program, producing the empirically reduced Macro-Ledger of FIG. 21C. The empirical Macro Ledger of FIG. 21C displays the most efficient capital vectors (amounts and directions). If all the amounts were transferred independent of netting, 164 units of capital would move. If single party netting is used, 100 units of capital move (88 from Institution B to Enterprise A, 12 from Enterprise A to Bob). If Spread-Vector netting is used, only 88 units move (as indicated in the macro empirical ledger below Institution B moves 12 to Bob, and 76 to Enterprise A). This minimum capital movement still satisfies the net ledger account for each party in the universe (by summing the values in each of the individual ledgers for Enterprise A, Institution B, and Bob).

EXAMPLE 3

In another example consistent with the present invention, on a larger scale, instead of a single user changing funds into British pounds, a country, like the United States, could pay the United Nations US$4 million in back dues, converted to Euros, for example, to be deposited in a Geneva bank account. The present system can execute such a compound transaction and match the individuals and business in Europe (that hold Euros and are seeking Dollars) with the request for Euros by the U.S., to resolve a perfect collaborative match among thousands or millions of unknown counterparties. The present system's efficacy is not limited strictly to currencies, but to anything that may be treated as a fungible instrument of trade.

Note that if the system does not have enough resident liquidity to meet the needs of a currency exchange, or any transaction, the program can automatically check the marketplace and channel conversion requests to traditional banks to meet the requests. This capital infusion would be transparent to the users, excepting the pass-through of any traditional-market fees that would result. It is conceivable, in the event of a liquidity crisis, for conversion requests to not be met, and likewise, that the general marketplace as well would not have anyone willing to supply a target currency.

In other words, the system described herein cannot avert liquidity crises, however the program can give early warning of such things given daily volumes monitoring, etc., and due to the fact that the transactions can be programmed and scheduled (passive-fill), some degree of moderation may result as the system could be programmed to execute pre-scheduled passive-fills during periods of slackening liquidity.

Furthermore, due the fact that Distributed Funds Transfer (DFT) (described below) is enabled by this system, a very early warning of mass-market worldwide liquidity crises may result since the system is capable of bypassing regulations that stem from the politics of capital flight (which create a drag on the free flow of capital), and system personnel may notice more clearly, the initial localized liquidity crises that would occur from people trying to export capital from a country, and not being able to use the system's DFT function because of the lack of parties demanding the would-be capital-exporters' base currency, and not because of regulatory restriction, etc.

EXAMPLE 4

In another example of a Collaborative Compound transaction consistent with the present invention, an exchange of capital funds can be made between two companies, self-selecting each other, or randomly matched, which have capital management needs that are complementary to each other. If for example, an American company wishes to repatriate RMB profits earned in China, back to the US (as US Dollars), there are likely to be restrictions on transferring funds out of China. And if a US company wishes to have a supply of US Dollars converted to RMB for the sake of new investment in China, there are likely to be restrictions on bringing in new capital.

The SVR program module, executing a Distributed Funds Transfer process, could, given proper settings of target bank accounts, simply resolve a vector schedule that comprised of two domestic transfers, one in each the US and China, to each the opposite company's accounts from the local company's account. At face value this would appear to be two independent, unrelated domestic movements of funds, but as a macro event would amount to the two companies swapping their hard currencies via a distributed system. In this way, the two companies could each achieve their objectives to move money across an international boundary, but without the difficulties, notice, cost, and possible restriction on international capital movements.

If the immediate request date cannot be met or the amount of funds filled for some reason, the program will prompt the user to wait until a system-suggested date, or to cancel the transaction for a later time. Once the transaction can be executed, the funds are drawn from the bank accounts of both parties to the transaction, and the program will fill the requests and remit the amounts in the target currency to the users' bank accounts.

Investment Engine for Profit and Philanthropy

In one embodiment consistent with the present invention, at the user's direction, or, for passive-fill request types, the program—via the CDMX and MaQs program modules—will aggregate distributed capital flows through a revolving door holding account, with funds being used to temporarily hold risk-free or low-risk investments.

As stated above, the passive transaction type is the default type, and is characterized by the user indicating that the transaction must occur by a certain date. This means that any time up until that date may be construed as a date which is acceptable to initiate, execute the transaction, and use the capital. Accordingly, the system can pull the funds of a passive-fill transaction, and hold those funds in the account for short-term investments. Further, for certain immediate transactions, such as currency exchange, the system may charge a fee premium.

Specifically, as stated above in the Collaborative Compound transaction, when the user initiates a passive request currency exchange transaction, for example, the program (i.e., the MaQs program module) may remove the user's funds immediately from his account and move the funds to a holding account within the system, and the funds—along with other funds from other temporarily held accounts—may be invested in money market accounts, or savings accounts at traditional financial institutions, etc., which have low or zero risk (because the funds must be returned to the owners or sent along the way to finishing the transactions they started out completing), even if the owners have given their approval for investments.

The program automatically pulls market data and checks what types of financial instruments are available within the necessary risk parameters, and determines the opportunity cost of capital for each choice (i.e., cost of entry, exit, and capital requirements). The program then checks the rate of capital vector flow and egress into/out of the system and the rate, as well as the rate of capital vector flow into the code-matching system, and determines the "optimal" capital exercise option which provides the best return for the required system liquidity level (i.e., rate of capital drawdown by the Bank Multiplexing function, and the system desired rate as called for by the Codematch Aggregator function).

Among the types of zero or nearly zero risk options which generate very small returns on an individual scale, but when multiplied by millions and millions of times over a year, for example, would aggregate to significant amounts of generated income, are: aggregated funds into a bank account held by the system for overnight interest income; purchase of secured loan portfolios of AAA ratings; purchase of U.S. Treasuries with leverage, selling them for cash, putting the cash into a bank account for interest income; purchase of U.S. Treasuries with leverage, selling them for cash, and lending the cash to a AAA rated corporation; and buying U.S. Treasuries with leverage, lending to a Hedge Fund overnight or longer, etc.

When the counterparty matches are scheduled to take place, or when the due dates are coming due on and execution instructions will soon call this diverted capital, the program waits for matches to occur, then the program remits the funds where they need to go, albeit form a source account that is owned by the system, and not the original user's account. Individual accounts may be used to generate this investment directive, or a percentage of the aggregate of capital flowing through the system can be used. The user may know or not know that the money is being used for investments.

Note that when the system requires capital return to complete a user transaction, instead of unwinding the investments in place, made by previously diverted funds, the program will divert newer incoming capital to fill the user transaction. When the investments are returned to the system, they are also available as new capital to fulfill transactions.

The profits engendered by the investments can either be returned to the user by the program, if the user so directs (i.e., the user can set up a transaction to take place at a later date, authorizing the funds to be removed immediately and placed in a money market account until the transaction takes place, with the profit being returned to the user while the initial transaction amount moves forward to be executed); or the profits can be directed by the user to be, perhaps aggregated, and used for philanthropic purposes. The system profits can also be reinvested automatically, to aggregate funds for capital purchases to update the system, or for philanthropic purposes at a later date etc.

Because the program tracks and executes everything, investments could be held indefinitely, with new incoming distributed source funds being deflected by the program to pay for prior source purchases, and this deflection (shifting) of funds does not increase systemic risk, because 1) most purchases are made online with a credit card, and 2) the present system can easily require pre-allocation of usable funds into a one-way account.

Once distributed-source funds are used to generate profits for philanthropic reasons, particulate tax-credits can be automatically issued back to each source by the program, and further, the program can grant allocation votes commensurate to each particulate amount. Allocation votes allow each participant to have a democratic say in how the philanthropic funds are to be used, with available options orchestrated by professional philanthropic experts. Further, the present system could issue tax credits, based on a weighted average from the record logs, from its philanthropic activity back to the users as a benefit for the capital they allowed the system to use.

Thus, other financial services in the investment arena, can be offered to the users. Further, if the user does not wish to use his own money in taking advantage of the investment opportunities, the user can perhaps borrow money from a financial institution to partake of the investment opportunities.

Capital Infusion

In one embodiment consistent with the present invention, as stated above, the MaQs program module periodically automatically checks the system to ensure that there is enough liquidity to readily facilitate the proper functioning of the system. If the system is severely asymmetrical (based on the arithmetic mean, or the like, or a fluctuation of more than 10 percent, for example, variation with the Oppside) the program will automatically use new capital by opening itself to traditional banking channels such as JP Morgan, which may be interested in a new source of business, or in the event that the owners of the system wish to put some of its own capital, system profits could be used (i.e. invested in the operations of the business).

This capital infusion would be transparent to the users, and codematching would continue without stopping with any unmatched requests simply passing through the system over and over until filled.

Credit Operation

In another embodiment consistent with the present invention, in addition to a philanthropic motivation for the aggregated funds or profits engendered in the above operations, the system would encompass more-sophisticated functions which can become entire systems onto themselves.

For example, the program could offer a credit service operation, extending credit to a system user, group, small business, or even large corporation, and issuing credit and/or ATM cards, similar to what banks offer presently (in this case, since the system is tied into the user's accounts, it can easily perform a credit rating on the user when the user requests a credit card or credit line or loan); or the credit rating could be generated on a distributed basis as explained below. This credit rating may be generated in conjunction with the CDMX program tracing function of actual payments, rather than relying on $3^{rd}$ party credit bureaus such as Equifax, et al.

To get users started with a system-determined credit rating, the evolution of the credit ratings may follow that of Ebay™, whereby account usage would be the primary factor in communicating the user-rating. However, the basis for the user credit rating could also proceed a number of other ways, including being based upon some mathematical equation that takes an existing credit score input to arrive at a non-zero initial rating for each user. The initial credit-score input could be a formal credit-bureau score, or an adapted one based on the submitted record(s) of a user's credit card usage, manipulated by the program via some algorithm, to arrive at a range or a specific number, which would be the initial credit rating that the user could then use to begin participating in the collaborative environment.

Lending and Microlending

In another embodiment consistent with the present invention, the system could offer a direct-lending system where users of the system can rate and lend/borrow from other system users (whether individuals or corporations), as well as from the system itself if the system should have accounts activated for that purpose.

In the direct-lending system, a user can offer funds to other remote users (which may be used in Africa for example) at a defined interest rate and payment schedule, and borrowers can borrow money at a certain interest rate and payment schedule, and the borrowers/lenders need not be aware of each other since the program automatically debits the accounts of the borrowers and credits the accounts of the lenders at the scheduled times and will even automatically execute currency conversions to repatriate loan repayments.

Another example is microlending. The microlending model architected by the Grameen Bank Project uses a peer-to-peer network-effect, albeit offline, and on a very small and local scale.

With the collaborative functionality of the present invention described herein, microlending can be facilitated on a global-local scale, making it possible for individuals to easily and swiftly direct their own capital flows toward any corner of the planet they choose. With the collaborative object model of the present system supporting the same network-effect peer-relationships (i.e., self-selecting committed individuals), the potential to bring unprecedented speed and fluidity to involvement, commitment, and funds flow to humanitarian efforts, rescue efforts, emergency efforts, etc. is within reach.

Thus, while Grameen Economics deals with micro amounts offline (even if funds are collected from donors online, the distributions of the donations happens offline, distributed by a governing organization), the system described herein would support collaborative transactions and direct disbursement at any amount level, whether micro, or massive, allowing users to lean on personal relationships, reputation, and integrity to win participants (i.e., peers) in the borrowing or investing opportunities they offer; and then interact with each lender/investor directly or as a group.

In the communal-direct approach to borrowing and lending of the present invention, the CDMX program module will be tracking everything, and "success points" could be awarded to all participants for aligning themselves with a successful credit transaction, thus becoming an incentive. The accumulation of these points, displayed in the user interface by the program, would amount to a distributed credit-rating system, or more broadly, a distributed integrity rating, whereby the network of participants could begin to make assessments about the credit-worthiness of a stranger, based upon previous record.

This would pave the way for users, companies, etc. to charge higher interest rates for money lent (i.e., high-quality lenders or investors known for being involved in successful transactions can charge a premium because their participation in a deal often provides a psychological element that facilitates further participation by others, and ultimately success for the transaction), and lower borrowing rates (reliable borrowers will have a superb record of payment, and will enjoy excellent credit, hence lower rates for borrowing). Additionally, the integrity premium enjoyed by honest and reliable participants in the community (system), may also include advantaged or preferential access or offering ability for investment etc. that others with lower integrity ratings would not have access to.

Universal On-Line Purchasing

In another embodiment consistent with the present invention, traditional on-line purchases can be made (i.e., Traditional Simple transactions), where the user can utilize the option of paying with the system either as a direct debit from a user account (i.e., bank, sale of stocks etc., which is set up like any of the previously described transactions), or a system loan (as previously described), or the system credit card. These transactions can be carried out in real-time, or at a programmed time, which allows the user flexibility in making his purchases.

However, in some cases, currency is an issue where one user is in the U.S., for example, and wishes to purchase an item in another country which is listed in a foreign currency. Using the present invention, when making a purchase, the user may utilize the system to pay for the item, thereby authorizing the system to pay for the item in the target currency and deduct the user's account for the corresponding U.S. currency.

Specifically, after shopping on-line, at the checkout screen on the merchant's website, the user can select "Pay with The system" as the payment option. The system screen will be selected, and the program will prompt the user for his login and password (a specific password for only on-line purchases can be set up as well). The user can confirm his purchase at the Transaction Workpad screen, and using the system-merchant identification code, and any other identification code (such as for the item being purchased, or the purchase order number), can exchange currency as in the above Collaborative Compound transaction. The CDMX and MaQs program modules will track the purchase and execute the transaction, and transfer the target currency funds to the merchant account, and debit the user's account of funds. The program will notify the merchant that the funds have been provided and that the transaction is complete, and will also notify the user of the debit of funds from his account.

ATM Sharing

In another embodiment consistent with the present invention, using a concept called Quantified Access, non-native ATM cards can use any ATM machine in any bank-domain and not utilize Plus or Cirrus or other similar networks (which would incur fees).

Quantified Access means granting a temporary and quantified amount of access to deduct funds in a bank account not owned or associated or linked or in anyway associated with the ATM card which draws down the funds. The permission granted to the ATM card is such that any bank or any bank's ATM will recognize the ATM card as native.

It is conceivable that this can proceed without user permission (i.e., the instantaneous use of their accounts for temporary insertion of funds which are drawn down immediately, hence leaving the account in its original state). However, regulatory issues may require that he system users indicate permission for using their accounts for this purpose.

The process is as follows, a user goes to an ATM machine which is not native to the domain that his or her ATM card can use fee-free. This may be in any currency domain as well—it does not matter—since the system can execute the exchange transaction as required, which process is explained in detail below.

The user inserts a card, it is validated as a valid card by the ATM computer, where the computer checks for validation that the given ATM card is connected with a valid bank account at a real bank in the world.

Once validated, the user is usually prompted with a screen that indicates that there will be a charge of $1.50 or some similar amount for the transaction if it is not a free transaction for a native bank user.

Since software programs like Intuit's Quicken™ and other accounting software for end-consumers is already capable of downloading bank-account data over a network, it is conceivable that this account monitoring may proceed in real-time. Thus, the system may be set by the users, to track activity on accounts registered therein. If users have set their accounts to be responsive in this way, then, as soon as the user approves the potential fee charge for ATM usage on the ATM screen, the system program will be notified of the pending bank deduction for the ATM withdrawal, and will take over the transaction, not allowing the banks to proceed.

First, without canceling the user-session at the ATM, the program will halt the proceeding at the banks, not allowing a deduction at the home bank, nor allowing cash-dispersal from the ATM.

The program then moves funds from the user's account using the bank multiplexer program module, to any account X within the ATM domain that is being used for the current transaction, similar to what may occur given the willingness of any owner of such account X within such domain, to lend funds to quantified access for the user to withdraw. The CDMX program module updates the tracking logs accordingly. At the same time, the bank which owns the ATM is sent information by the program indicating that the non-native ATM card that was read at the ATM, has native-level quantified access to account X.

Funds are immediately dispersed from account X, leaving its balance in the original state (logs will show an instantaneous deposit and withdrawal of the same amount), and no fees are charged because the bank recognizes it as a native-ATM card withdrawal.

Thus, quantified access means that permission is provided by the program to deduct certain defined and limited amounts of funds from an account that the user does not normally have access to, such that the bank will recognize the ATM as a native account. In other words, the ATM card is temporarily and for a quantified amount only, being recognized as an ATM card linked to account X.

Now, since the cash dispensed at the ATM is not really physically taken from user accounts, and is just deducted electronically, it may not be necessary to actually have the system move funds into any X account; any generic account at the Bank should work, which means that if the system opens and maintains a bank account in any and all bank-domains, then it could simply use its own bank accounts and grant quantified access that way, essentially offering all the system users a shared account, thus bypassing ATM fees in any and all domains, anywhere worldwide.

Distributed Funds Transfer

In another embodiment consistent with the present invention, the present system can make any conventional funds transfer a distributed funds transfer, dispersed to a thousand different directions in small amounts, shifted via transitive resolution and collected at the destination as smaller-amount transfers that would converge to sum to the original amount. The SVR program module could do this such that the dispersion pattern is undetectable, which implies certain security or safety inherent in the system since external observation of the transfers would not yield any insight into the method of dispersion.

First, to offer a definition, a funds transfer, or electronic funds transfer (EFT) is the intentional targeted movement of funds over a network, from point A to point B.

A distributed funds transfer (DFT) is a method for using existing funds transfer networks, to the effect that a macro zero-sum awareness of the funds-flow universe allows for a vector polarization of funds-flow toward and away from two chosen points (i.e., the sender and receiver) such that the net at each the sender and receiver is fulfilled according to the directions of the original intended transfer, WITHOUT funds moving directly from the sender to the receiver.

Since communications transmission speeds over global interconnected networks approach instantaneous, it is possible for awareness propagation to provide nearby clients, servers, and servents with information about what is being experienced and what is visible to remote clients, servers, and servents. Note that in a network that operates at these speeds, "near" may include "global". Since the present invention uses existing infrastructure (which is subject to existing regulations) to execute funds transfer, the funds transfer is very difficult to predict and track externally.

This means that at the instant a (physically or geographically) remote entity R makes it known to the network certain information regarding the desire and intention to move funds from some point A near itself to some point B remote from itself in the physical, geographic world, some entity S may be considering a desire and intention to move funds from some point F near itself to some point G remote from itself in the physical, geographic world. In today's world, funds transfers are pursued each independently, in complete vacuum from any other transfer being carried out over the funds transfer networks. Only in the event of "netting" (which is a computational approach to reducing total capital movement between two parties by summing all in and out transfers to the same party over a fixed period of time, to achieve a "net" amount that can be sent at the end of the period), are multiple transfers considered with reference to other transfers.

With the system of the present invention, given risk-definition guidelines for each participant in the system-network, the program can watch via awareness propagation, for near-to-far and far-to-near funds transfer notices, and using preset algorithms at all participating clients, servers and servents, the program can achieve for example, a redirection of funds such that the total summed distance of all funds movement was minimized. This may for example, mean that instead of moving funds the long haul from A→B, and also the long haul from F→G, that two smaller transfers F→B, and A→G lower system-wide risk by reducing total amount of capital per time at risk, and fulfills the obligations of all parties.

In the present example, where A→B, F→G switch counterparties to reduce total capital travel, this is only feasible where the two intended transfers are equal. This parity (symmetric) condition stands as a threshold to critical mass, which explains why such a system does not exist today. The present invention solves this parity condition by entertaining all vectors in the universe, and more importantly, successive vectors in the universe. Since funds transfer networks experience a volume that is constantly rising, it is reasonably reliable to assume that successive vectors will come. The present invention is a unique system for managing fungible transactions that treats the transactions as vectors that are part of a vector field, or flow, theoretically assumed to be perpetual.

Specifically, as discussed below, the program first receives the user's command to send funds, via some funds transfer network. Then, the program of the system client/server/servent discovers via awareness propagation, an intended funds transfer targeting its own institution or one nearby. The client/server/servent of the present system identifies direct communication pathway to that remote client/server/servent, and opens communications. The two clients/servers/servents trade information about their intended transfer vectors, recording locally the net vector position intended at each target (recall a vector is a 2-dimensional entity, in this case containing amount information, and direction information). (Note: this now means that banking information can be completely redundantly dispersed, and to a large extent anonymously, or at least in encrypted form, to the extent that it would be virtually impossible to eradicate and destroy financial records; natural disaster, or terror aimed at eliminating assets in the name of equalizing all people would become an extremely remote threat to modern society).

The two clients/servers/servents recursively compute optimal transfer directions for any included intended vectors in a given defined period of time. Note that "recursively" assumes a constant interaction with a changing network population of intended transfer vectors (i.e., that awareness propagation is bringing every participating client/server/servent new information about new intended transfer vectors) that can now be included in the distributed transfer optimization process. "Optimal" is defined as the most efficient vector or vectors as computed in the context and extent of the period-awareness vector-universe.

Thus, in a Period Distributed (or Dispersed) Funds Transfer, because the program can achieve delivery of funds from a specific account A to a specific intended target account B without directly transferring funds from A to B, the DFT becomes an incredible tool for almost all high-value transfer agents, who are worried that their transfer lines may be compromised by hackers, terrorists, natural disaster, etc.

When periodicity concludes, optimized distributed transfers are executed by the program. Some net vector conditions remain unfilled, or only partially filled; and the successive period includes awareness of these unfilled and partially filled vector conditions. Various preset rules of the program hold that older incomplete net vector conditions will be filled first, thus bringing completion to each successive wave of uncompleted and unfilled transactions.

Thus, the present system brings the same relentless reroute-until-delivery-is-achieved reliability to fungible instrument transfer, as TCP/IP brought to communications via the Internet.

Security and Privacy Issues

Transaction vectors will be encrypted while in the system, providing complete privacy to all users of the system. However, vector amounts, directions, and identities may be decrypted separately at the order of legal authorities. The present invention's program may provide filters that recognize and alert system administrators to potential laundering type or tax evasion type activities.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A computer implemented method of conducting financial transactions over a computerized network, having at least a first client computer connected thereto, comprising:
    initiating a request at the first client computer for a financial transaction, said request being received at one of a second client computer or a first server;
    obtaining information, at said second client computer or said first server, from at least one entity having at least one of a third client computer or a second server involved in said financial transaction;
    confirming, at said second client computer or said first server, with said at least one entity that said financial transaction can be executed; and
        performing said financial transaction, at said second client computer or said first server, based on predetermined parameters input by at least said one entity, or said client computers or said servers involved in said financial transaction, that optimize capital or risk distribution utilizing at least a netting process, the results of said netting process which include at least one of an optimal number of payments or value transfers, an optimal amount of capital movement, an optimal distribution of risk, or an optimal combination thereof.

2. The method according to claim 1, further comprising: testing said financial transaction with said information at any of said client computers or said servers prior to confirming that said financial transaction can take place.

3. The method according to claim 2, further comprising: receiving and displaying said financial information on a display at any of said client computers or said servers.

4. The method according to claim 2, wherein said entity is a currency exchange entity.

5. The method according to claim 1, further comprising: saving said financial transaction at any of said client computers or said servers for future retrieval.

6. The method according to claim 5, wherein said financial transaction is saved as a template at any of said client computers or said servers for future financial transactions.

7. The method according to claim 6, wherein any of said client computers or said servers forwards a comprehensive transaction summary to said first client computer.

8. The method according to claim 7, further comprising: assigning a unique transaction number at any of said client computers or said servers to each said financial transaction.

9. The method according to claim 5, wherein said financial transaction is used in combination with other financial transactions to structure a compound financial transaction.

10. The method according to claim 5, wherein said financial transaction can be edited at said first client computer.

11. The method according to claim 1, wherein said information is obtained from said at least one entity prior to initiating any financial transaction.

12. The method according to claim 1, wherein said information is received during execution of said financial transaction.

13. The method according to claims 11 or 12, wherein said steps of obtaining information, and testing said financial transaction, include:
    sending a request from any of said client computers or said servers to said at least one entity for status information related to said financial transaction;
    accessing, at any of said client computers or said servers, an account registry, to obtain information on at least one account at said at least one entity, and obtain access-authorizing data for said at least one entity;
    timestamping said request and assigning a unique transaction code to said request at any of said client computers or said servers;
    retrieving said status information from said account registry which timestamps, codes, and stores said status information; and
    providing said retrieved status information from said entity to said first client computer.

14. The method according to claim 13, wherein at least one of said testing step is communicated to said first client computer in a distinguishable manner.

15. The method according to claim 13:
    wherein any of said client computers or said servers assembles, forwards, and presents a test transaction summary to said first client computer.

16. The method according to claim 13, wherein testing of said financial transaction can be programmed at any of said client computers or said servers to take place at one of predetermined times and when predetermined events are met.

17. The method according to claim 12, wherein said steps of obtaining information and executing said financial transaction include:
    sending a request to said at least one entity for status information related to said financial transaction;
    retrieving said status information from said entity;
    providing said retrieved status information from said entity to said first client computer;
    verifying said financial transaction can be completed;
    locking in said financial transaction; and
    receiving an execution instruction to execute said financial transaction.

18. The method according to claim 17, wherein said execution instruction step is communicated to any of said client computers or said servers in a distinguishable manner.

19. The method according to claim 18, wherein execution of said financial transaction can be programmed to take place at predetermined times and when predetermined requirements are met.

20. The method according to claim 1, wherein said financial transaction is performed immediately.

21. The method according to claim 20, wherein performing said transaction immediately is a default setting.

22. The method according to claim 1, wherein said first client computer forwards instructions to said second client computer or said first server to perform said financial transaction at one of a predetermined time and predetermined event.

23. The method according to claim 1, wherein said financial transaction is event-triggered.

24. The method according to claim 1, further comprising:
authenticating at any of said client computers or said servers prior to initiating the financial transaction; and
displaying at least one transaction icon on a transaction workpad representative of said financial transaction at any of said client computers or said servers.

25. The method according to claim 24, wherein said transaction workpad includes at least one entity icon representative of at least one financial account involved in said financial transaction.

26. The method according to claim 25, wherein said transaction icon includes at least one entity icon connected to a transaction object icon.

27. The method according to claim 26, further comprising;
receiving vector parameters at said first client computer for said financial transaction.

28. The method according to claim 27, wherein said vector parameters include, at a minimum, direction and amount.

29. The method according to claim 27, wherein all transaction parameters are encrypted.

30. The method according to claim 29, wherein filters are provided to detect illegal financial transactions.

31. The method according to claim 26, wherein said vector parameters further include at least one of currency type, date of payment, amount of payments, password, timing of payment, and triggering event.

32. The method according to claim 24, wherein said transaction pad includes at least one transaction object icon representative of a financial action.

33. The method according to claim 1, wherein said performing step comprises:
activating said financial transaction;
changing said financial transaction from inactive to active status; and
communicating said change of status to said first client computer.

34. The method according to claim 33, wherein execution of said financial transaction can be pre-set to require approval at said first client computer.

35. The method according to claim 1, further comprising:
notifying said first client computer that said financial transaction has been completed.

36. The method according to claim 1, wherein said performing step comprises:
preparing for execution;
verifying said financial transaction can be completed;
locking in said financial transaction;
executing said financial transaction; and
settling said financial transaction.

37. The method according to claim 36, further comprising:
following user preferences for one of authentication and approval prior to execution.

38. The method according to claim 36, wherein a subsequent financial transaction can be programmed at any of said client computers or said servers to be performed at a predetermined time after said financial transaction is executed.

39. The method according to claim 1, wherein said financial transaction is a loan.

40. The method according to claim 39, wherein said entity is a counterparty offering capital for loan.

41. The method according to claim 40, further comprising:
matching said financial transaction for said loan with said at least one counterparty offering capital for loan.

42. The method according to claim 1, wherein said financial transaction is a funds withdrawal.

43. The method according to claim 42, wherein said confirming step comprises:
granting quantified access to said entity for the user requesting said funds withdrawal, such funds withdrawal fees are not paid from the user to a disbursing financial institution when said withdrawal is made.

44. The method according to claim 1, wherein said financial transaction involves the transfer of funds, and said funds are transferred using a distributed funds transfer method.

45. The method according to claim 1, wherein a credit rating is developed from a pattern of usage traceable to any of said client computers or said servers.

46. The method according to claim 1, further comprising:
notifying any of said client computers or said servers that said financial transaction is in progress.

47. A computer implemented method of conducting a financial transaction over a computerized network, having at least a first client computer connected thereto, comprising:
initiating a request at the first client computer for a first financial transaction, said request being received at one of a second client computer or a server;
receiving information, at any of said client computers or said server, on at least one potential participant in said first financial transaction;
notifying, at any of said client computers or said server, said at least one potential participant of said first financial transaction; and
performing said first financial transaction, at said second client computer or said server, based on predetermined parameters input by at least said one potential participant, or said client computers or said server involved in said first financial transaction, that optimize capital or risk distribution utilizing at least a netting process, the results of said netting process which include at least one of an optimal number of payments or value transfers, an optimal amount of capital movement, an optimal distribution of risk, or an optimal combination thereof.

48. The method according to claim 47, further comprising:
receiving parameter constraints on said first financial transaction at any of said client computers or said server.

49. The method according to claim 48, wherein said parameter constraints include a time limit for acceptance.

50. The method according to claim 48, wherein said parameter constraints of said first financial transaction includes a required currency.

51. The method according to claim 37, wherein a currency provided by said potential participant for said first financial transaction is automatically converted to said required currency at any of said client computers or said server.

52. The method according to claim 48, wherein said at least one potential participant can set parameters for engaging in said first financial transaction.

53. The method according to claim 48, wherein said parameters include a predetermined credit rating.

54. The method according to claim 48, wherein said first financial transaction can be divided into a plurality of transaction vectors.

55. The method according to claim 47, further comprising:
receiving instructions from the potential participant at said first client computer on said first financial transaction.

56. The method according to claim 55, further comprising:
receiving a second request for a second financial transaction at any of said client computers or said server;
wherein a result of said second financial transaction is directed to initiate said first financial transaction.

57. The method according to claim 56, wherein when said first financial transaction is completed, the first financial transaction becomes unavailable to the potential participants.

58. The method according to claim 47, wherein an authentication process is required from the potential participant prior to accessing said first financial transaction.

59. The method according to claim 47, wherein said first financial transaction includes real-time status information.

60. The method according to claim 59, wherein said real-time-status information includes at least one of an amount requested, a date said amount is requested, identifying information of other potential participants, and amounts already provided by other potential participants.

61. The method according to claim 47, wherein each potential participant can limit their engagement with any other potential participant in said first financial transaction.

62. The method according to claim 47, wherein said at least one potential participant can decline to engage in said first financial transaction with any other potential participant.

63. The method according to claim 47, further comprising:
automatically locating other potential participants in said first financial transaction.

64. A financial services system comprising:
means for initiating a request at a first client computer for a financial transaction, said request being received at one of a second client computer or a first server;
means for obtaining information, at said second client computer or said first server, from at least one entity having at least one of a third client computer or a second server involved in said financial transaction;
means for confirming, at said second client computer or said first server, with said at least one entity that said financial transaction can be executed; and
means for performing said financial transaction, at said second client computer or said first server, based on predetermined parameters input by at least said one entity, or said client computers or said servers involved in said financial transaction, that optimize capital or risk distribution utilizing at least a netting process, the results of said netting process which include at least one of an optimal number of payments or value transfers, an optimal amount of capital movement, an optimal distribution of risk, or an optimal combination thereof.

65. The system according to claim 64, further comprising:
means for testing said financial transaction with said information at any of said client computers or said servers prior to confirming that said financial transaction can take place.

66. The system according to claim 65, further comprising:
means for displaying said information on a display at any of said client computers or said servers.

67. The system according to claim 64, further comprising:
means for saving said financial transaction at any of said client computers or said servers for future retrieval.

68. The system according to claim 67,
wherein any of said client computers or said servers assembles, forwards and presents a comprehensive transaction summary to said first client computer.

69. The system according to claim 68, further comprising:
means for assigning a unique transaction number to each said financial transaction at any of said client computers or said servers.

70. The system according to claim 64, further comprising:
means for authenticating any of said client computers or said servers prior to initiating the financial transaction; and
means for displaying at least one transaction icon on a transaction workpad representative of said financial transaction at any of said client computers or said servers.

71. The system according to claim 70, further comprising:
means for sending a request from any of said client computers or said servers to said at least one entity for status information related to said financial transaction;
means for accessing an account registry at any of said client computers or said servers to obtain information on at least one account at said at least one entity, and obtain access-authorizing data for said at least one entity;
means for timestamping said request and assigning a unique transaction code to said request at any of said client computers or said servers;
means for retrieving the status information from said at least one entity;
means for providing the retrieved status information to said account registry which timestamps, codes, and stores said status information at any of said client computers or said servers; and
means for providing said retrieved status information from said at least one entity to any of said client computers or said servers.

72. The system according to claim 70, further comprising:
means for receiving vector parameters for said financial transaction at any of said client computers or said servers.

73. The system according to claim 64, wherein said performing means comprises:
means for activating said financial transaction;
means for changing said financial transaction from inactive to active status; and
means for communicating said change of state to any of said client computers or said servers.

74. The system according to claim 64, further comprising:
means for notifying any of said client computers or said servers that said financial transaction has been completed.

75. The system according to claim 64, wherein said performing means comprises:
means for preparing for execution;
means for verifying said financial transaction can be completed;
means for locking in said financial transaction;
means for executing said financial transaction; and
means for settling said financial transaction.

76. The system according to claim 64, wherein said at least one entity is a counterparty offering capital for a loan.

77. The system according to claim 76, further comprising:
means for matching said financial transaction for said loan with at least one counterparty offering funds for the loan.

78. The system according to claim 64, further comprising:
means for granting quantified access to said at least one entity for an account traceable to at any of said client computers or said servers requesting said financial transaction, such that fees associated with said financial transaction are not paid from the account traceable to at any of said client computers or said servers to a disbursing financial institution when said financial transaction is made.

79. The system according to claim 64, further comprising:
means for notifying any of said client computers or said servers that said financial transaction is in progress.

80. A financial services system comprising:
means for initiating a request at a first client computer for a first financial transaction, said request being received at one of a second client computer or a server;
means for receiving information, at any of said client computers or said server, on at least one potential participant in said first financial transaction;
means for notifying, at any of said client computers or said server, said at least one potential participant of said first financial transaction; and
means for performing said first financial transaction, at said second client computer or said server, based on predetermined parameters input by at least said one potential participant, or said client computers or said server involved in said first financial transaction, that optimize capital or risk distribution utilizing at least a netting process, the results of said netting process which include at least one of an optimal number of payments or value transfers, an optimal amount of capital movement, an optimal distribution of risk, or an optimal combination thereof.

81. The system according to claim 80, further comprising:
means for receiving parameter constraints at any of said client computers or said server on said first financial transaction.

82. The system according to claim 81, further comprising:
means for receiving instructions from the at least one potential participant on said first financial transaction.

83. The system according to claim 80, further comprising:
means for receiving a second request for a second financial transaction;
wherein a result of said second financial transaction is directed to initiate said first financial transaction.

84. A computer-readable medium whose contents cause a computer system to perform financial transactions over a computerized network having at least a first client computer connected thereto, the computer system having a program which performs the steps of:
initiating a request at the first client computer for a financial transaction, said request being received at one of a second client computer or a first server;
obtaining information, at said second client computer or said first server, from at least one entity having at least one of a third client computer or a second server involved in said financial transaction;
confirming, at said second client computer or said first server, with said at least one entity that said financial transaction can be executed; and
performing said financial transaction, at said second client computer or said first server, based on predetermined parameters input by at least one entity, or said client computers or said servers involved in said financial transaction, that optimize capital or risk distribution utilizing at least a netting process, the results of said netting process which include at least one of an optimal number of payments or value transfers, an optimal amount of capital movement, an optimal distribution of risk, or an optimal combination thereof.

85. A computer-readable medium whose contents cause a computer system to perform financial transactions over a computerized network, having at least a first client computer connected thereto, the computer system having a program which performs the steps of:
initiating a request at the first client computer for a first financial transaction, said request being received at one of a second client computer or a server;
receiving information, at any of said client computers or said server, on at least one potential participant in said first financial transaction;
notifying, at any of said client computers or said server, said at least one potential participant of said first financial transaction; and
performing said first financial transaction, at said second client computer or said server, based on predetermined parameters input by at least said one potential participant, or said client computers or said server involved in said first financial transaction, that optimize capital or risk distribution utilizing at least a netting process, the results of said netting process which include at least one of an optimal number of payments or value transfers, an optimal amount of capital movement, an optimal distribution or risk, or an optimal combination thereof.

86. A computer system adapted to perform financial services over a computerized network, having at least a first client computer connected thereto, comprising:
at least one memory including a program having instructions adapted to enable a computer system to perform the steps of:
initiating a request at the first client computer for a financial transaction, said request being received at one of a second client computer or a first server;
obtaining information, at said second client computer or said first server, from at least one entity having at least one of a third client computer or a second server involved in said financial transaction;
confirming, at said second client computer or said first server, with said at least one entity that said financial transaction can be executed; and
performing said financial transaction, at said second client computer or said first server, based on predetermined parameters input by at least said one entity, or said client computers or said servers involved in said financial transaction, that optimize capital or risk distribution utilizing at least a netting process, the results of said netting process which include at least one of an optimal number of payments or value transfers, an optimal amount of capital movement, an optimal distribution of risk, or an optimal combination thereof; and
at least one processor which runs said program.

87. A computer system adapted to perform financial services over a computerized network, having at least a first client computer connected thereto, comprising:
at least one memory including a program having instructions adapted to enable the computer system to perform the steps of:
initiating a request at the first client computer for a first financial transaction, said request being received at one of a second client computer or a server;
receiving information, at any of said client computers or said server, on at least one potential participant in said first financial transaction;
notifying, at any of said client computers or said server, said at least one potential participant of said first financial transaction; and
performing said first financial transaction, at said second client computer or said server, based on predetermined parameters input by at least said one potential participant, or said client computers or said server involved in said first financial transaction, that optimize capital or risk distribution utilizing at least a netting process, the results of said netting process which include at least one of an optimal number of payments or value transfers, an optimal amount of capital movement, an optimal distribution of risk, or an optimal combination thereof; and at least one processor which runs said program.

88. A computer program product stored in a computer readable medium for enabling a computer to perform financial transactions over a computerized network, having at least a first client computer connected thereto, comprising:

software instructions for enabling the computer to perform predetermined operations, and said computer readable medium bearing the software instructions;

the predetermined operations including the steps of:

initiating a request at the first client computer for a financial transaction, said request being received at one of a second client computer or a first server;

obtaining information, at said second client computer or said first server from at least one entity having at least one of a third client computer or a second server involved in said financial transaction;

confirming, at said second client computer or said first server, with said at least one entity that said financial transaction can be executed; and performing said financial transaction, at said second client computer or said first server, based on predetermined parameters input by at least said one entity, or said client computers or said servers involved in said financial transaction, that optimize capital or risk distribution utilizing at least a netting process, the results of said netting process which include at least one of an optimal number of payments or value transfers, an optimal amount of capital movement, an optimal distribution of risk, or an optimal combination thereof.

89. A computer program product for enabling a computer to perform financial transactions over a computerized network, having at least a first client computer connected thereto, comprising:

software instructions for enabling the computer to perform predetermined operations, and a computer readable medium bearing the software instructions;

the predetermined operations including the steps of:

initiating a request at the first client computer for a first financial transaction, said request being received at one of a second client computer or a server;

receiving information, at any of said client computers or said server, on at least one potential participant in said first financial transaction;

notifying, at any of said client computers or said server, said at least one potential participant of said first financial transaction; and performing said first financial transaction, at said second client computer or said server, based on predetermined parameters input by at least said one potential participant, or said client computers or said server involved in said first financial transaction, that optimize capital or risk distribution utilizing at least a netting process, the results of said netting process which include at least one of an optimal number of payments or value transfers, an optimal amount of capital movement, an optimal distribution of risk, or an optimal combination thereof.

* * * * *